US010983659B1

(12) United States Patent
Baloga

(10) Patent No.: US 10,983,659 B1
(45) Date of Patent: Apr. 20, 2021

(54) EMISSIVE SURFACES AND WORKSPACES METHOD AND APPARATUS

(71) Applicant: Steelcase Inc., Grand Rapids, MI (US)

(72) Inventor: Mark A. Baloga, East Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 16/784,905

(22) Filed: Feb. 7, 2020

Related U.S. Application Data

(63) Continuation of application No. 15/696,723, filed on Sep. 6, 2017, now Pat. No. 10,754,491, which is a (Continued)

(51) Int. Cl.
*G06F 3/0481* (2013.01)
*H04L 12/18* (2006.01)
(Continued)

(52) U.S. Cl.
CPC .......... *G06F 3/0481* (2013.01); *G06F 3/0488* (2013.01); *G06F 3/04847* (2013.01); *H04L 12/1813* (2013.01)

(58) Field of Classification Search
CPC .... G06F 3/0481; G06F 3/0484; G06F 3/0488; G06F 3/1454; G09G 2370/16; H04L 12/18; H04N 7/15; H04N 7/14
(Continued)

(56) References Cited

U.S. PATENT DOCUMENTS 3,514,871 A 6/1970 Tucker
4,740,779 A 4/1988 Cleary et al.
(Continued)

FOREIGN PATENT DOCUMENTS

AU 2011101160 B4 10/2011
CA 2806804 A1 8/2013
(Continued)

OTHER PUBLICATIONS

Beaudouin-Lafon, et al., Multisurface Interaction in the Wild Room, IEEE Computer, IEEE, 2012, Special Issue on Interaction Beyond the Keyboard, 45(4):48-56.
(Continued)

*Primary Examiner* — Melur Ramakrishnaiah
(74) *Attorney, Agent, or Firm* — Quarles & Brady LLP

(57) ABSTRACT

A conferencing arrangement for sharing information within a conference space, the arrangement comprising a common presentation surface including a presentation surface area, a common presentation surface driver, a system processor linked to the driver and receiving and presenting the information content via the common presentation surface and a portable user interface device including a device display screen and a device processor, the device processor programmed to provide an interface via the device display screen useable to view content and to enter a command to replicate content presented on the device display on the common presentation surface, the device processor capable of identifying a direction of a swiping action on the interface as a command to replicate the content, wherein, upon identifying that the direction of a swiping action on the interface is in the direction of the common presentation surface, the arrangement creates a sharing space on the presentation surface area and replicates the content from the device display within the sharing space.

47 Claims, 60 Drawing Sheets

Related U.S. Application Data continuation of application No. 14/500,155, filed on Sep. 29, 2014, now Pat. No. 9,804,731, which is a continuation-in-part of application No. 14/159,589, filed on Jan. 21, 2014, now Pat. No. 9,261,262.

(60) Provisional application No. 61/756,753, filed on Jan. 25, 2013, provisional application No. 61/886,235, filed on Oct. 3, 2013, provisional application No. 61/911,013, filed on Dec. 3, 2013.

(51) Int. Cl.
*G06F 3/0484* (2013.01)
*G06F 3/0488* (2013.01)

(58) Field of Classification Search
USPC .................... 348/14.01–14.16; 715/753, 754
See application file for complete search history.

(56) References Cited

U.S. PATENT DOCUMENTS 4,920,458 A 4/1990 Jones
5,340,978 A 8/1994 Rostoker et al.
5,732,227 A 3/1998 Kuzunuki et al.
6,540,094 B1 4/2003 Baloga et al.
6,813,074 B2 11/2004 Starkweather
7,068,254 B2 6/2006 Yamazaki et al.
7,095,387 B2 8/2006 Lee et al.
7,136,282 B1 11/2006 Rebeske
7,161,590 B2 1/2007 Daniels
7,166,029 B2 1/2007 Enzminger
7,198,393 B2 4/2007 Tubidis et al.
7,274,413 B1 9/2007 Sullivan et al.
7,352,340 B2 4/2008 Utt et al.
7,368,307 B2 5/2008 Cok
7,463,238 B2 12/2008 Funkhouser et al.
7,492,577 B2 2/2009 Tomizuka et al.
7,509,588 B2 3/2009 Van Os et al.
7,535,468 B2 5/2009 Uy
7,583,252 B2 9/2009 Kurtenbach et al.
7,667,891 B2 2/2010 Cok et al.
7,785,190 B2 8/2010 Aida
7,821,510 B2 10/2010 Aksemit et al.
7,847,912 B2 12/2010 Nishizawa et al.
7,884,823 B2 2/2011 Bertolami et al.
7,889,425 B1 2/2011 Connor
7,922,267 B2 4/2011 Gevaert
7,957,061 B1 6/2011 Connor
8,009,412 B2 8/2011 Chen
8,018,579 B1 9/2011 Krah
8,046,701 B2 * 10/2011 Chiu ....................... H04L 67/36 715/761
8,072,437 B2 12/2011 Miller et al.
8,077,235 B2 12/2011 Street
8,125,461 B2 2/2012 Weber et al.
8,190,908 B2 5/2012 Jazayeri et al.
8,191,001 B2 5/2012 Van Wie et al.
8,199,471 B2 6/2012 Bemelmans et al.
8,217,869 B2 7/2012 Weisberg et al.
8,340,268 B2 12/2012 Knaz
8,396,923 B2 3/2013 Salesky et al.
8,433,759 B2 4/2013 Styles et al.
8,464,184 B1 6/2013 Cook et al.
8,600,084 B1 12/2013 Garrett
8,682,973 B2 3/2014 Kikin-Gil et al.
8,902,184 B2 12/2014 Rydenhag et al.
8,947,488 B2 2/2015 Han et al.
8,965,975 B2 2/2015 Salesky et al.
9,070,229 B2 6/2015 Williamson et al.
9,104,302 B2 8/2015 Chai et al.
9,161,166 B2 10/2015 Johansson et al.
9,207,833 B2 12/2015 Doray et al.
9,253,270 B2 2/2016 Bharshankar et al.
9,261,262 B1 2/2016 Baloga
9,759,420 B1 9/2017 Baloga
9,804,731 B1 10/2017 Baloga
2003/0054800 A1 3/2003 Miyashita
2003/0088570 A1 5/2003 Hilbert et al.
2003/0134488 A1 7/2003 Yamazaki et al.
2003/0223113 A1 12/2003 Starkweather
2003/0227441 A1 12/2003 Hioki et al.
2004/0135160 A1 7/2004 Cok
2004/0201628 A1 10/2004 Johanson et al.
2005/0030255 A1 2/2005 Chiu et al.
2005/0091359 A1 4/2005 Soin et al.
2005/0188314 A1 8/2005 Matthews et al.
2006/0220981 A1 * 10/2006 Murai .................. G06F 3/0304 345/1.1
2006/0238494 A1 10/2006 Narayanaswami et al.
2007/0002130 A1 1/2007 Hartkop
2007/0069975 A1 3/2007 Gettemy et al.
2007/0150842 A1 6/2007 Chaudhri et al.
2007/0157089 A1 7/2007 Van Os et al.
2007/0220794 A1 9/2007 Pitcher et al.
2008/0068566 A1 3/2008 Denoue et al.
2008/0158171 A1 7/2008 Wong et al.
2008/0291225 A1 11/2008 Arneson
2009/0076920 A1 3/2009 Feldman et al.
2009/0096965 A1 4/2009 Nagata
2009/0124062 A1 5/2009 Yamazaki et al.
2009/0132925 A1 5/2009 Koehler et al.
2009/0149249 A1 6/2009 Sum
2009/0219247 A1 9/2009 Watanabe et al.
2009/0254843 A1 10/2009 Van Wie et al.
2009/0271848 A1 10/2009 Leung et al.
2009/0285131 A1 11/2009 Knaz
2010/0020026 A1 1/2010 Benko et al.
2010/0023895 A1 1/2010 Benko et al.
2010/0053173 A1 3/2010 Cohen et al.
2010/0148647 A1 6/2010 Burgess et al.
2010/0169791 A1 * 7/2010 Pering .................. G06F 3/1423 715/740
2010/0182518 A1 7/2010 Kirmse et al.
2010/0302130 A1 * 12/2010 Kikuchi ................ G06F 3/1454 345/1.3
2010/0302454 A1 12/2010 Epstein et al.
2010/0318921 A1 12/2010 Trachtenberg et al.
2011/0043479 A1 2/2011 van Aerle et al.
2011/0095974 A1 4/2011 Moriwaki
2011/0096138 A1 4/2011 Grimshaw
2011/0102539 A1 5/2011 Ferren
2011/0183722 A1 7/2011 Vartanian
2011/0298689 A1 12/2011 Bhomer et al.
2012/0004030 A1 1/2012 Kelly et al.
2012/0013539 A1 1/2012 Hogan et al.
2012/0030567 A1 2/2012 Victor
2012/0050075 A1 3/2012 Salmon
2012/0066602 A1 3/2012 Chai et al.
2012/0102111 A1 4/2012 Salesky et al.
2012/0133728 A1 5/2012 Lee
2012/0162351 A1 6/2012 Feldman et al.
2012/0176465 A1 7/2012 Triplett et al.
2012/0216129 A1 8/2012 Ng et al.
2012/0242571 A1 9/2012 Takamura et al.
2013/0019195 A1 1/2013 Gates
2013/0091205 A1 4/2013 Kotler et al.
2013/0091440 A1 4/2013 Kotler et al.
2013/0103446 A1 4/2013 Bragdon et al.
2013/0125016 A1 5/2013 Pallakoff et al.
2013/0159917 A1 6/2013 Loebach
2013/0169687 A1 7/2013 Williamson et al.
2013/0185666 A1 7/2013 Kenna, III et al.
2013/0194238 A1 8/2013 Sakai
2013/0222266 A1 8/2013 Gardenfors et al.
2013/0226444 A1 8/2013 Johansson et al.
2013/0227433 A1 8/2013 Doray et al.
2013/0227478 A1 8/2013 Rydenhag et al.
2013/0232440 A1 9/2013 Brown et al.
2013/0246529 A1 9/2013 Salesky et al.
2013/0249815 A1 9/2013 Dolan et al.

(56) References Cited

U.S. PATENT DOCUMENTS

| | | | |
|---|---|---|---|
| 2013/0275883 | A1 | 10/2013 | Bharshankar et al. |
| 2013/0288603 | A1 | 10/2013 | Iwasaki |

FOREIGN PATENT DOCUMENTS

| | | | |
|---|---|---|---|
| CN | 202602701 | U | 12/2012 |
| CN | 202773002 | U | 3/2013 |
| EP | 1659487 | A2 | 5/2006 |
| EP | 1986087 | A2 | 10/2008 |
| EP | 1780584 | B1 | 7/2009 |
| EP | 2400764 | A2 | 12/2011 |
| EP | 2444882 | A1 | 4/2012 |
| EP | 2464082 | A1 | 6/2012 |
| EP | 2632187 | A1 | 8/2013 |
| EP | 2665296 | A2 | 11/2013 |
| EP | 2680551 | A1 | 1/2014 |
| WO | 0243386 | A1 | 5/2002 |
| WO | 2004075169 | A2 | 9/2004 |
| WO | 2006048189 | A1 | 5/2006 |
| WO | 2007143297 | A2 | 12/2007 |
| WO | 2008022464 | A1 | 2/2008 |
| WO | 2008036931 | A3 | 3/2008 |
| WO | 2008043182 | A1 | 4/2008 |
| WO | 2010017039 | A2 | 2/2010 |
| WO | 2010033036 | A1 | 3/2010 |
| WO | 2011005318 | A2 | 1/2011 |
| WO | 2011041427 | A2 | 4/2011 |
| WO | 2011084245 | A2 | 7/2011 |
| WO | 2011133590 | A1 | 10/2011 |
| WO | 2011149560 | A1 | 12/2011 |
| WO | 2012015625 | A2 | 2/2012 |
| WO | 2012036389 | A3 | 3/2012 |
| WO | 2012037523 | A1 | 3/2012 |
| WO | 2012048007 | A2 | 4/2012 |
| WO | 2012100001 | A1 | 7/2012 |
| WO | 2012116464 | A1 | 9/2012 |
| WO | 2012162411 | A1 | 11/2012 |
| WO | 2013009092 | A2 | 1/2013 |
| WO | 2013021385 | A2 | 2/2013 |
| WO | 2013023183 | A1 | 2/2013 |
| WO | 2013029162 | A1 | 3/2013 |
| WO | 2013074102 | A1 | 5/2013 |
| WO | 2013124530 | A1 | 8/2013 |
| WO | 2013154827 | A1 | 10/2013 |
| WO | 2013154829 | A1 | 10/2013 |
| WO | 2013154831 | A1 | 10/2013 |
| WO | 2013156092 | A1 | 10/2013 |

OTHER PUBLICATIONS

Karma Laboratory, The Petri Dish: Pretty Lights, http://karma-laboratory.com/petridish/2004/11/pretty_lights.html, Nov. 20, 2004, 2 pages.

Takanashi, et al., Human-Computer Interaction Technology Using Image Projection and Gesture-Based Input, NEC Technical Journal, 2013, 7(3):122-126.

Weiss, et al., BendDesk: Dragging Across the Curve, ITS 2010: Displays, Nov. 7-10, 2010, Saarbrucken, Germany, Copyright 2010 ACM, pp. 1-10.

* cited by examiner

EMISSIVE SURFACES AND WORKSPACES METHOD AND APPARATUS

CROSS-REFERENCE TO RELATED APPLICATIONS

This application is a continuation of U.S. patent application Ser. No. 15/696,723 which was filed on Sep. 6, 2017 which is titled "Emissive Surfaces And Workspaces Method And Apparatus" which is a continuation of U.S. patent application Ser. No. 14/500,155 which was filed on Sep. 29, 2014 which is titled "Emissive Surfaces And Workspaces Method And Apparatus" which is a continuation-in-part of U.S. Pat. No. 9,261,262 which was filed on Jan. 21, 2014 which is titled "Emissive Shapes And Control Systems" which claims priority to U.S. provisional patent application No. 61/756,753 which was filed on Jan. 25, 2013 which is titled "Emissive Shapes And Control Systems." U.S. patent application Ser. No. 14/500,155 also claims priority to provisional U.S. patent application No. 61/886,235 which was filed on Oct. 3, 2013 which is titled "Emissive Surfaces And Workspaces Method And Apparatus" and to U.S. provisional patent application No. 61/911,013 which was filed on Dec. 3, 2013 which is titled "Curved Display And Curved Display Support." Each of these applications is hereby incorporated by reference herein in its entirety.

STATEMENT REGARDING FEDERALLY SPONSORED RESEARCH OR DEVELOPMENT

Not applicable.

BACKGROUND OF THE INVENTION

The present invention relates to large electronic information presentation surfaces and more specifically to large surfaces and ways of controlling information presented on those surfaces that facilitate various work and information sharing activities.

People have been conferencing in many ways for thousands of years to share information and to learn from each other in various settings including business, educational and social settings. Relatively recently technology has evolved that enables people to share information in new and particularly useful ways. For instance, computers and video projectors have been developed in the past few decades that enable an information presenter to display computer application content in a large presentation format to conferees in conference or other spaces. In these cases, a presenter's computer (e.g., often a personal laptop) running an application such as Power Point by Microsoft is connected to a projector via a video cable and the presenter's computer is used to drive the projector like an additional computer display screen so that the desktop (e.g., the instantaneous image on the presenter's computer display screen) on the presenter's computer is presented via the projector on a large video screen that can be viewed by persons within a conference room.

More recent systems have been developed that employ electronic flat panel display screens instead of projectors and that enable more than one conferee to simultaneously share digital content (e.g., software application output) on common conference screens. For instance, Steelcase markets a Media:scape system that includes two or more common flat panel display screens supported adjacent one edge of a conference table, a switching device or application and a set (e.g., six) of link/control subassemblies where each subassembly can link to a different conferee computing device (e.g., a laptop). Each computing device user can select any subset of the common screens to share the user's device desktop and hence application output with others gathered about the conference table. Common screen control is egalitarian so that any user linked to one of the link/control subassemblies can assume control of one or more of the common screens whenever they want to without any requirement that other users grant permission. Applicant output can include a still image, a video output (e.g., a video accessed via the Internet) or dynamic output of a computer application as a device user interacts with a software application (e.g., as a word processing application is used to edit a document).

While Media:scape works well for small groups wanting to quickly share digital content among themselves in a dynamic fashion, the system has several shortcomings. First, the ability to simultaneously share content from multiple sources is limited by the number of common display screens included in the system. For instance, where a Media:scape system only includes two common display screens, output from only two sources can be simultaneously presented.

Second, current versions of Media:scape do not include a feature that enables conferees to archive session images for subsequent access and therefore the system is best suited for realtime content sharing as opposed to generating session information that is maintained in a persistent state.

Third, the ability to move content around on common screens is not fluid. For instance, if first through fourth different sources are used to simultaneously drive first through fourth different Media:scape screens and a user wants to swap content from the fourth screen with content from the first screen, in most cases there is no way for the single user to accomplish this task. This is because two different sources initially drive the first and fourth common screens and usually one user does not control two sources. For instance, usually a first user's device would drive the first screen and a fourth user's device would drive the fourth screen and both the first and fourth user would have to cooperate to accomplish the swap.

Fourth, Media:scape does not enable direct resizing of content on common display screens to render content in sizes that are optimized for specific viewing applications. To this end, while Media:scape screens are relatively large, the screens have sizes that are generally optimized for use by conferees gathered about the Media:scape conference table adjacent thereto. If conferees are spaced from the Media:scape table, the size of content shared on the common screens is often too small to be optimal.

Fifth, Media:scape hardware is usually arranged to be stationary and therefore user's are constrained to viewing content on stationary display screens relative to the conference table and other hardware. Again, while this arrangement may be optimal for some situations, optimal arrangement of content about a conference space is often a matter of user choice based on tasks to accomplish, conferees in attendance, content being shared, etc.

Other conferencing systems have been developed that allow people in a conference space to share information within the space on a plurality of large flat panel display screens that are provided about walls that define the conference space. For instance, the screen space of three large flat panel displays may be divided into a set of nine smaller presentation spaces arranged to form a ribbon of spaces so that nine distinct images can be simultaneously shared along the ribbon. If desired, three of the nine images in the smaller spaces can be enlarged and presented on the three large common displays. Output to the screens can include still images, video output or dynamic output of an application program.

At least one known system includes a wand device usable by a presenter to interact on the common screens with applications that drive the common screens. For instance, the wand can be used to move common presentation spaces about the common screens to rearrange the spaces and immediately associated content, to resize one or more of the presentation spaces and associated content, to cycle through content that runs off the common screens during a session, etc.

Some systems also facilitates control of commonly presented content via portable user devices such as laptops, pad type computing devices, etc. To this end, some systems present a touch interface on a user's portable pad or tablet type device screen that can be used to control common screen content.

These other known systems, unfortunately, also have some shortcomings. First, known systems includes stationary hardware that restricts how the system can be used by conferees. For instance, a typical system may be provided in a conference space that includes a front wall, a rear wall and two side walls and may include three large common display screens mounted side by side to the front wall as well as one side screen mounted to each side walls with a conference table supported between the space walls. Thus, user's of the space are typically arranged about the table and angle themselves, most of the time, to face the front wall where content is being presented via the front three display screens. Here, images may be provided on the side screens, for the most part the side and rear walls are effectively unutilized or at least are underutilized by conferees. Here, for persons to view the common content, in many cases, the arrangement requires users to turn away from each other and toward the common content so that face to face conversations are difficult to carry on.

Second, while session content for several session images may be simultaneously presented via the relatively small presentation spaces provided on the three display screens mounted to the front wall, the content is often too small for actual reference and the content needs to be increased in size in order to appreciate any detail presented. Increasing content size of some content causes the enlarged content to disadvantageously block out views of other content.

Third, known systems require users to use either a special device like a wand or a portable personal user device to interact with presented content. While the wand is interesting, it is believed there may be better interfaces for commonly displayed content. To this end, most systems only include a single wand and therefore wand control and content control using the wand has to be passed from one conferee to another which makes egalitarian control less attractive. While personal user device interfaces are useful, in many cases users may not want to carry a personal device around or the size of the personal device screen may be insufficient to support at least certain useful interface activities.

Fourth, as more features are added to common display screens within a system, portable personal interface devices can become much more complex and far less intuitive to operate. For instance, where an interface includes nine relatively small presentation spaces in a ribbon form, a personal device interface may also includes nine spaces and may also include other tools to facilitate user input. On a small portable device screen too much information or too many icons or fields can be intimidating. In addition, where an interface is oriented differently than commonly presented information, the relative juxtaposition of the interface and commonly displayed information can be disorienting.

BRIEF SUMMARY OF THE INVENTION

It has been recognized that simplified interfaces can be provided to user's of common display screens that enable the users to control digital content provided via the common screens. To this end, interfaces can be dynamically modified to reflect changes in content presented via the common displays. For instance, where a rectangular emissive room includes four fully emissive walls (e.g., the complete area of each of the four walls is formed by electronic display pixels) and where several sub-areas or presentation spaces on the walls are used to simultaneously present different subsets of digital content (e.g., images of application output), an interface within the emissive room may be programmed to be different depending on the juxtaposition of the interface within the room relative to the presentation spaces. For example, where an interface user is directly in front of a first presentation space, the user may be able to directionally swipe a surface of the interface forward toward the first presentation space to replicate digital content (e.g., the user's immediate desktop content) from the interface to the first presentation space. In this example, if a second presentation space faces the first on an opposing wall, the user may be able to directionally swipe the interface surface toward the user's chest and therefore toward the second presentation space behind the user to replicate the digital content from the interface to the second presentation space. If a third presentation space is to the left of the user's interface, the user may be able to replicate content from the user's interface to the third space by swiping directionally to the left, and so on.

Where a second user uses a second interface at a different location in the conference space, the second interface would enable directional replication to the different presentation spaces, albeit where the directional replication is different and is based on the relative juxtaposition of the second interface to the presentation spaces. For instance, where the second interface faces the second display screen and away from the first displays screen, replication on the second and first screens may be facilitated via forward and rearward swiping action, in at least some embodiments.

In at least some cases a replicating action to an emissive space that is not currently designated a presentation space may cause the system to generate or create a new presentation space on an emissive surface that is substantially aligned with a conferee's gesture. When a new presentation space is added to an emissive surface in the space, interfaces associated with the emissive surfaces may be automatically modified to reflect the change in presentation space options. Thus, for instance, where an initial set of presentation spaces does not include a presentation space on a right side wall and a conferee makes a replicating gesture to the right side wall, the system may automatically create a new presentation space on the right side wall to replicate the conferee's digital content. When the new presentation space is created, the user interface is updated to include another option for gesture based replication where the other option can be selected to cause replication in the new space from the interface. Other interfaces associated with the room would be similarly modified as well to support the other replicating feature.

In at least some cases a gesture via an interface away from an image presented in one of the emissive surface presentation spaces may cause existing content presented in the presentation space to be removed there from or to be duplicated on the interface. Where existing presentation space content is removed from an existing presentation space, the existing space may either persist and be blank, may persist and present previously presented content, or the presentation space may be removed from the emissive surface altogether.

In some cases an interface may include at least some indication of currently supported gestures. For instance, where a separate presentation space is presented via each of four emissive walls in a rectangular emissive conference room, a first interface facing a first of the four presentation spaces may include four separate presentation space icons, one for each and directionally substantially aligned with each of the four presentation spaces. Here, the four icons provide a visual queue indicating presentation spaces on which the interface user can share content. Where a fifth presentation space is added through a gesture based replication to an open space or the like, a fifth presentation space icon would be added to the interface that is substantially aligned with the fifth presentation space to indicate a new replicating option. Other interfaces within the conference space would be dynamically updated accordingly.

In at least some cases the presentation space icons may include thumbnails of currently presented content on the emissive surfaces to help interface users better understand the overall system. Here, another gesture may be supported to enable an interface user to increase the size of one or more of the thumbnails on the interface for individual viewing of the thumbnail images in greater detail. For instance, a two finger separating gesture could result in a zooming action and a two finger pinch gesture could reverse a zooming action.

Where presentation space icons are provided on an interface, a dragging sharing action may be supported in addition to or instead of the swiping gesture sharing actions. For instance, an interface user may touch and drag from a user's desktop or workspace on an interface to one or more of the presentation space icons to replicate the user's content on one or more associated emissive surface presentation spaces or content fields.

In at least some embodiments at least initial sizes of presentation spaces will have a default value based on the size of the space in which a system is located and on the expected locations of conferees within the space relative to the emissive surfaces. To this end, it has been recognized that, while extremely large emissive surfaces can be configured with existing technology, the way people interact with emissive surfaces and content presented thereby often means that presentation spaces that are relatively smaller than the maximum size spaces possible are optimal. More specifically, three by five foot presentation spaces are often optimal given conference room sizes and conferee juxtapositions relative to supporting or surrounding wall surfaces. The three by five foot size is generally optimal because information subsets of sizes most people are generally comfortable processing can be presented in large enough graphics for people in most sized conference rooms to see when that size is adopted. The size at least somewhat mimics the size of a conventional flip chart page that people are already comfortable using through past experience.

In some cases, the default presentation space size can be modified either on a presentation space by presentation space basis or across the board to reflect conferee preferences.

Some embodiments include a conferencing arrangement for sharing information within a conference space, the arrangement comprising a common presentation surface positioned within the conference space, the common presentation surface including a presentation surface area, a common presentation surface driver, a system processor linked to the driver, the system processor receiving information content and presenting the information content via the common presentation surface and a user interface device including a device display screen and a device processor, the device processor programmed to provide a dynamic interface via the device display screen that is usable to create an arbitrary number of distinct sharing spaces on the presentation surface area for sharing information content and to automatically modify the interface to include features for controlling content presented in the sharing spaces as the number of distinct sharing spaces is altered.

In some cases the user interface device is positioned in a specific orientation with respect to the common presentation surface and wherein the features for controlling content presented in the sharing spaces include sharing features on the device display screen that are substantially aligned with associated distinct sharing spaces. In some cases the user interface device is portable and wherein, as the orientation of the user interface device is changed, the device processor is programmed to alter the device interface to maintain substantial alignment of the sharing features on the device display screen and the associated distinct sharing spaces.

In some cases the common presentation surface is a first common presentation surface, the arrangement including at least a second common presentation surface that is angled with respect to the first common presentation surface and that includes presentation surface area, the dynamic interface usable to create an arbitrary number of distinct sharing spaces on the presentation surface areas for sharing information content. In some cases the angle between the first and second common presentation surfaces is less than 120 degrees.

In some cases the first and second common presentation surfaces form wall surfaces of the conference space. In some cases the first and second common presentation surfaces substantially cover first and second walls about the conference space. Some embodiments also include at least a third common presentation surface that is substantially parallel to the first presentation surface and that forms presentation surface area, the dynamic interface usable to create an arbitrary number of distinct sharing spaces on the presentation surface areas for sharing information content.

In some cases the angle between the first and second common presentation surfaces is less than 91 degrees. In some cases at least a portion of the common presentation surface is concave toward the conference space. Some embodiments also include a conference table arranged in the conference space, the user interface device built into a top surface of the conference table.

In some cases the user interface device is a first user interface device, the arrangement further including a second user interface device including a second device display screen and a second device processor, the second device processor programmed to provide a dynamic second interface via the second device display screen that is also usable to control the number of distinct sharing spaces on the presentation surface area for sharing information content and to automatically modify the second interface to include features for controlling content presented in the sharing spaces as the number of distinct sharing spaces is altered via any one of the interface devices.

In some cases the first user interface device is positioned in a specific orientation with respect to the common presentation surface and wherein the features for controlling content presented in the sharing spaces include sharing features on the first device display screen that are substantially aligned with associated distinct sharing spaces and wherein the second user interface device is positioned in a specific orientation with respect to the common presentation surface and wherein the features for controlling content presented in the sharing spaces include sharing features on the second device display screen that are substantially aligned with associated distinct sharing spaces.

In some cases the presentation surface and driver include an electronic display screen. In some cases the driver is a projector. In some cases the presentation surface substantially surrounds the conference space.

In some cases the presentation surface area includes first and second presentation surface areas, each of which is dividable into sharing spaces, the second presentation surface area presenting a mirror image of the sharing spaces and content in the sharing spaces on the first presentation surface area, the interface including features for controlling content presented in the sharing spaces of the first presentation surface area. In some cases the second presentation surface area substantially opposes the first presentation surface area. In some cases each sharing space has similar default dimensions. In some cases the default dimensions include a width within a width range of two feet by six feet and a height within a height range of three feet and seven feet.

In some cases the lower edge of each sharing space is higher than twenty-seven inches. In some cases the interface enables modification to the dimensions of any of the sharing spaces. In some cases, as sharing spaces are added to the presentation surface area, the sharing spaces are provided in a single row of adjacent sharing spaces. In some cases the system processor is programmed to, as shared information is replaced in one of the sharing spaces, present a thumbnail image of the replaced shared information in an archive field on the presentation surface. In some cases the device display screen is a touch sensitive device display screen.

Some embodiments include a conferencing arrangement for sharing information within a conference space, the arrangement comprising a common presentation subassembly including presentation surface positioned within the conference space, the common presentation surface including presentation surface area facing the conference space on at least two sides of the conference space, a common presentation surface driver, a system processor linked to the driver, the system processor receiving information content and presenting the information content via the common presentation surface and a plurality of user interface devices, each user interface device including a device display screen and a device processor, the device processor programmed to provide a dynamic interface via the device display screen that is usable to modify an arbitrary number of distinct sharing spaces on the presentation surface area for sharing information content, the device processor further programmed to automatically modify the interface to include features for controlling content presented in the sharing spaces as the number of distinct sharing spaces is altered via any one of the plurality of user interface devices.

In some cases each user interface device is positioned in a device specific orientation with respect to the common presentation surface and wherein the features for controlling content presented in the sharing spaces include sharing features on the device display screens that are substantially aligned with associated distinct sharing spaces. In some cases the presentation surface area substantially surrounds the conference space.

Other embodiments include a conferencing arrangement for sharing information within a conference space, the arrangement comprising a common presentation surface positioned within the conference space, the common presentation surface including a presentation surface area including distinct sharing spaces for sharing information content, a common presentation surface driver, a system processor linked to the driver, the system processor receiving information content and causing the driver to present the information content via the common presentation surface and a moveable dynamic user interface wherein the orientation of the user interface with respect to the sharing spaces is changeable, the interface including features for controlling content presented in the sharing spaces including sharing features that remain substantially aligned with associated distinct sharing spaces as the interface orientation is changed.

In some cases the common presentation surface includes at least first and second common presentation surfaces positioned within the conference space, the first common presentation surface including at least a first distinct sharing space and the second common presentation surface including at least a second distinct sharing space. In some cases the first distinct sharing space includes substantially the entire surface area of the first common presentation surface. In some cases the first common presentation surface is adjacent the second common presentation surface and wherein at least one sharing space stretches across portions of the adjacent first and second common presentation surfaces.

Some embodiments include electronic displays that provide the first and second common presentation surfaces. In some cases the common presentation surface substantially includes an entire wall in a conference space. In some cases the common presentation surface includes a curved portion of a wall.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
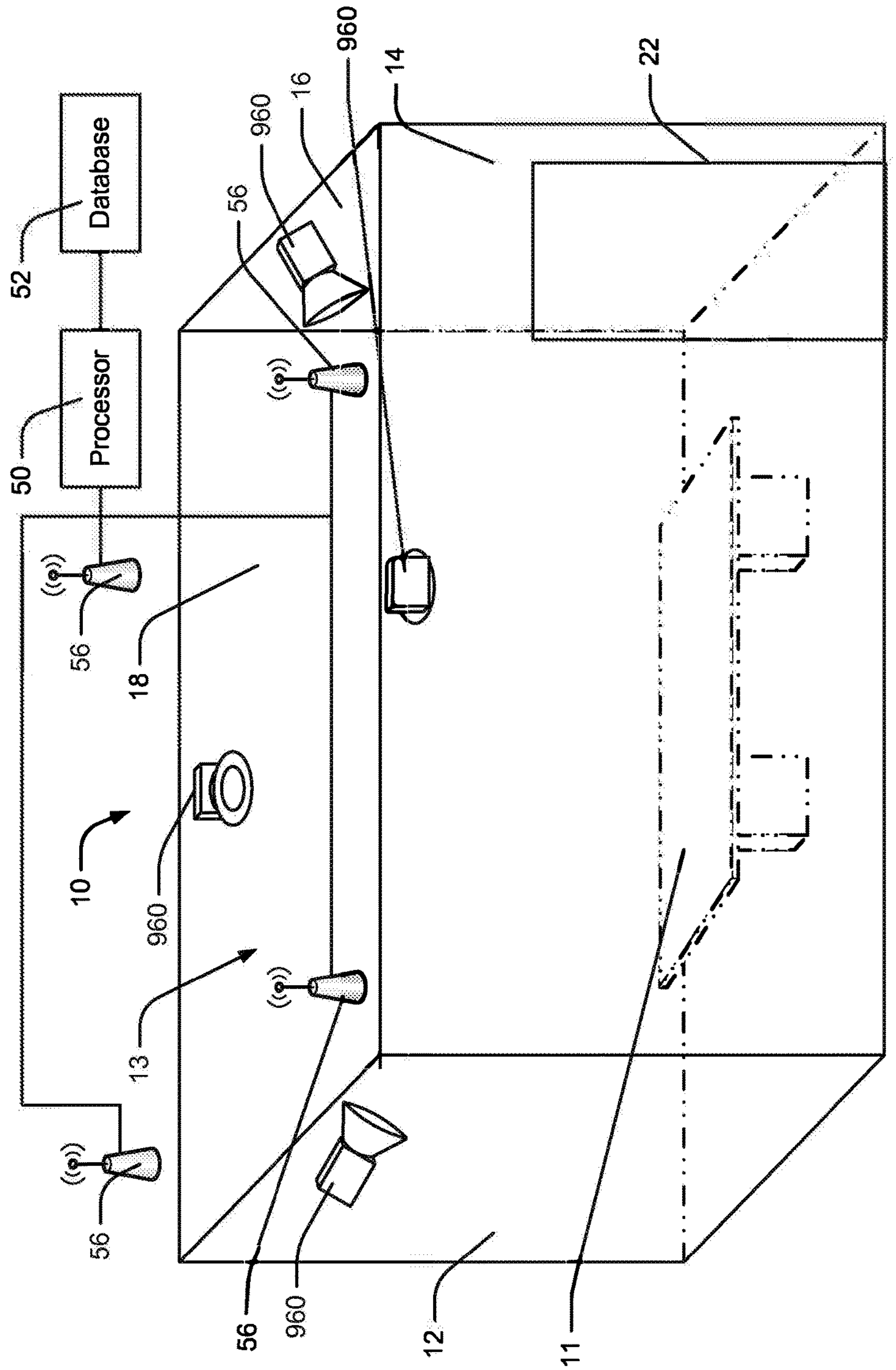
FIG. 1 is a schematic view of an exemplary system implementing at least some aspects of the present disclosure.

Referring now to the drawings wherein like reference numerals correspond to similar elements throughout the several views and, more specifically, referring to FIG. 1, the present invention will be described in the context of an exemplary conference space configuration 10 that includes a conference table 11, four wall subassemblies (referred to also hereafter as walls) 12, 14, 16,18, a processor 50, a database 52 and a plurality of wireless access points 56. The walls 12, 14, 16 and 18 form a rectangular space and include first and second end walls 12 and 16 and first and second side walls 14 and 18. A door or egress 22 for entering and exiting the space 10 is located in wall 14 adjacent wall 16. In the interest of simplifying this explanation, the walls 12, 14, 16 and 18 will be referred to as east, south, west and north walls, respectively. In FIG. 2 and other figures thereafter having a similar appearance, the walls 12, 14, 16 and 18 and table 11 are shown in a top plan view where the walls have been laid flat with surfaces that face space 13 shown facing upward. In an actual arrangement each of the walls 12, 14, 16 and 18 is generally vertically oriented as shown in FIG. 1.

Each of walls 12, 14, 16 and 18 includes a surface area. For instance, wall 18 includes a rectangular surface area 30 having a height dimension H1 and a width dimension W1 that extend substantially the entire height and width of the wall 18. In at least a first embodiment the surface of area 30 is emissive. Herein, unless indicated otherwise, the phrase "emissive surface" will be used to refer to a surface that can be driven by a computer to present information to conferees located within space 10. For instance, in at least some embodiments emissive surface 30 may include a large LED or LCD display that covers substantially the entire wall surface area and may operate like a large flat panel display screen. Here, the term "substantially" is used to refer to essentially the entire surface area but not necessarily the entire surface area. For instance, in at least some embodiments the emissive surface may be framed by a bezel structure so that a small frame exists along the edges of surface 30. As a another instance, an emissive surface may include a surface and a projector aimed at the surface to project information on to the surface.

In addition surfaces of walls 12, 14 and 16 are each emissive in at least some embodiments so that all of the surfaces of walls 12, 14, 16 and 18 facing area 13 are emissive and can be used to present digital content to conferees within space 13. In at least some embodiments a surface of door 22 facing space 13 is also emissive. To minimize the non-emissive areas between door 22 and adjacent portions of wall 16, the bezel about the door surface may be minimal (e.g., ¼th inch or less). While not shown, configuration 10 would also include a ceiling structure i most cases.

Figure 2:
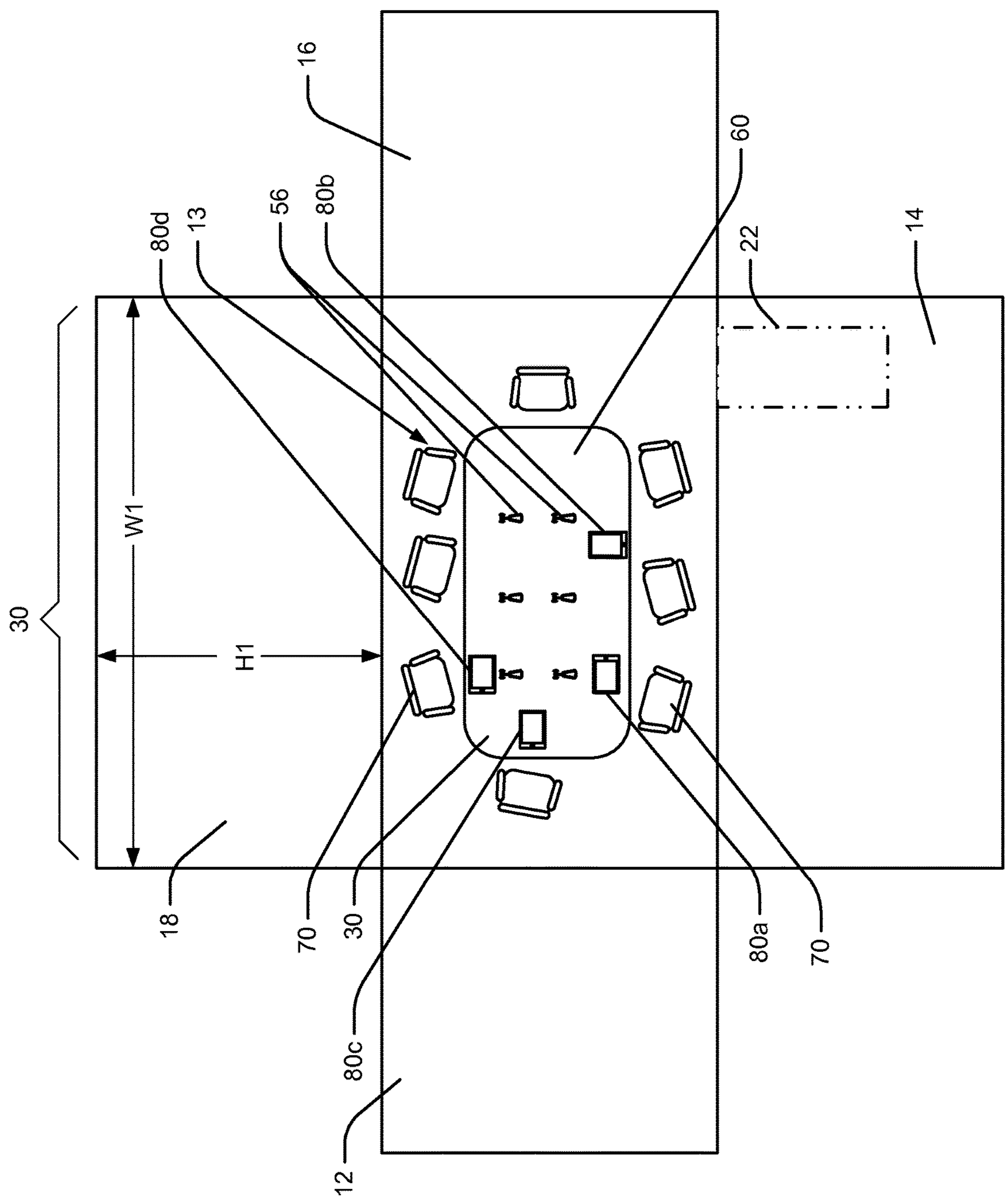
FIG. 2 is a schematic view showing a conference space in plan view and wall surfaces that may be emissive.

Referring still to FIGS. 1 and 2, table 11 is centrally positioned within space 13 and forms a rectangular table top 60 dimensioned to leave space between edges of the top 60 and adjacent walls 12, 14, 16 and 18 for chairs 70 used by conferees. In the illustrated embodiment eight chairs 70 are arranged around table 30 at spaces to be occupied by conferees.

Processor 50 can be any type of computer processor capable of running software to control the system described herein and to drive the emissive surfaces formed by walls 12, 14, 16 and 18 and the emissive surface of door 22. In at least some embodiments processor 50 will take the form of a server for running programs. Processor 50 may be located at the location of the conference space 13 or may be located remotely therefrom and linked thereto via the Internet or some other computer network. While FIG. 1 shows processor 50 dedicated to configuration 10, processor 50 may be programmed to run components associated with several different conferencing spaces 13. In addition, while a single processor 50 is shown in FIG. 1, in some embodiments several processors or servers may operate together to provide all of the features described in this specification.

Referring still to FIG. 1, database 52 is linked to processor 50. Software programs run by processor 50 as well as data generated by the software programs is stored on database 52. Database 52 may be remote from processor 50 and/or from other configuration 10 components or may be located proximate configuration 10.

Access points 56 are located proximate space 13. In the illustrated embodiment in FIG. 1 access points 56 includes four separate access points located within a ceiling structure of configuration 10. In other embodiments the access points may be built directly into structures that form emissive display surfaces. Access points 56 are used to communicate with personal computing devices 80*a*, 80*b*, 80*c*, 80*d*, etc. located within space 13 and to perform various functions. For instance, access points 56 can be used to receive signals from devices 80*a*, etc., and use those signals to identify locations of the devices within space 13 via a triangulation process or the like. In addition, in at least some embodiments the signals can be used to identify orientation of each of the devices 80*a*, etc. To this end, see in FIG. 2 that six additional wireless access points 56 are built into table structure 11. By building the access points 56 into the table structure itself, the access points can be located closer to the personal devices 80*a*, 80*b*, etc., used by conferees and therefore position and orientation data can be more accurately determined. Other sensors for sensing location and orientation of personal devices are contemplated.

Personal devices 80*a*, 80*b*, etc., may take any of several different forms including laptop computers, tablet type computing devices (e.g., tablets from Apple, Samsung, Sony, Amazon, Dell, etc.), smart phones or other palm type computing devices, watch type computing devices, head mounted devices such as the currently available Google Glass goggles, etc. While the personal devices may take any of several different forms, unless indicated otherwise, in the interest of simplifying this explanation, the inventive system will be described in the context of tablet type computing devices 80*a*, 80*b*, etc. having a display screen that measures diagonally anywhere between 4 and 14 inches. In addition, unless indicated otherwise, the system will be described in the context of tablet device 80*a*.

Figure 3:
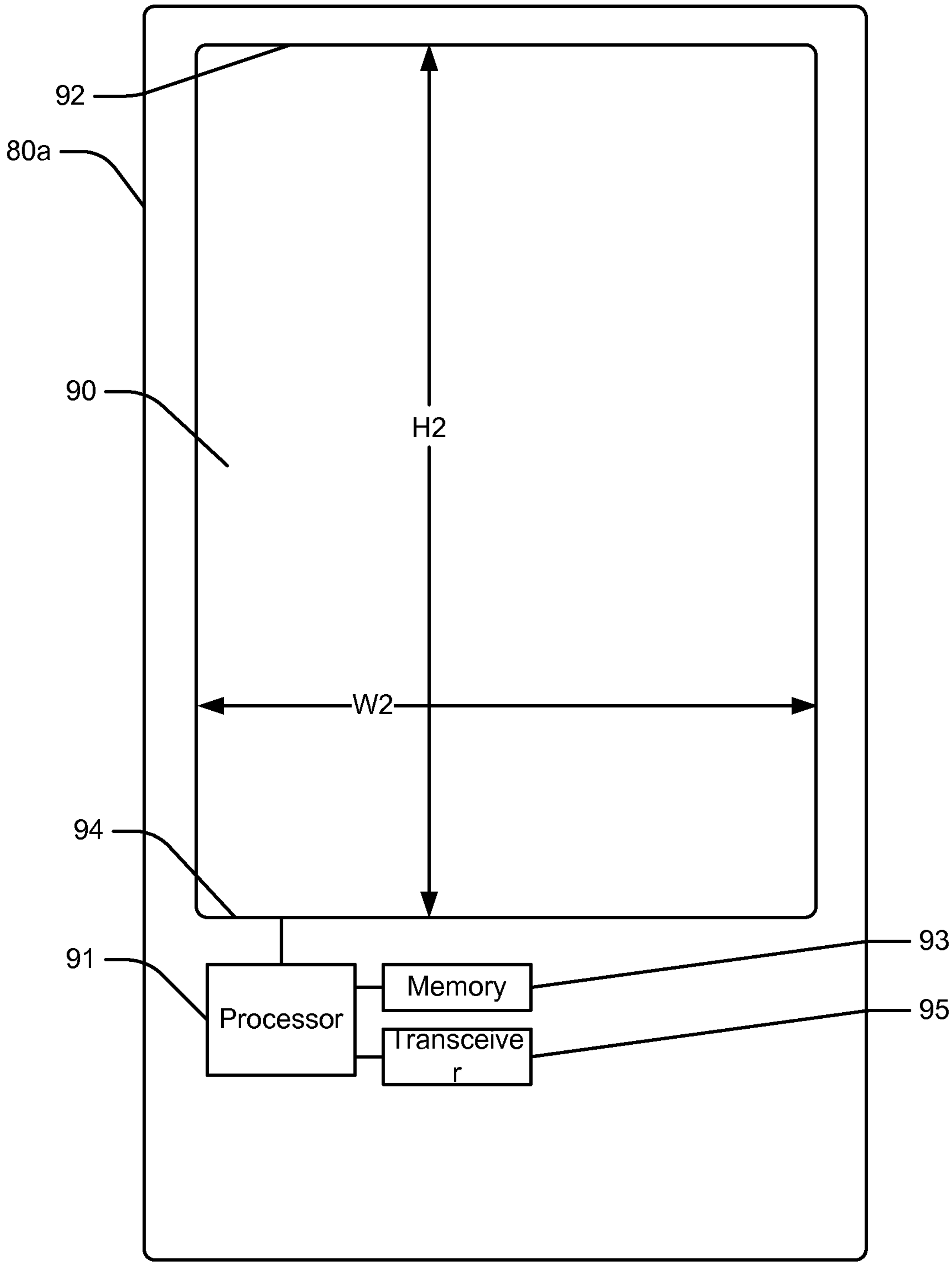
FIG. 3 is a schematic view of a pad type interface device that is consistent with at least some aspects of the present disclosure.

Referring to FIG. 3, device 80*a* includes a display screen 90, a device processor 91, a device memory 93 and a wireless transceiver 95. Processor 91 is linked to each of screen 90, memory 93 and transceiver 95. Memory 93 stores application programs and an operating system run by processor 91 as well as data that is generated by a device user running the operating system and application programs. Processor 91 can communicate with system processor 50 or other personal device processors wirelessly as well known in the wireless communication arts.

Regarding orientation, tablet device 80*a* has a rectangular display screen 90 as shown in FIG. 3 that has a height dimension H2 and a width dimension W2 where height dimension H2 is greater than width dimension W2. The screen 90 operates as both an output device generating digital content by running application programs and as a touch screen input device for interacting with the application programs run by the device 80*a*. As an input device, device 80*a* generates on screen icons and other interface artifacts that can be touched, slid, and otherwise physically contacted to express device user intent.

In operation, a user orients device 80*a* in either a portrait orientation (see FIG. 3) where height dimension H2 is vertical or a landscape orientation (see FIG. 4) where height dimension H2 is horizontal. Device 80*a* includes an orientation determining system which determines if device 80*a* is oriented in the portrait or landscape orientations and then changes the information presented on the display screen to be either portrait or landscape, depending on the device orientation. In portrait, a top edge 92 of a screen interface representation is along a short top edge of screen 90 and all interface content is arranged to face the device user opposite the top edge (e.g., along an interface bottom edge 94). In landscape, a top edge 92 of a screen interface representation is along a long edge of screen 90 and all interface content is arranged to face the device user along the bottom interface edge 94 (see FIG. 4). Hereinafter, unless indicated otherwise, operation of device 80*a* will be described in the content of device 80*a* being oriented in the landscape orientation shown in FIG. 4 where the top edge of the interface presented via display 90 is parallel to dimension H2.

In addition to device 80*a* determining its own portrait or landscape orientation, processor 50 is programmed to determine the orientation of device 80*a* within space 13. For instance, processor 50 may determine that the top edge 92 of the device interface is parallel to wall 18 and closer to wall 18 than is bottom interface edge 94 and therefore that a user of device 80*a* is at least generally facing wall 18. Hereinafter, unless indicated otherwise, in order to simplify this explanation, when device 80*a* is oriented so that it can be assumed that a user of device 80*a* is facing wall 18, it will be said that device 80*a* is oriented to face wall 18 or that device 80*a* faces wall 18. As another instance, processor 50 may determine that the top edge 92 of the device interface is parallel to wall 18 and closer to wall 16 than is bottom interface edge 94 and therefore that device 80*a* faces wall 16. As still one other instance, processor 50 may determine that the top interface edge 92 is parallel to wall 12 and closer to wall 12 than is bottom interface edge 94 and therefore that device 80*a* faces wall 12.

When top interface edge 92 is not parallel to one of the walls 12, 14, 16 or 18, processor 50 is programmed to identify device 80*a* orientation based on best relative alignment of device 80*a* with one of the walls 12, 14, 16 or 18 in at least some embodiments. For instance, where the top interface edge 92 is angled 10 degrees from parallel to wall 18 and is closer to wall 18 than is bottom edge 94, processor 50 identifies that device 80*a* faces wall 18. In at least some embodiments, any time the angle between top interface edge 92 and wall 18 is less than 45 degrees, processor 50 may be programmed to determine that device 80*a* faces wall 18. Similarly, any time the angle between top interface edge 92 and wall 12 is less than 45 degrees, processor 50 may be programmed to determine that device 80*a* faces wall 12, any time the angle between top interface edge 92 and wall 14 is less than 45 degrees, processor 50 may be programmed to determine that device 80*a* faces wall 14 and any time the angle between top interface edge 92 and wall 16 is less than 45 degrees, processor 50 may be programmed to determine that device 80*a* faces wall 16.

In at least some cases it has been recognized that the hardware and software for determining orientation will not be accurate enough to identify orientation down to the degree and therefore, hysteresis may be built into the orientation determining system such that a change in orientation is only identified when the perceived orientation of device 80*a* changes by a predefined amount. For instance, whenever the perceived angle between the top interface edge 92 and wall 18 is less than 20 degrees, processor may be programmed to determine that device 80*a* faces wall 18. The determination that device 80*a* faces wall 18 may persist even after the perceived angle is greater than 30 degrees until the angle is greater than 60 degrees. Thus, after processor 50 determines that device 80*a* faces wall 18, as a device 80*a* user turns device 80*a* to face wall 12, until the angle between top interface edge 92 ad wall 12 is less than 30 degrees, processor 50 may be programmed to continue to determine that device 80*a* faces wall 18. Here, the 60 degree hysteresis would apply to any previously determined orientation.

In the above description, processor 50 is described as able to distinguish four different device 80*a* orientations including facing wall 12, facing wall 14, facing wall 16 and facing wall 18. In other embodiments processor 50 may be programmed to distinguish more than four orientations. For instance, in some cases processor 50 may be able to distinguish eight orientations including facing any one of four walls 12, 14, 16 and 18 or "facing" any one of the four corners of space 13, based on eight ranges of angular orientation. More granular orientation determination is contemplated.

Regarding location determination, referring to FIG. 2, four separate devices 80*a* through 80*d* are illustrated. Processor 50 is programmed to determine device location within space 13 relative to walls 12, 14, 16 and 18. Location determination may be relatively terse or granular. For instance, in some cases location may be determined to be within an upper left quadrant of space 13, a lower left quadrant of space 13, an upper right quadrant of space 13 and a lower right quadrant of space 13. In other cases location may be determined on a virtual square foot grid within space 13, on a location by location basis about table 11, etc.

Thus, processor 50 is programmed to determine device location within space 13 as well as device orientation (e.g., which wall or general direction a device faces). As a device is moved or reoriented within space 13, processor 50 continues to receive signals from access points 56 or other sensing devices associated with space 13 and updates location and orientation essentially in real time or at least routinely for each device used in space 13.

Referring once again to FIG. 2, in at least some embodiments it is contemplated that a device 80*a* can be used to share digital content via the emissive surfaces of walls 12, 14, 16 and 18 with conferees within space 13. In this regard, device 80a may run a conferencing application in parallel with a sharing application run by processor 50 to allow device 80a content to be duplicated on one or more of walls 12 through 18 when controlled by a device user to share. For instance, during a conference among eight people arranged about table 11, a conferee using device 80a may be running a computer aided design (CAD) application to view and modify a CAD drawing on the screen of device 80a and may decide to share that CAD drawing with the other conferees.

While the conferee wants to share the drawing and has plenty of emissive surface circumscribing space 13 on which to share, absent some intuitive way to duplicate the output of the CAD application on some portion of the emissive surface, the conferee would be completely confused. For instance, how could the CAD drawing be duplicated on a portion of the emissive surface? If the drawing were to be duplicated, how could the sharing conferee place the drawing at an optimal location for sharing with others in space 13? Once the drawing is duplicated, how could the drawing be moved from one location to another on the emissive surfaces? How could the sharing conferee control the CAD application once the drawing is shared to change the appearance of the drawing?

In at least some embodiments, when device 80a runs the conferencing application, device 80a will provide an intuitive and oriented interface for sharing content. To this end, prior to using a device 80a to control content within space 13, a sharing or conferencing application would be downloaded onto device 80a. Thereafter, when the application is run on device 80a, the application would generate an oriented interface on the device 80a screen. In some cases the conferencing application would be run by manual selection of the application on the device. In other cases, the system may be set up so that whenever device 80a is located within space 13, the application is automatically run to provide the oriented interface. In still other cases when device 80a is in space 13, the application may prompt the device user via the device screen to indicate whether or not the user would like the application to provide the oriented interface.

Figure 4:
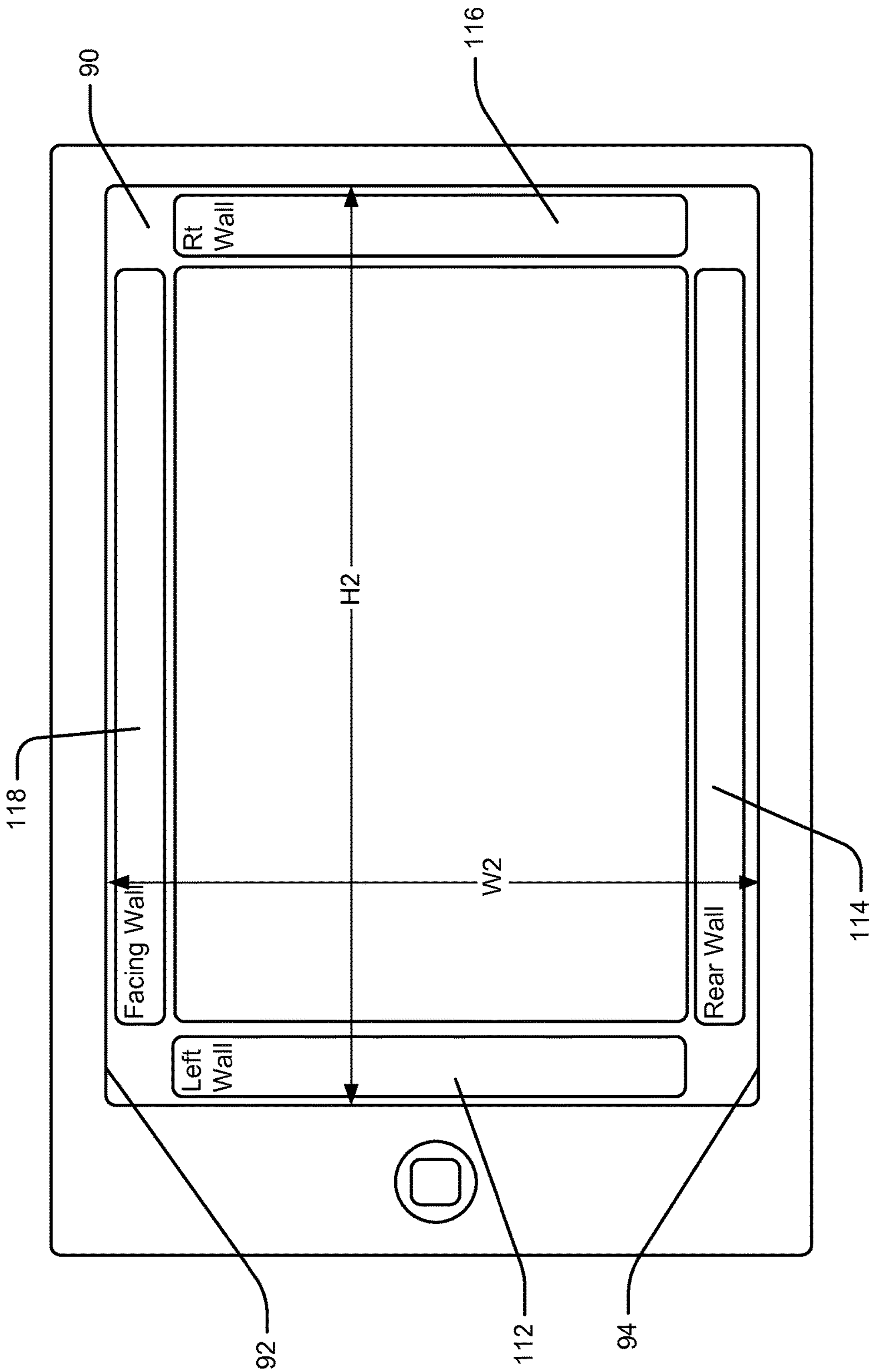
FIG. 4 shows an interface device of FIG. 3 with fields corresponding to conference space walls.

One exemplary oriented interface is shown in FIG. 4. When an application (e.g., a CAD application, any application other than the conferencing application) is run on device 80a, the application generates output presented to a device 80a user as a graphical interface on the device display screen. The conferencing application generates an additional oriented interface to be added to another application interface to enable control of application sharing within space 13. In FIG. 4, output of a general application run by device 80a is provided in a central and relatively large general application space 100. The output in space 100 is essentially identical to the output of the general application that would be generated by the general application if the conferencing application was not running in parallel. Thus, in the case of a CAD application, if the conferencing application were not running simultaneously, the CAD application output would be output on the entire space of screen 90. Once the conferencing application is run in parallel with the CAD application, the output of the CAD application is presented in space 100 in a slightly smaller version so that a frame space exists around space 100 on screen 90.

Referring still to FIG. 4, the exemplary conferencing application interface generates content to populate the frame portion of screen 90 that circumscribes space 100. In FIG. 4 the conferencing application interface generates wall fields 112, 114, 116 and 118 about space 100 with a left field 112 to the left of space 100, a rear field 114 below space 100, a right field 116 to the right of space 100 and a front field 118 to the top of space 100. The fields 112, 114, 116 and 118 include a separate field for each of the conferencing space walls 12, 14, 16 and 18.

Which wall field is associated with each of the walls 12, 14, 16 and 18 is a function of the orientation of device 80a within space 13. For instance, referring to FIGS. 2 and 4, if device 80a is oriented to face wall 18 (i.e., with top interface edge 92 substantially parallel to wall 18 and nearer wall 18 than is lower interface edge 94), front field 118 will be associated with wall 18, rear field 114 will be associated with wall 14 and left and right fields 112 and 116 will be associated with walls 12 and 16, respectively. As another instance, if device 80a is oriented to face wall 14 (i.e., with top interface edge 92 substantially parallel to wall 14 and nearer wall 14 than is lower interface edge 94), front field 118 will be associated with wall 14, rear field 114 will be associated with wall 18 and left and right fields 112 and 116 will be associated with walls 16 and 12, respectively. As still one other instance, if device 80a is oriented to face wall 12 (i.e., with top interface edge 92 substantially parallel to wall 12 and nearer wall 12 than is lower interface edge 94), front field 118 will be associated with wall 12, rear field 114 will be associated with wall 16 and left and right fields 112 and 116 will be associated with walls 14 and 18, respectively.

Figure 5:
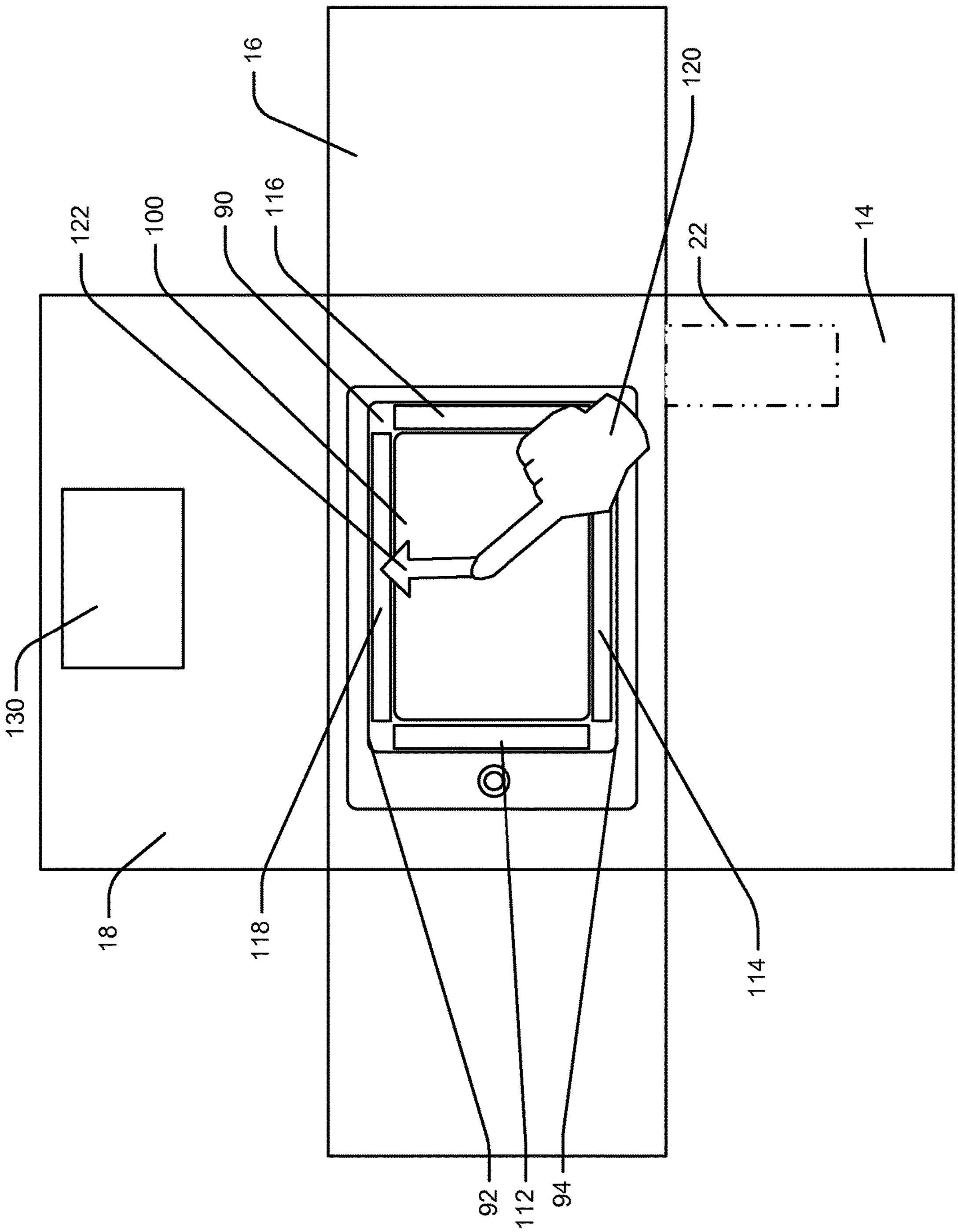
FIG. 5 shows an exemplary interface device like the one shown in FIG. 4 within a conference space schematic like the one shown in FIG. 2.

In FIG. 5 and several other figures described hereafter, device 80a and other personal devices are shown in an enlarged view within space 13 to simplify this explanation. In FIG. 5 device 80a is oriented to "face" wall 18 and therefore field 118 is associated with wall 18 and fields 112, 114 and 116 are associated with walls 12, 14 and 16, respectively. In FIG. 5, the conferencing application causes device 80a to monitor specific touch gestures on screen 90 that indicate an intent to share content from space 100 on walls 12, 14, 16 and 18. More specifically, in FIG. 5, a swiping action from within space 100 associated with content to be shared in one of fields 112, 114, 116 or 118 causes content from space 100 to be duplicated on a wall associated with the field 112, 114, 116 or 118 swiped to. For instance, in FIG. 5, the hand of a device user is shown at 120 and a swiping action from within space 100 to field 118 is indicated by arrow 122. Once swipe 122 is sensed by device 80a, device 80a wirelessly transmits content from within space 100 to processor 50 via access points 56 along with a command signal indicating that the transmitted content should be duplicated on the wall associated with the swiped to field 118.

While FIG. 5 shows a swiping action that ends in filed 118, in some embodiments the fields 112, 114, 116, 118, etc. are only provided to help orient a device 80a user and a swiping action may not need to end in one of the fields to be effective. For instance, in FIG. 5, if the swipe associated with arrow 122 was in the direction of filed 118 but stopped short thereof, device 80a may recognize the swipe as an indication to replicate device 80a content on the wall associated with field 118.

Processor 50, continuously tracking and re-determining the location and orientation of device 80a within space 13 and uses the content received from device 80a to replicate content on the wall indicated by the device user. For instance, in the example above where device 80a faces wall 18 and the device user drags or swipes content from space 100 to field 118, the content would be replicated on wall 18 as shown in FIG. 5 at 130.

In FIG. 5, it can be seen that, in at least some embodiments, when content is presented via wall 18, the content is presented in a manner wherein the content does not take up the entire surface of wall 18. Instead, the content is presented in a content field 130 that only occupies a portion of the wall space. More specifically, the area of content field 130 is limited for several reasons so that the content is not displayed in as large a format as possible. First, by limiting the size of content field 130, the content is presented in a size that is considered to be most suitable for viewing by conferees within space 13. To this end, consider a case where content from a device display screen 90 is presented in a fashion which takes up the entire space of large wall 18 and where conferees are only located a few feet away from wall 18 and, in some cases, right next to wall 18 (e.g., conferees sitting in chairs immediately adjacent wall 18). In this case, perceiving the content that fills the entire space of wall 18 would be difficult at best for conferees in space 13.

Second, it has been recognized that if content fills the entire surface of wall 18, content presented on the lower portion of wall 18 would not be viewable by conferees on the other side of conference table 11 (e.g., adjacent wall 14 in FIG. 2). For this reason, to maintain the appearance of content between the content from device 80*a* and the content duplicated on wall 18 while rendering the wall content visible to all conferees in space 13, the wall content dimensions need to be limited to fit within the portion of wall generally above the height of table 11. For instance, where wall 18 has a height dimension H1 (see FIG. 2) of nine feet and the height of table 11 is 32 inches, the height dimension of the content presented on wall 18 should be a maximum of approximately 6½ feet and the width dimension should be limited based on the height dimension.

Third, it has been recognized that, while large amounts of information can be presented via wall size displays and via an emissive room like the one described above, people generally think in relatively small quantities of information. For instance, when thinking through a project, often times conferees will make a high level list of topics to consider and then take each of the high level topics and break the topic down into sub-topics. In complex cases, one or more of the sub-topics will then be broken down into basic concepts or ideas to be worked out. Here, each list of topics, sub-topics and concepts is usually relatively small and can be presented in as a subset of information on a portion of an emissive wall surface in an appropriate size for viewing.

Fourth, by presenting content in a content field that only takes up a portion of the entire emissive wall surface, other similarly dimensioned content fields may be presented on a wall surface simultaneously with a first content field enabling more than one conferee to place content to be shared on the wall surface at the same time. For instance, it may be that two, three or more conferees would like to share information from their device spaces 100 at the same time. For example, where the conferees include three regional sales managers that want to share quarterly sales results with each other, three content fields 130, 130*a* and 130*b* may be provided on the wall 18 surface (see FIG. 7).

The process for creating three content fields 130, 130*a* and 130*b* may be as follows. Referring again to FIG. 5, a first device 80*a* user may move content from space 100 to field 118 on device 80*a* to create content field 130 on wall 18 and to duplicate content from space 100 in field 130. When only a single field 130 is presented via wall 18, a default may cause the single field to be placed centrally on the surface of wall 18 as a central field would likely be optimally positioned for viewing by conferees within space 13. In other cases the default may place the content field adjacent a left edge on wall 18 or in some other default location.

Figure 6:
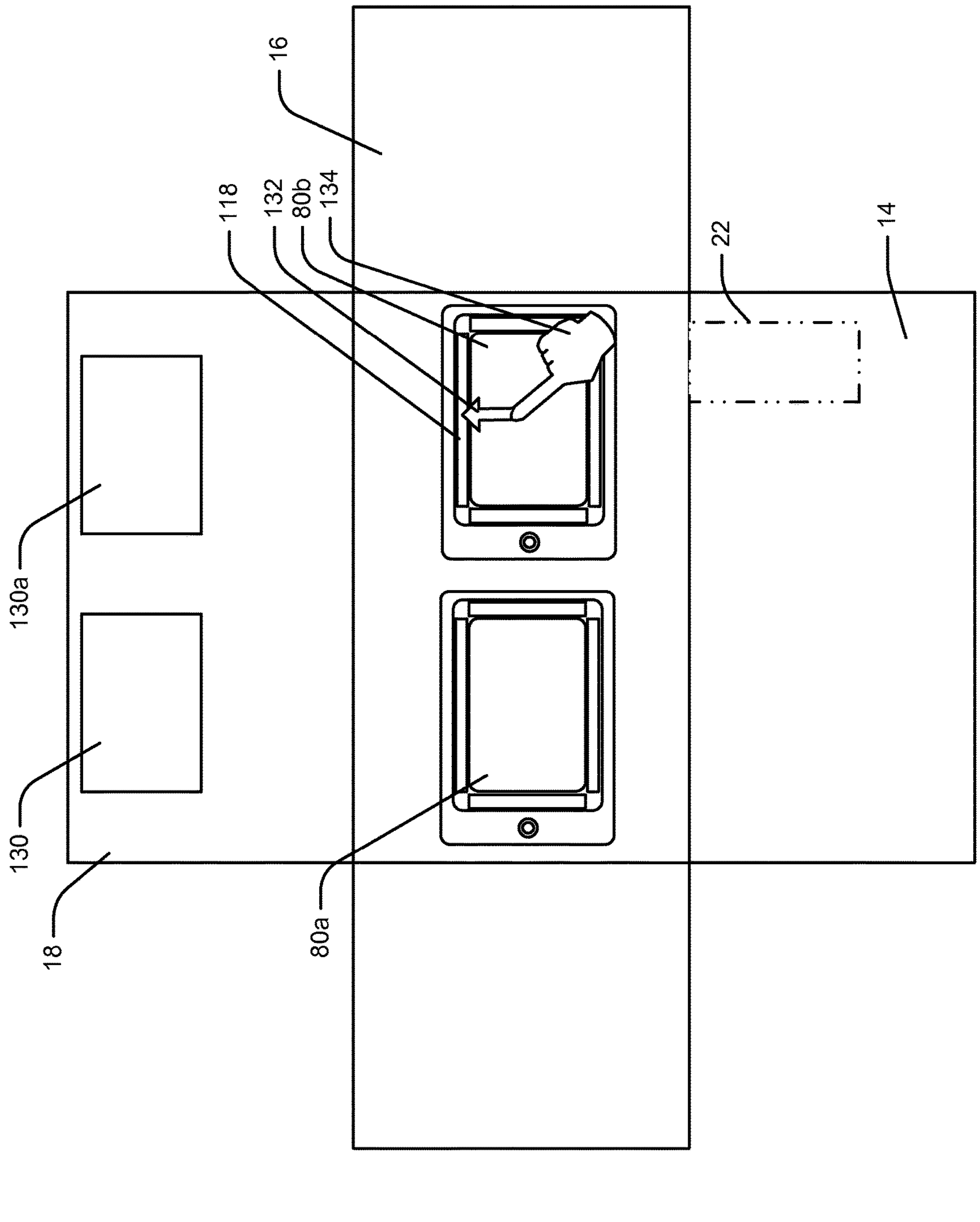
FIG. 6 is similar to FIG. 5, albeit showing two interface devices and content fields on one of the walls of a conference space.

Next, while content is displayed in field 130, referring to FIG. 6, a second device **8*ba* user may perform similar steps to move content (see swipe arrow 132 and hand 134 in FIG. 6) from device 80***b* to a field 118 on device 80*b*, causing device 80*b* to send a command to processor 50 to create a second content field 130*a* and to send the content to processor 50 wirelessly. When the command and content is received by processor 50, processor 50 creates a second content field 130*a* on wall 18 and duplicates the content from device 80*b* in the second content field 130*a*. When the second field 130*a* is created, as shown in FIG. 6, first content field 130 may be moved to one side to accommodate field 130*a* so that the content fields 130 and 130*a* are substantially equispaced along the width of wall 18 for optimal viewing by conferees in space 13.

Figure 7:
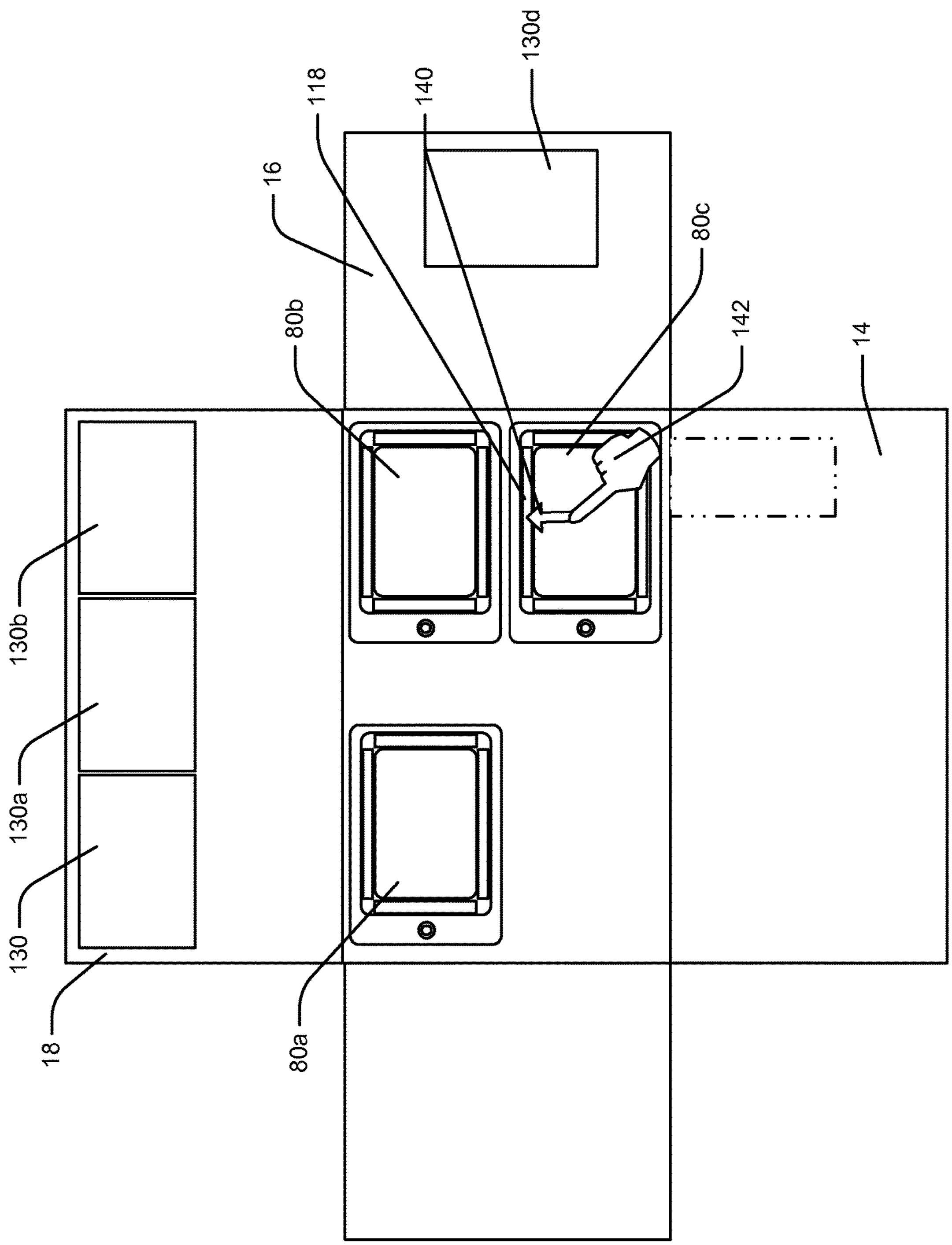
FIG. 7 is similar to FIG. 6, albeit showing three interface devices and content on two conference walls.

Continuing, while content is displayed in fields 130 and 130*a*, referring to FIG. 7, a third device 80*c* user may perform similar steps to move content (see swipe arrow 142 and hand 140 in FIG. 7) from device 80*c* to a field 118 on device 80*c*, causing device 80*c* to send a command to processor 50 to create a third content field 130*b* and to send the content to processor 50 wirelessly. When the command and content is received by processor 50, processor 50 creates the third content field 130*b* on wall 18 and duplicates the content from device 80*c* in the third content field 130*b*. When the third field 130*b* is created, as shown in FIG. 7, first content field 130 and second content field 130*a* may be moved to left to accommodate field 130*b* so that the content fields 130, 130*a* and 130*b* are substantially equispaced along the width of wall 18 for optimal viewing by conferees in space 13.

In some cases the content in a field 130, 130*a*, etc., may be static so that the content reflects the content that was moved into field 118 by a device 80*a*, 80*b*, etc., user. In other cases the content in each or a subset of the fields 130, 130*a*, 130*b* may be dynamic and may be automatically and essentially in real time updated as the content in spaces 100 on devices 80*a*, 80*b*, etc., is modified by device users using devices 80*a*, 80*b*, etc. For instance, where a first device user 80*a* initially creates content field 130 in FIG. 7, as the first device user changes content in device space 100 (see again FIG. 4), the changing content may be transmitted to processor 50 and used by processor 50 to drive the content window associated with device 80*a*.

Where content in a content field 130 is static, in at least some embodiments a device user 80*a* may be able to create more than one content field 130 on wall 18 by dragging a second set of content to field 118 subsequent to dragging a first set of content to field 118. For instance, in FIG. 5, assume device user 80*a* created content field 130 using a first application program at a first time and that one minute later device user 80*a* uses a second application program to generate content on device 80*a* and to move the second application program content to north wall field 118. Referring also to FIG. 6, the act of moving the second application program content to field 118 may cause device 80*a* to transmit the second application program content to processor 50 along with a command to generate a new content field on wall 18 causing processor 50 to move field 130 left and create the second content field 130*a* as illustrated. Third, fourth and many other content fields may be generated by a single device user in this fashion.

In some embodiments, even when the content in fields 130, 130*a*, etc., is dynamic (e.g., a continuous video clip, output of a controllable application program, etc.), a single device 80*a* may create and control two or more content field on wall 18. Thus, for instance, referring again to FIG. 6, each of fields 130 and 130*a* may have been created via device 80*a* and a video may be presented via field 130 while the output of an application program is presented via field 130*a*.

Figure 8:
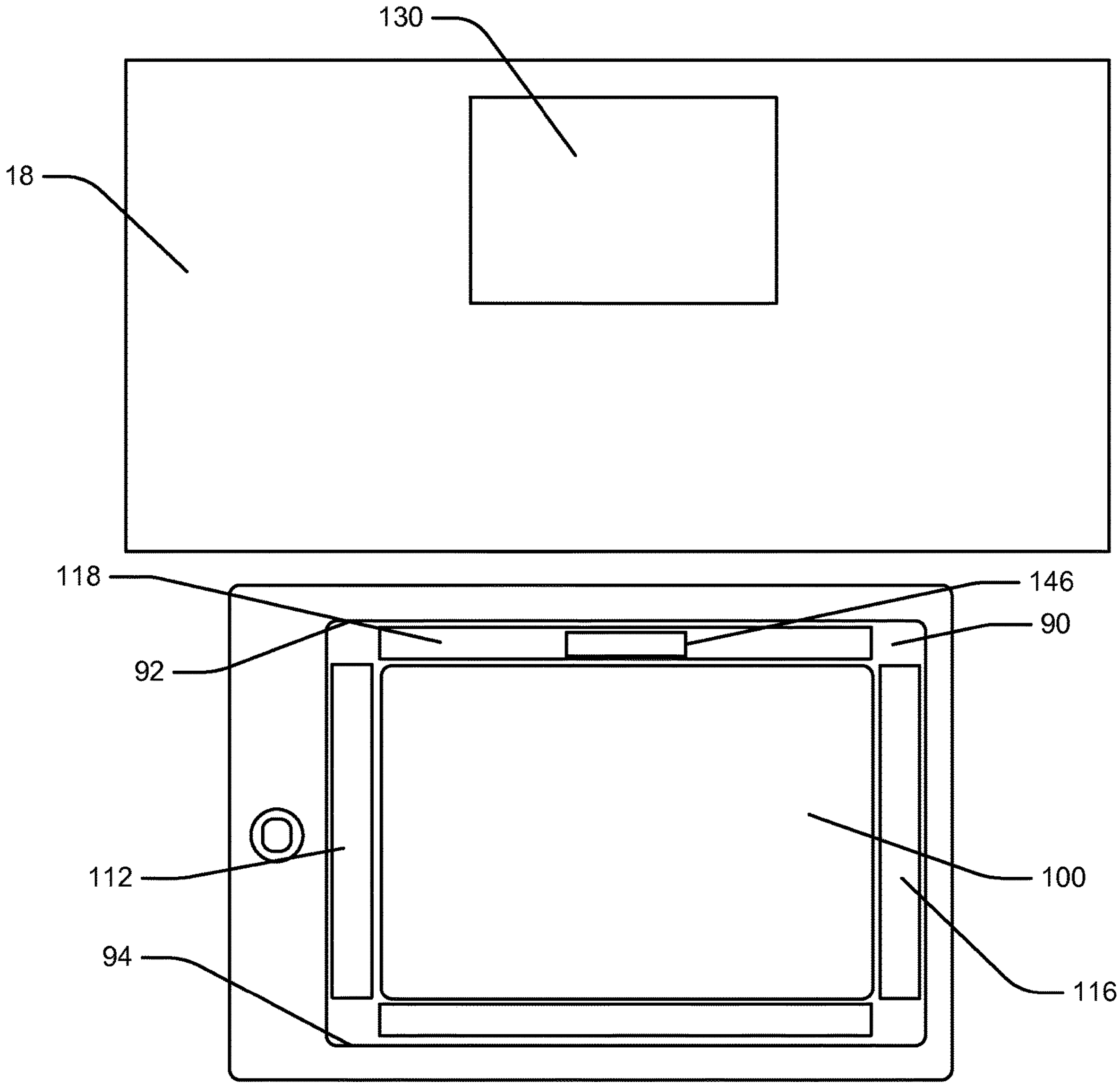
FIG. 8 shows an interface device like the one shown in FIG. 4 and a single conference space wall.

When a content field is added to wall 18, in at least some embodiments the interface on each of the tablet device displays (e.g., on devices 80*a*, 80*b*, 80*c*, etc.) may be modified to reflect the change in displayed wall content. To this end, device 80*a* is shown in FIG. 8 along with north wall 18 where single content field 130*a* is shown on wall 18. A content field icon 146 is presented in front wall field 118 that corresponds to content field 130 on wall 18. While icon 146 is shown as a simple elongated rectangle, in other embodiments icon 146 may include a dynamic thumbnail icon that includes a small but distinguishable version of the content in field 130. In other embodiments icon 146 may appear as a simple rectangle and may change appearance to show a thumbnail when a device 80*a* user selects field 118 by contacting field 118 with a finger tip, moving a pointing icon (e.g., a mouse controlled pointing icon) into space 118 or in some other fashion.

Figure 9:
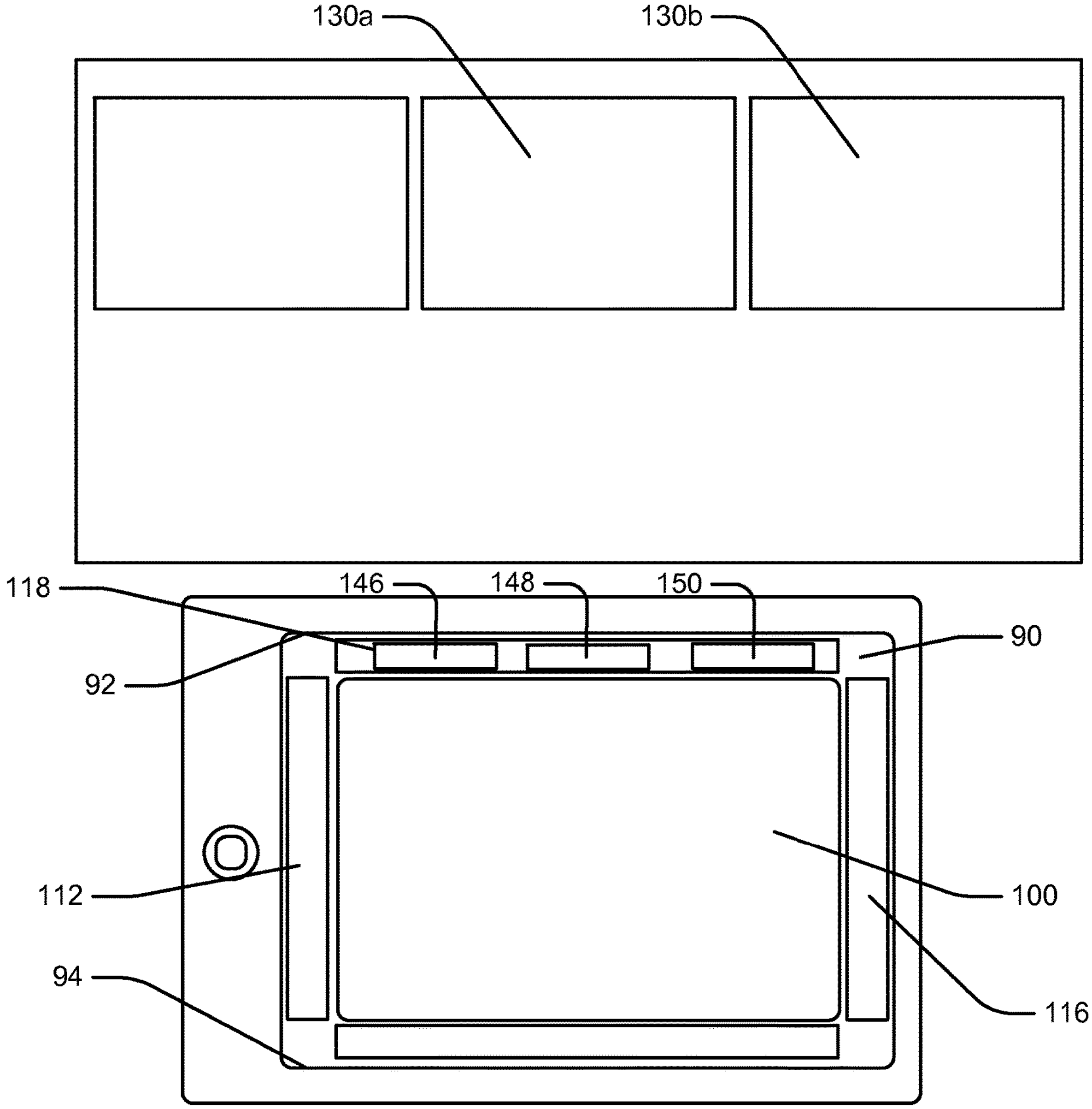
FIG. 9 is similar to FIG. 8, albeit showing a different set of content on the conference wall and associated control tools on the interface.

Referring again to FIG. 7 and also to FIG. 9, when second and third content fields 130*a* and 130*b* are added to wall 18, second and third content field icons 148 and 150 may be added to north wall field 118. Here, field icons 146, 148 and 150 may be located to reflect their locations on wall 18. Thus, in FIG. 9, icons 146, 148 and 150 are shown equispaced within field 118 to reflect positions of associated content fields 130 130*a* and 130*b*, respectively, on wall 18.

In at least some embodiments there may be a limit to the number of content fields that may be presented via a wall 18. For instance, in FIG. 7 it can be seen that for the size of content field shown, wall 18 can only accommodate three fields 130, 130*a* and 130*b*. In at least some cases, when a maximum number of content fields are presented on a wall 18 and another device (e.g., 80*a*, 80*b*) is used to attempt to create yet another content field, the content presented in an oldest content field on the wall may be replaced with content from the device used to attempt to create the new field. For instance, in FIG. 7, if field 130 is the oldest field on wall 18 and device 80*c* is used to attempt to create a fourth field on wall 18, the content from device 80*c* may be used to replace content in field 130 (i.e., the oldest content presented on wall 18).

Figure 10:
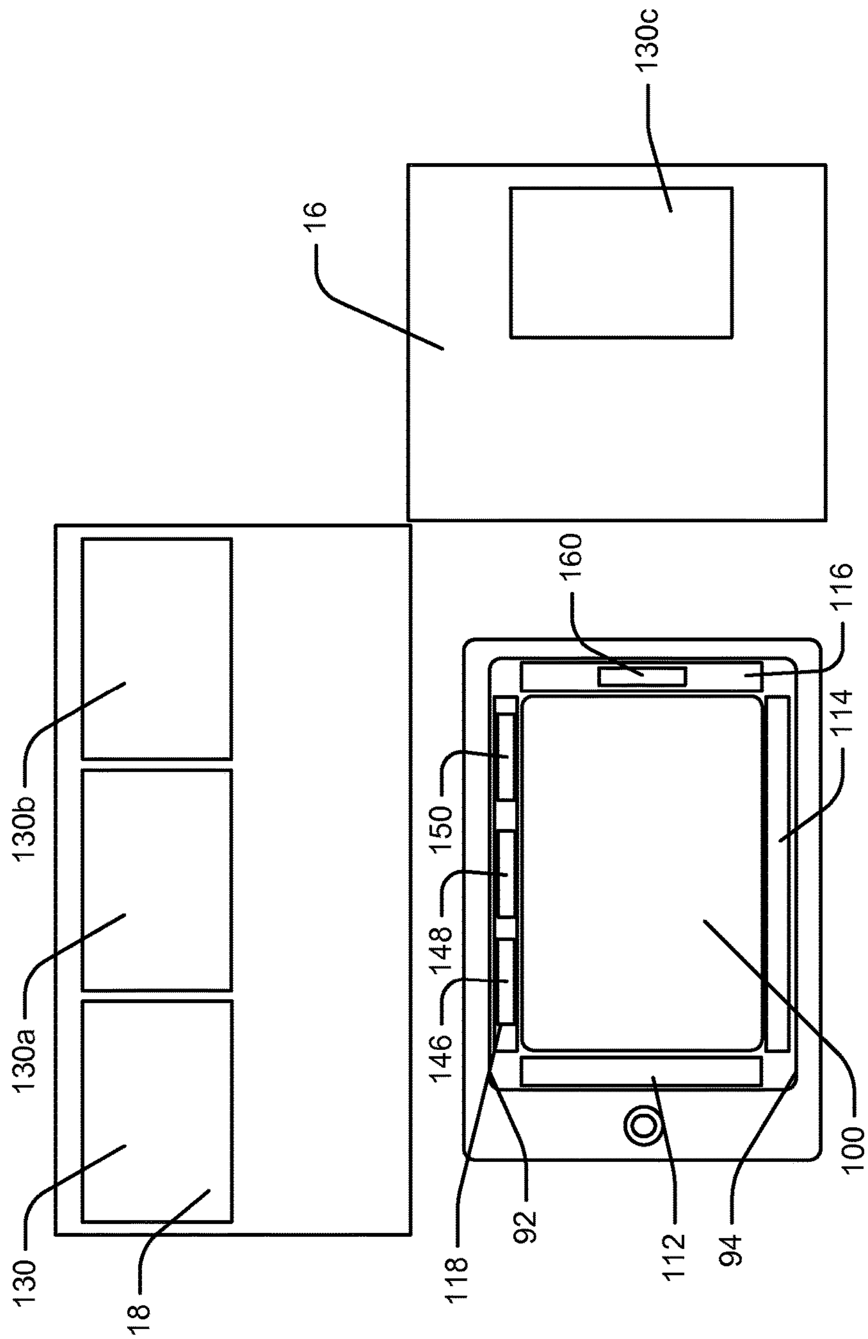
FIG. 10 is similar to FIG. 9, albeit showing content on two walls and control interface tools corresponding to the content on the walls.

In other embodiments an attempt to create an additional content field on a wall 18 in a conference space that includes one or more additional emissive walls (e.g., see 12, 14 and 16 in FIG. 2) will result in creation of an additional content field 130*c* on one of the other emissive walls. For example, in FIG. 7, when device 80*c* is used to attempt to create a fourth content field on wall 18, the additional content field 130*c* is created on wall 16 as wall 18 already includes the maximum number of content fields. Referring to FIG. 10, a content field icon 160 is added to the left wall field 116 of each device 80*a*, 80*b*, etc., interface in space 13 to reflect the newly added content field 130*c*. As additional content fields are created, the fields would be added to the space walls 12, 14 and 16 until the maximum number of content fields are created on the walls.

In at least some embodiments the device interfaces will also enable device users to take control of or change the content presented in content fields previously created on one or more of the emissive wall surface. For instance, referring again to FIG. 10 where fields 130, 130*a*, 130*b* and 130*c* already exist on walls 18 and 16, a device 80*a* user may replace content in any of the existing content fields by simply dragging or swiping content from general application space 100 into or toward any one of the content field icons 146, 148, 150 or 160. When content is dragged into or swiped toward field icon 146, device 80*a* transmits the new content to processor 50 along with a command to replace content in associated content field 130 on wall 18 with the new content. In at least some cases users of all devices 80*a*, 80*b*, 80*c*, etc., will have the ability to take control of any existing content window in the fashion described above so that a system that supports egalitarian control of the content in the content fields results.

Thus, referring again to FIG. 8, with single content field 130 created, device user 80*a* may either create an additional content field (see 130*a* in FIG. 6) on wall 18 for presenting additional content in a second content field or may replace the content in first field 130 with content from general application space 100. Here, to distinguish between the user's intention, when content from space 100 is dragged to (or swiped toward) an area in frame 90 outside content field icon 146, a second content field 130*a* will be created and the new content will be replicated in the new field 130*a* and when content from space 100 is dragged to icon 146, the new content in space 100 will be used to replace content in content field 130.

Figure 11:
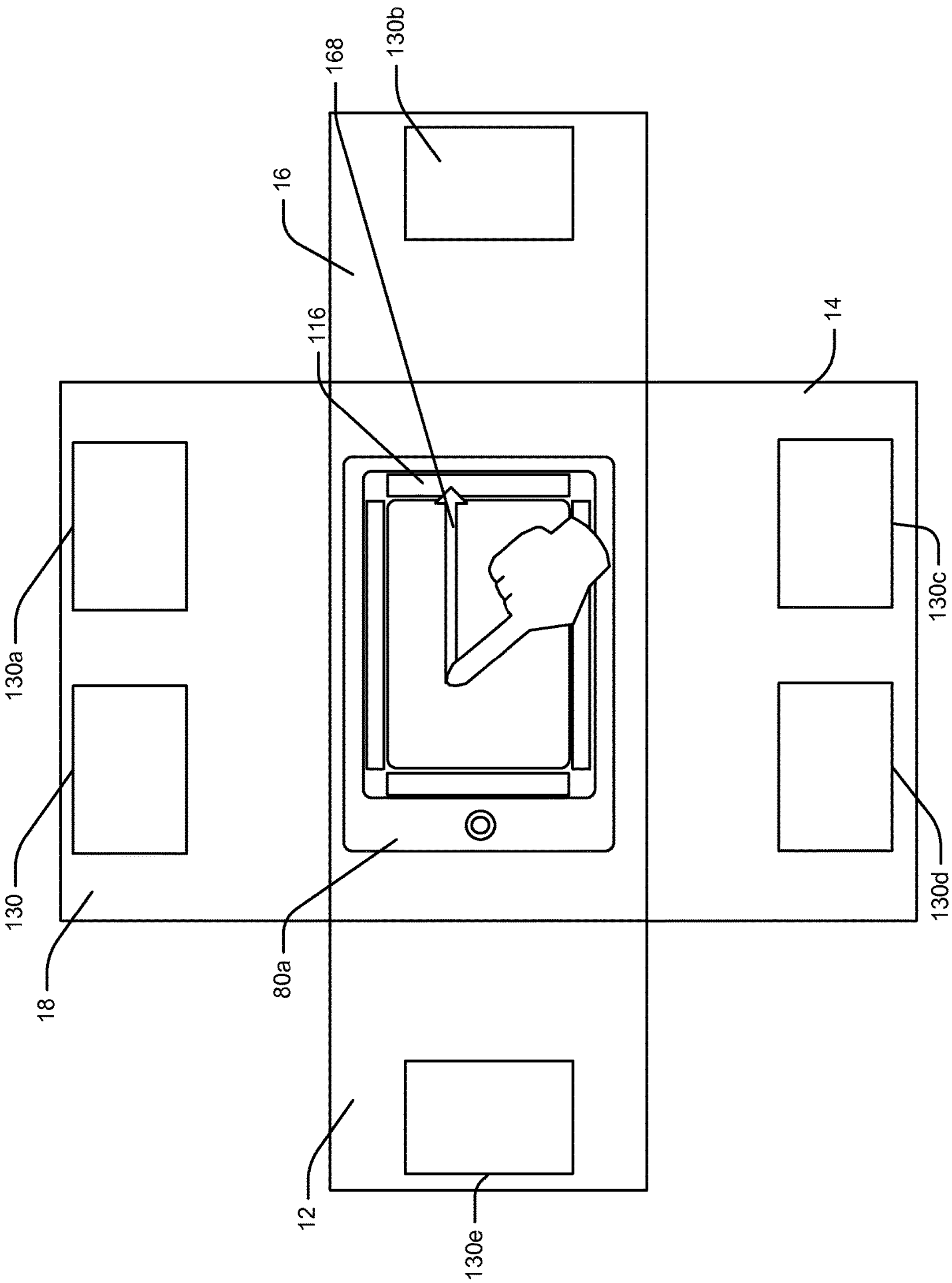
FIG. 11 is similar to FIG. 10, albeit showing four conference space walls and an interface device being used to interact therewith.

Referring to FIG. 11, in addition to creating content fields on wall 18 via directional swiping, dragging or other action to indicate north wall field 118, a device 80*a* user can create one or more content fields on any other emissive wall in space 13 via actions that associate content with other interface fields 112, 114 or 116. For instance, to create a content field 130*b* on wall 16 in FIG. 11, a device 80*a* user may drag content from space 100 to field 116 as shown by dragging or swiping action arrow 168. Other similar actions to associate content with interface fields 112 and 114 may be used to create additional content fields on walls 12 and 14, respectively. In FIG. 11, additional content fields are labeled 130*c*, 130*d* and 130*e*. Again, any device 80*a*, 80*b*, etc., may be used to create additional content fields in at least some embodiments.

In at least some cases the system may enable a device 80*a* user to duplicate the same content on two or more emissive surface portions of walls 12, 14, 16 and 18. For instance, referring again to FIG. 11, while content is presented in space 100, device 80*a* user may consecutively drag that content into each of wall fields 112, 114, 116 and 118 to create content fields with the same content on each of walls 12, 14, 16 and 18. With the same content on all of the walls 12, 14, 16 and 18, conferees about table 11 (see again FIGS. 1 and 2) can all view the same information irrespective of orientations of the conferees within space 13.

In some embodiments it is contemplated that in one operating mode, when content is moved to a wall via a device 80*a*, if a maximum number of content fields presentable via walls 12, 14, 16 and 18 has not been reached, content fields and their content may be repeated on two or more walls for viewing by conferees. Here, as additional content is shared, the content previously duplicated would be replaced by new content. In other embodiments it is contemplated that all content fields may be duplicated on all or sub-sets of space walls 12, 14, 16 and 18. For instance, it may be that in one mode a maximum of three different content fields is supported where all three fields are presented via each of the four walls 12, 14, 16 and 18 that define space 13. In other embodiments it may be that a maximum of six content fields is supported where first through third content fields are presented via walls 16 and 18 and fourth through sixth content fields are presented via walls 12 and 14 and where any content placed in the first content field is duplicated in each first content fields, content in the second field is duplicated in each second field, etc.

Figure 12:
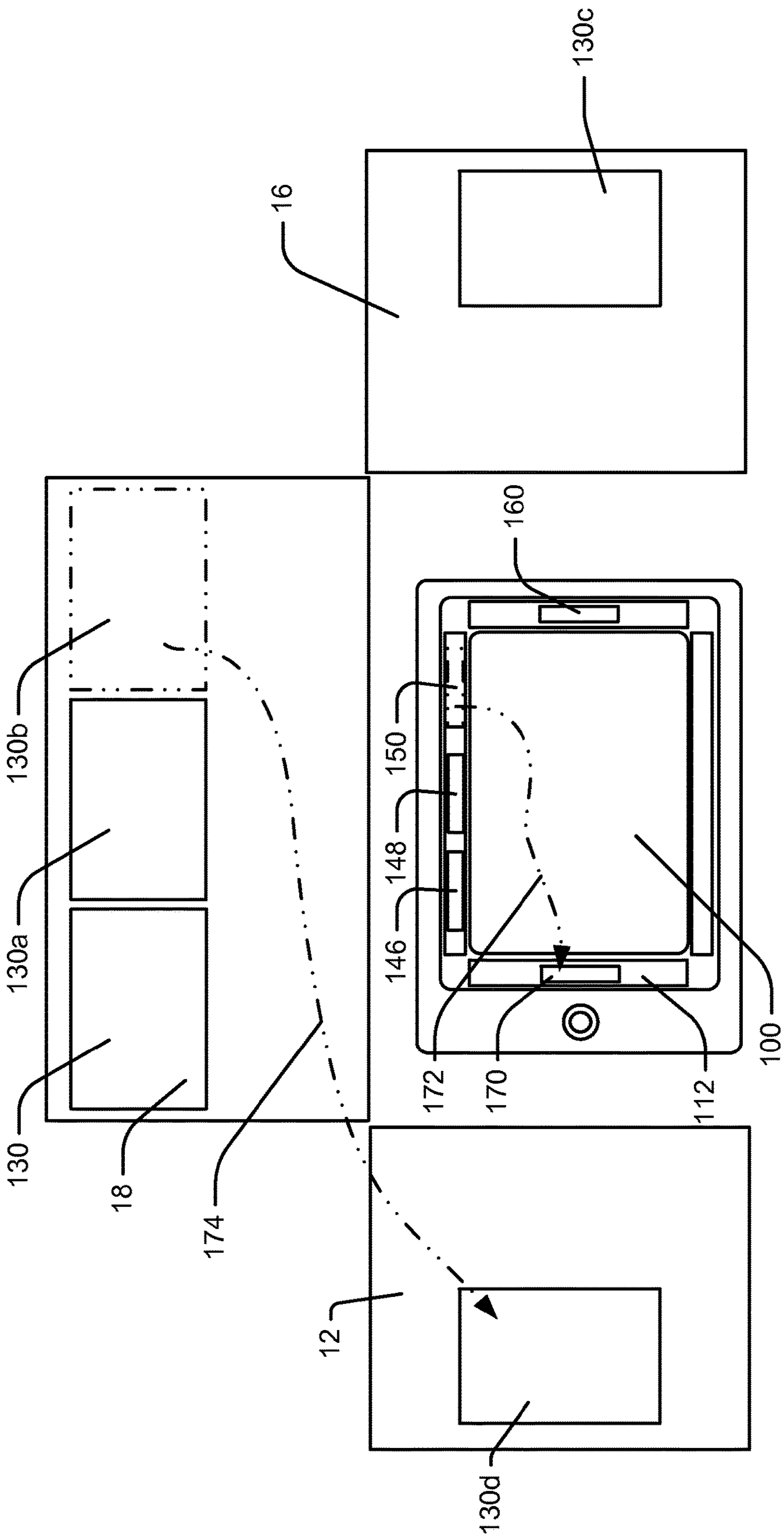
FIG. 12 is similar to FIG. 11, albeit showing an action to move content from one conference space wall to another using an exemplary interface device.

Once fields are created on one or more walls 12, 14, 16 and 18, devices 80*a*, 80*b*, etc., may be used to move content around among content fields as desired. For instance, referring to FIG. 12, the content from content field 130*b* may be moved to wall 12 by selecting icon 150 on device 80*a* and dragging that icon to field 112 to create icon 170 and to cause processor 50 to move content field 130*b* to the location shown at 130*d* in FIG. 12 (see associated moves indicated by dashed arrows 172 and 174). In FIG. 12 field 130*b* is shown dashed to indicate removal from wall 18 when field 130*d* is created. Any device 80*a*, 80*b*, etc., may be used to move content fields on the emissive walls.

In FIG. 12, after the move indicated by arrow 172, a device 80*a* user may move other content from one of the content field icons in fields 114, 116 or 118 to field 112 and either create a second content field icon (not shown) in field 112 or replace the content associated with icon 170. To create a second content field icon in field 112, the user would drag or swipe from one of the content field icons in one of fields 114, 116 or 118 to an open space in field 112 (e.g., a space not associated with icon 170). To replace the content associated with content field icon 170 with other content from another content field icon, the user would drag or swipe from one of the content field icons in one of fields 114, 116 or 118 to icon 170.

In at least some embodiments, content fields may be automatically resized as the number of content fields is changed. For instance, when only one content field 130 (see FIG. 5) is presented on wall 18, the size of field 130 may be relatively large compared to when a second and then a third content field are added to the wall 18. Thus, fields 130, 130*a*, etc., may be optimally sized as large as possible given the number of fields to be included on a wall.

In other embodiments device 80*a*, 80*b*, etc., users may manually change the sizes of content fields 130, 130*a*, etc., via the device interfaces. For instance, when content in a field 100 is replicated in a wall content field 130, a specific gesture on the device 80*a* screen may cause the size of field 130 and content therein to expand or contrast. For example, the familiar two finger "touch and separate" gesture on tablet devices today that results in increasing the size of content on a tablet type device screen, if applied to content in field 100, may result in increasing field 130 dimensions and content size in field 130 with or without changing the appearance of the content in field 100. A similar two finger "touch and pinch" gesture in field 100 may result in reducing field 130 dimensions. Where field 130 or other field dimensions are changed, the change may cause the field 130 to overlap adjacent fields (e.g., 130*a*, 130*b*, etc.) In other cases the change may cause server 50 to move the adjacent fields to different locations on one or more of the wall surfaces to avoid overlap between the content fields. Where overlap occurs or where content fields are moved to accommodate changes in field dimensions, locations and perhaps sizes of content field icons in fields 112, 114, 116 and 118, in at least some cases, are automatically changed to reflect orientations of the content fields with respect to different devices 80*a*, 80*b*, etc.

While device 80*a*, 80*b*, etc., interfaces will operate in similar fashions, in at least some embodiments the interfaces will be oriented differently depending on the orientations of the devices within space 13. For instance, referring to FIG. 13, two devices 80*a* and 80*b* are shown in space 13. While devices 80*a* and 80*b* have similar hardware constructions, device 80*b* has an orientation that is rotated 180 degrees relative to the orientation of device 80*a*. Thus, while the top interface edge 92*a* of device 80*a* is relatively closer to wall 18 than to wall 14 and therefore device 80*a* faces wall 18, the top interface edge 92*b* of device 80*b* is relatively closer to wall 14 than to wall 18 and therefore device 80*b* faces away from wall 18 and toward wall 14. Device and user facing directions will be indicated hereafter by user hand representations. For instance, in FIG. 13, hands 180 and 182 indicate opposite facing directions of devices 80*a* and 80*b* and users of those devices.

Figure 13:
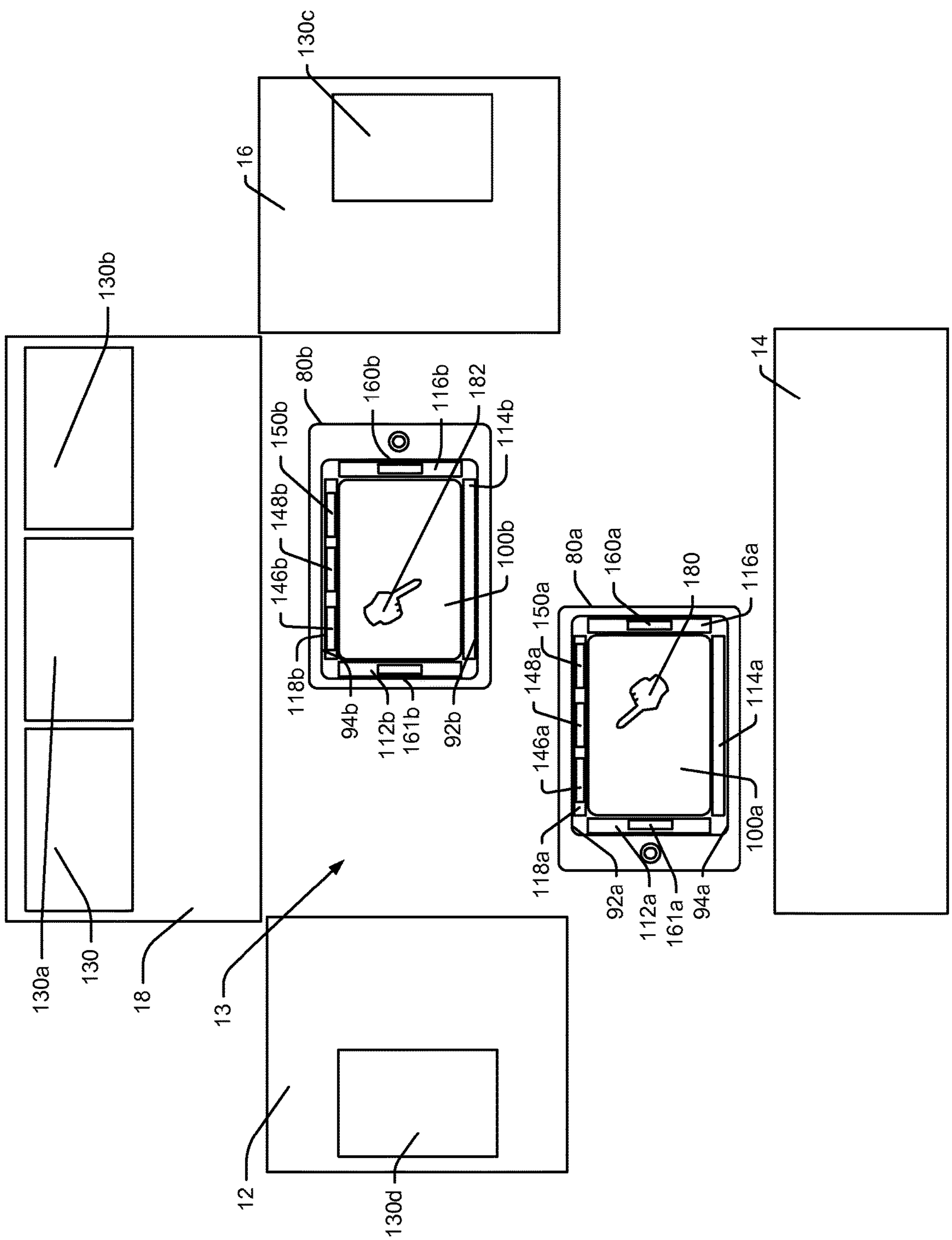
FIG. 13 is similar to FIG. 11, albeit showing two interface devices within a conference space where the tools presented by the interface devices are aligned with content within a conference space that is presented on conference walls.

In FIG. 13, because devices 80*a* and 80*b* are differently oriented, the interfaces align differently with the emissive walls and therefore devices 80*a* and 80*b* operate differently to enable control of content on the walls. For instance, in FIG. 13, content field icons 146*a*, 148*a* and 150*a* corresponding to content fields 130, 130*a* and 130*b* on wall 18 are located along the top edge of the device 80*a* interface while similar content field icons 146*b*, 148*b* and 150*b* are located along the bottom edge of the device 80*b* interface. Thus, consistent with the description above, for the user of device 80*a* to move content from a general application space 100*a* to content field 130 on wall 18, the user may swipe from space 100*a* away from the user to field icon 146*a* on device 80*a*. Similarly, for the user of device 80*b* to move content from a general application space 100*b* to content field 130 on wall 18, the user of device 80*b* may swipe from space 100*b* generally toward the user to field icon 146*b* on device 80*b*. In other words, because of the different device orientations, the users swipe in the same directions relative to space 13 but in different directions relative to themselves to move content to content field 130.

Referring still to FIG. 13, to move content to field 130*c* on wall 16, the users of devices 80*a* and 80*b* swipe right and left on their devices 80*a* and 80*b*, respectively, to content field icons 160*a* and 160*b* and to move content to field 130*d* on wall 12, the users of devices 80*a* and 80*b* swipe left and right on their devices 80*a* and 80*b*, respectively, to content fields 161*a* and 161*b*.

In FIG. 13, if the user of device 80*a* were to change the orientation of device 80*a* to be consistent with the orientation of device 80*b*, the interface on device 80*a* would be automatically modified to appear in a fashion similar to the device 80*b* shown in FIG. 13 and to operate in a similar fashion.

Figure 14:
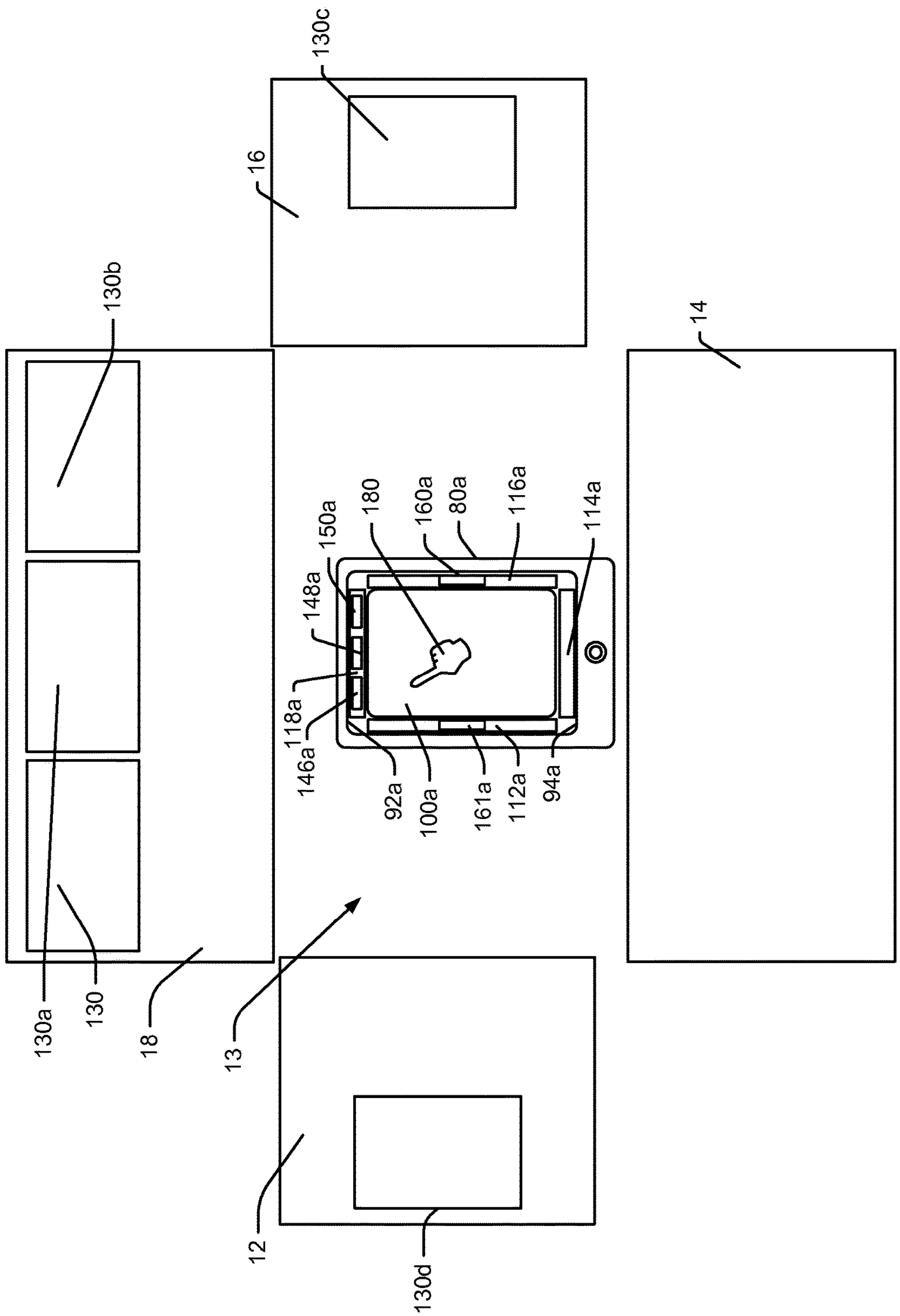
FIG. 14 is similar to FIG. 11, albeit showing an interface that has been rotated through 90° with respect to a vertical axis.

Referring to FIG. 14, device 80*a* is shown being used in a portrait orientation where a top interface edge 92*a* is relatively closer to wall 18 than to wall 14. In this orientation the device 80*a* interface is again rearranged to align with walls 12, 14, 16 and 18 and any content fields (e.g., 130, 130*a*, etc.) already created thereon. Thus, in FIG. 14, the device 80*a* interface includes a wall field 118*a* along edge 92*a* that corresponds to wall 18 and also includes three content field icons 146*a*, 148*a* and 150*a* that are arranged to mimic the arrangement of content fields 130, 130*a* and 130*b* on wall 18. Similarly, the device 80*a* interface includes wall fields 112*a*, 114*a* and 116*a* that correspond to walls 12, 14 and 16, respectively, where content field icons 160*a* and 161*a* that are associated with content fields 130*c* and 130*d* on walls 16 and 12, respectively. To add a content field to any wall 12, 14, 16 or 18 (assuming a maximum number of fields have not already been created), a device 80*a* user may drag from space 100*a* to any open space in one of fields 112*a*, 114*a*, 116*a* or 118*a* (i.e., to any space in one of fields 112*a*, 114*a*, 116*a* or 118*a* that does not already include a content field icon).

In the embodiments described above, the wall fields (e.g., 112, 114, 116 and 118) on the device interfaces include content field icons (e.g., 146, 148, 150) that are arranged to generally mimic the relative juxtapositions of the content fields on the walls associated with the fields 112, 114, 116 and 118. For instance, where there are three equispaced content fields 130, 130*a* and 130*b* on wall 18 in FIG. 9, three equispaced content field icons are provided in wall field 118 on the device 80*a* interface. The icon juxtapositions in field 118 mirror the content field juxtapositions on wall 18 irrespective of the location of device 80*a* in space 13.

In other embodiments it is contemplated that the icons in the interface wall fields may be truly directionally arranged with respect to relative orientation of a device 80*a* to the content fields on the walls. To this end see FIG. 15 where two devices 80*a* and 80*b* are shown in different locations relative to emissive wall 18 and where a single content field 130 is presented on the left most portion of wall 18. Device 80*a* is located essentially in front of content field 130 while device 80*b* is located in front of a right hand portion of wall 18 so that field 130 is in front of and to the far left of device 80*b*.

Figure 15:
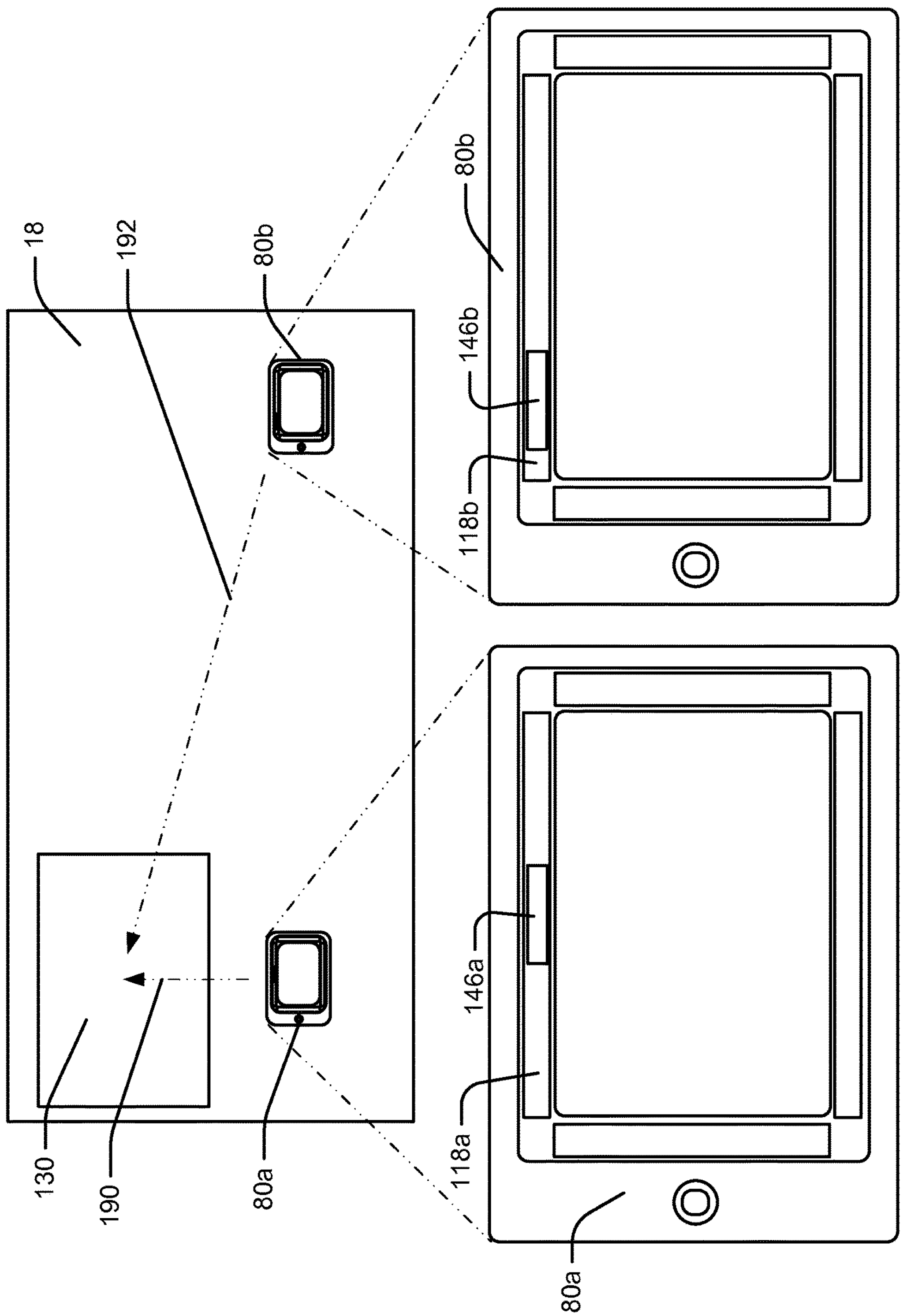
FIG. 15 shows two interface devices at different locations relative to content in a field on a wall and interface tools on each of the devices for interacting with the content.

Referring still to FIG. 15, the device 80*a* interface includes a wall field 118*a* along a top edge thereof with content field icon 146*a* in field 118*a* while the device 80*b* interface includes a wall field 118*b* with a content field icon 146*b* provided in wall field 118*b*. The content field icons 146*a* and 146*b* are at different relative locations in fields 118*a* and 118*b* that are substantially aligned with the associated content field 130. To this end, because content field 130 is directly in front of device 80*a* and is centered with respect to device 80*a*, content field icon 146*a* that is associated with field 130 is provided centrally within field 118*a*. Similarly, because content field 130 is located in front of and to the left of device 80*b*, content field icon 146*b* is provided to the left in wall field 118*b*.

Figure 16:
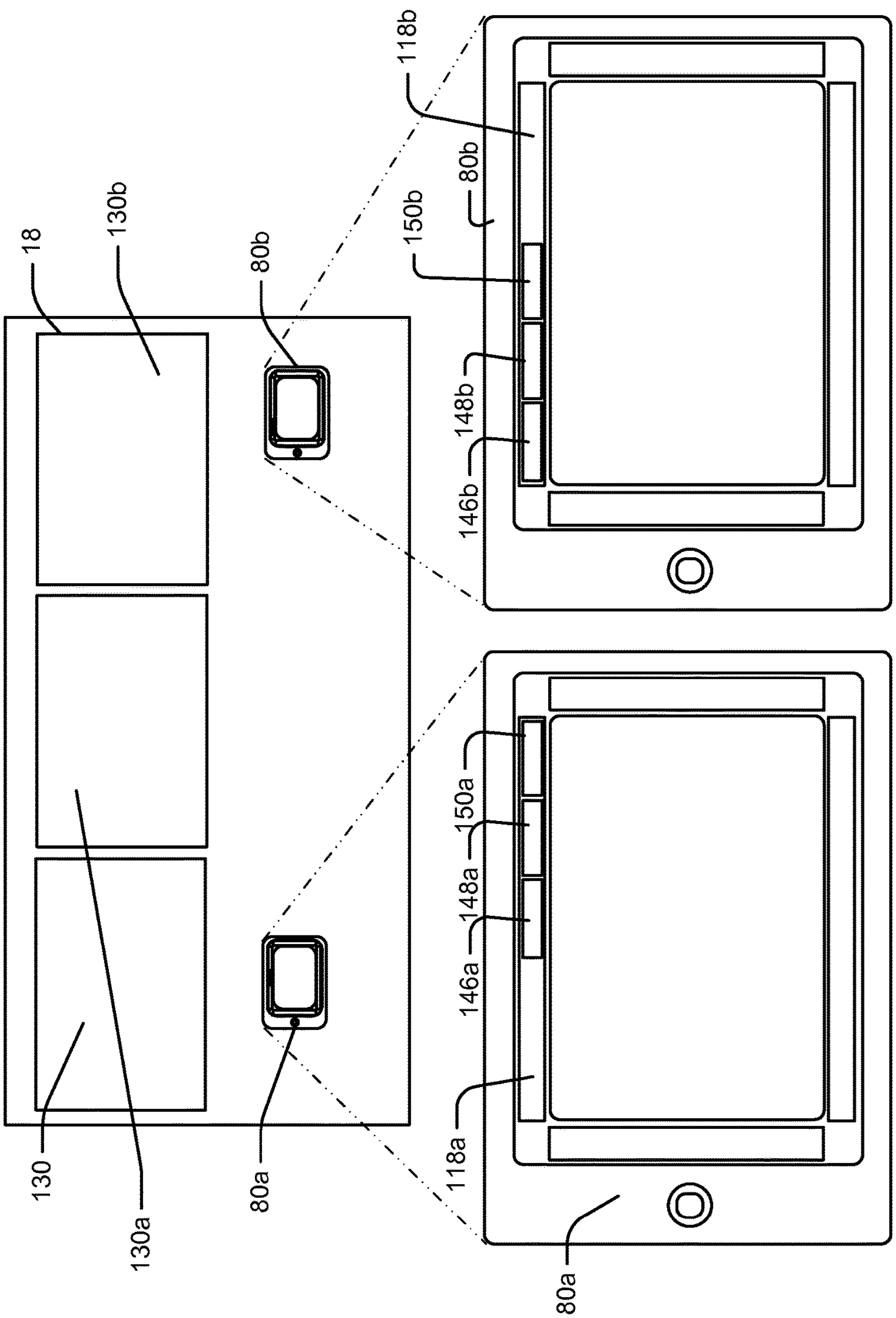
FIG. 16 is similar to FIG. 15, albeit showing three content fields and tools on two interface devices for interacting with the three content fields.

Referring to FIG. 16, devices 80*a* and 80*b* are again shown in the same positions shown in FIG. 15, albeit where three content fields 130, 130*a* and 130*b* are provided on emissive wall 18. In FIG. 16, the device 80*a* interface now includes three content field ions 146*a*, 148*a* and 150*a* that are generally aligned with content fields 130, 130*a* and 130*b* on wall 18 with icon 146*a* centered in field 118 to reflect direct alignment with content field 130 and icons 148*a* and 150*a* to the right thereof to align with offset fields 130*a* and 130*b*. Similarly, the device 80*ab* interface now includes three content field icons 146*b*, 148*b* and 150*b* that are generally aligned with content fields 130, 130*a* and 130*b* on wall 18 with icon 150*b* centered in field 118*b* to reflect direct alignment with content field 130*b* and icons 146*b* and 148*b* to the left thereof to align with offset fields 130. Although not shown in FIGS. 15 and 16, it should be appreciated that content field icons in other wall fields 112, 114 and 116 would similarly be arranged to spatially align with content fields presented on emissive walls 12, 14 and 16.

Figure 17:
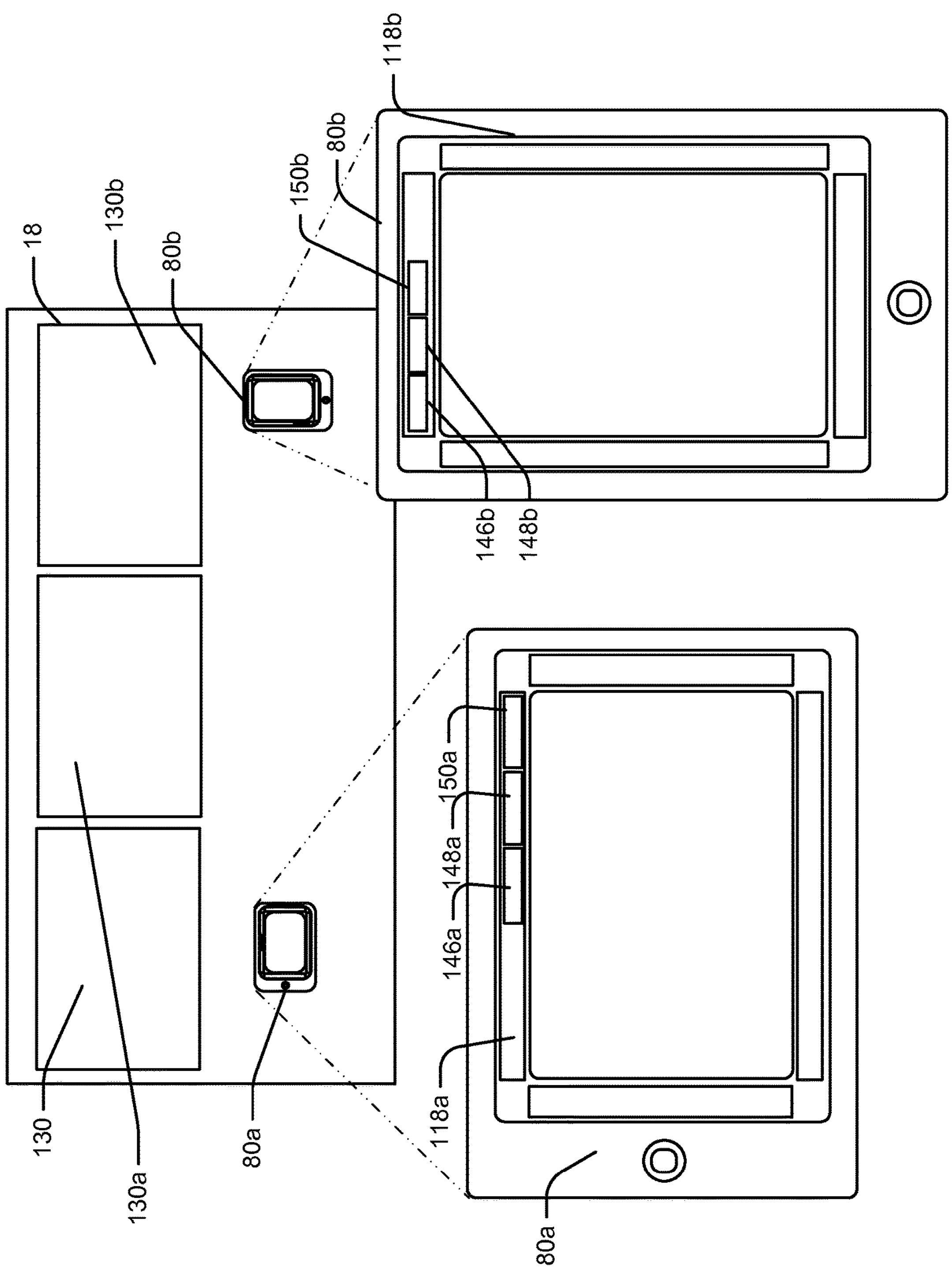
FIG. 17 is similar to FIG. 16, albeit showing the two interface devices in different relative juxtapositions with respect to the content on the walls.

Referring to FIG. 17, two devices 80*a* and 80*b* are shown in similar locations to the devices shown in FIG. 16 and with three content fields 130, 130*a* and 130*b* presented on emissive wall 18. Device 80*a* is oriented the same way as device 80*a* in FIG. 16 (e.g., for use in landscape orientation). Device 80*b* is oriented for use in portrait orientation. The interface on device 80*b* has been changed so that the content field icons 146*b*, 148*b* and 150*b* are arranged along the top edge and the relatively shorter width dimension of the device display screen. Again, icons 146*b*, 148*b* and 150*b* are generally spatially aligned with fields 130, 130*a* and 130*b* on wall 18.

Figure 18:
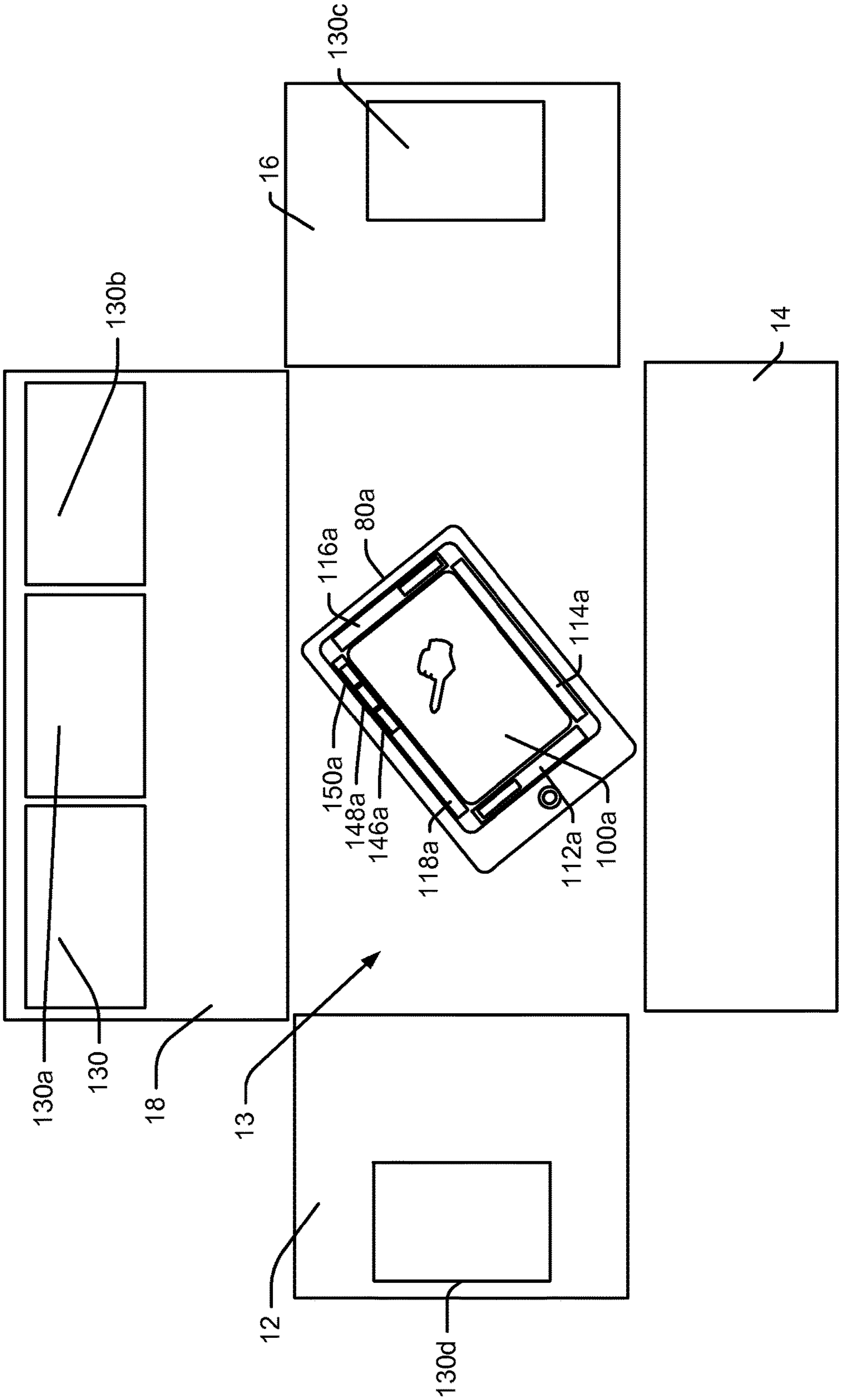
FIG. 18 is similar to FIG. 14, albeit showing the interface devices rotated into an angled orientation with respect to the conference walls.

One problem with the directional interfaces described above where content field icons are generally aligned with dynamically created content fields on emissive walls in a conference room is that device 80*a*, etc., users will not always align devices 80*a*, etc., in space 13 with the emissive walls during use and the misalignment may cause confusion. For instance, see FIG. 18 where device 80*a* faces a direction that is angled with respect to the space walls 12, 14, 16 and 18. Here, the system can identify the direction of device 80*a* and generally align interface content field icons 146*a*, 148*a*, etc., with associated content fields on the walls. While the field icons are substantially aligned with associated content fields, the misalignment of rectangular device 80*a* with rectangular space 13 could potentially cause confusion.

Figure 19:
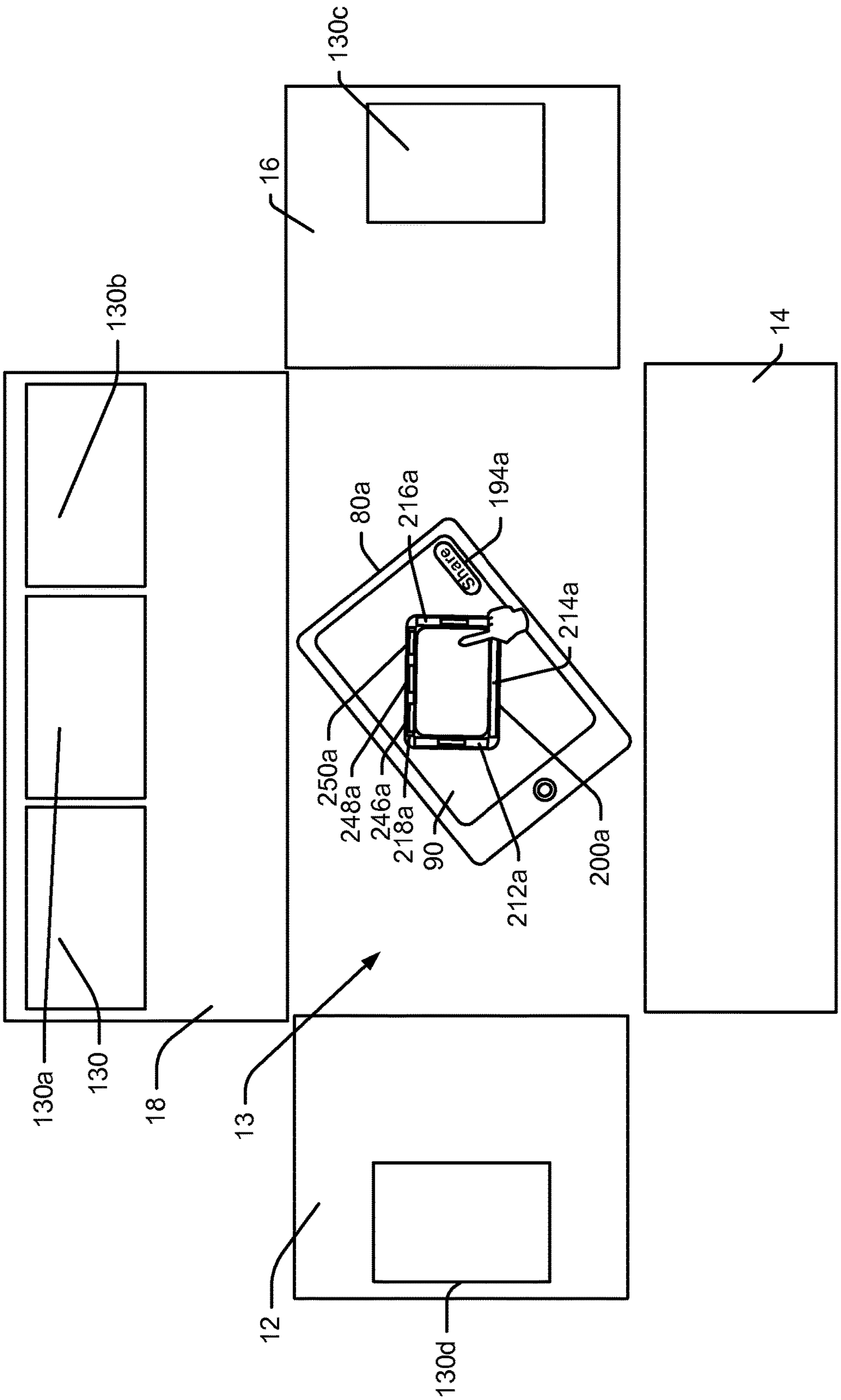
FIG. 19 is similar to FIG. 18, albeit showing a different interface screen for interacting with content on conference walls.

One solution to the misalignment confusion problem is to provide a device interface where the entire interface instead of just the content field icons always remains substantially aligned with the dynamic content fields and space walls on which the fields are presented. To this end, see FIG. 19 that shows a device 80*a* that includes a display screen on which application output is presented and on which application input is received from a device user. In FIG. 19, instead of providing a frame type interface about a general application space on screen 90 as described above, a sharing interface 200*a* is presented on screen 90. Interface 200*a* has an appearance that is similar to the appearance of the frame type interface described above and, to that end, includes wall fields 212*a*, 214*a*, 216*a* and 218*a* that are akin to fields 112*a*, 114*a*, 116*a* and 118*a* described above, where the fields 212*a*, 214*a*, 216*a* and 218*a* are arranged about a virtual room space. Content field icons 246*a*, 248*a*, 250*a*, 260*a* and 261*a* are arranged within wall fields 212*a*, 216*a* and 218*a* and to be substantially aligned with associated content fields on walls 12, 14, 16 and 18. Although not shown, other content field icons could be presented in wall field 216*a* and additional or fewer content field icons could be presented in wall fields 212*a*, 216*a* and 218*a*, depending on the number of content fields presented on the emissive walls about space 13.

Referring still to FIG. 19, interface 200*a* is shown substantially aligned with walls 12, 14, 16 and 18 that define space 13 even though device 80*a* is misaligned with space 13. Here, as a device 80*a* user changes device 80*a* orientation within space 13, interface 200*a* would change to remain "stationary" within the space and so that wall fields 212*a*, 214*a*, 216*a* and 218*a* remain stationary with respect to the space. In some embodiments the content field icons will remain stationary in the wall fields irrespective of the location of device 80*a* in space 13. Thus, in FIG. 19 for instance, the locations of icons 246*a*, 248*a* and 250*a* would not change as a device 80*a* user moves device 80*a* from adjacent wall 12 to a location adjacent wall 16.

Figure 20:
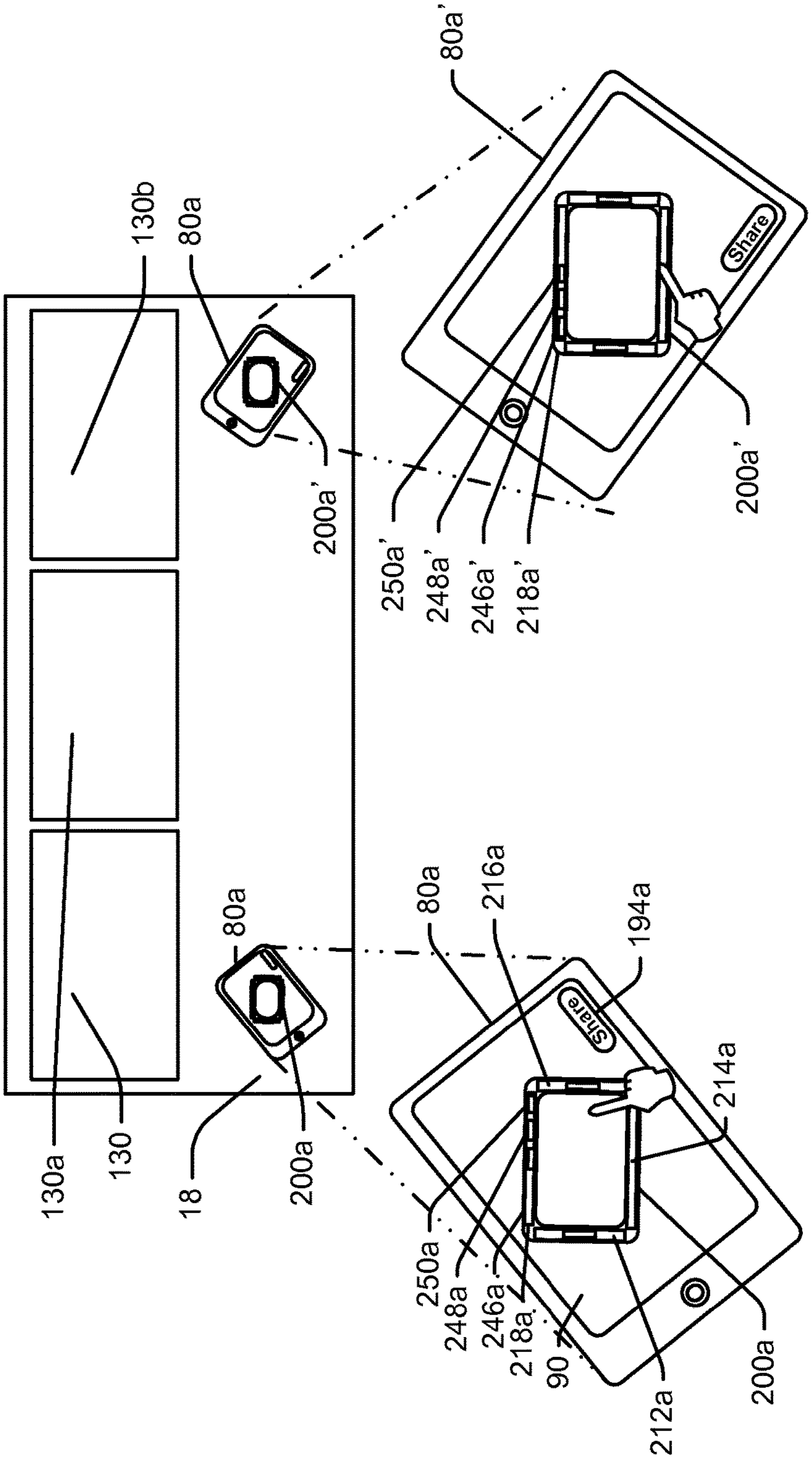
FIG. 20 is similar to FIG. 17, albeit showing first and second interface devices at different angles with respect to content presented on a conference wall.

In other cases while interface 200*a* may remain stationary, field icon locations within wall fields 212*a*, 214*a*, 216*a* and 218*a* may change based on device 80*a* location in space 13. To this end, see FIG. 20 where device 80*a* (and 80*a*') is shown at two different two different locations at two different times within a conference space. At the time corresponding to device 80*a*, the device 80*a* is located directly in front of a content field 130 on wall 18 with two other content fields 130*a* and 130*b* to the right thereof. At the time corresponding to device 80*a*', device 80*a*' is shown located directly in front of content field 130*b* on wall 18 with the other two content fields 130 and 130*a* to the left thereof. On device 80*a*, content field icons 246*a*, 248*a* and 250*a* corresponding to content fields 130, 130*a* and 130*b*, respectively, are arranged with icon 246*a* centrally within field 218*a* and icons 248*a* and 250*a* arranged to the right of icon 246*a* to generally align with content fields 130, 130*a* and 130*b*.

Similarly, on device 80*a*', content field icons 246*a*', 248*a*' and 250*a*' corresponding to content fields 130, 130*a* and 130*b*, respectively, are arranged with icon 250*a*' centrally within field 218*a*' and icons 246*a*' and 248*a*' arranged to the right of icon 246*a*' to generally align with content fields 130, 130*a* and 130*b*. Thus, while interface 200*a*/200*a*' remains "stationary" (i.e., does not rotate along with device 80*a*/80*a*' rotation) with respect to space 13 in this case, the content field locations change to maintain alignment with content fields independent of device location within space 13.

Referring again to FIG. 19, while interface 200*a* that remains "stationary" within space 13 is particularly useful and intuitive to use, interface 200*a* is presented centrally on display screen 90 in the space required for interacting with general application programs run by device 80*a*. For this reason interface 200*a* should not be persistently present and should only be presented when needed by a device 80*a* user. In at least some embodiments it is contemplated that during normal operation of device 80*a* to run a general application program, interface 200*a* would not be visually preset or would only be manifest in a minimally intrusive manner. For instance, in at least some embodiments, as shown in FIG. 19, when interface 200*a* is not needed, a simple "Share" icon 194 may be presented in the lower right hand corner of display screen 90. Here, because icon 194 is small and located in one corner of the device display screen, icon 194 only minimally affects a device user's ability to interact with output of a general application on screen 90. While using device 80*a* to interact with a general application program, when the user wants to share content on the device 80*a* screen 90, the user simply selects icon 194 causing conferencing application to present sharing interface 200*a*.

In other embodiments a desire to share and to access interface 200*a* or another sharing interface (see other embodiments above) may be gesture based so that there is no indication of the sharing application on a device 80*a* screen until sharing is desired. For instance, a sharing gesture may require a user to touch a device display screen and draw two consecutive circles thereon. Other sharing gestures are contemplated. In at least some cases a device user may be able to create her own sharing gesture and store that gesture for subsequent use during a sharing application commissioning procedure. Once a sharing application gesture is sensed, interface 200*a* or some other interface is presented and can be used to share content as described above.

Figure 21:
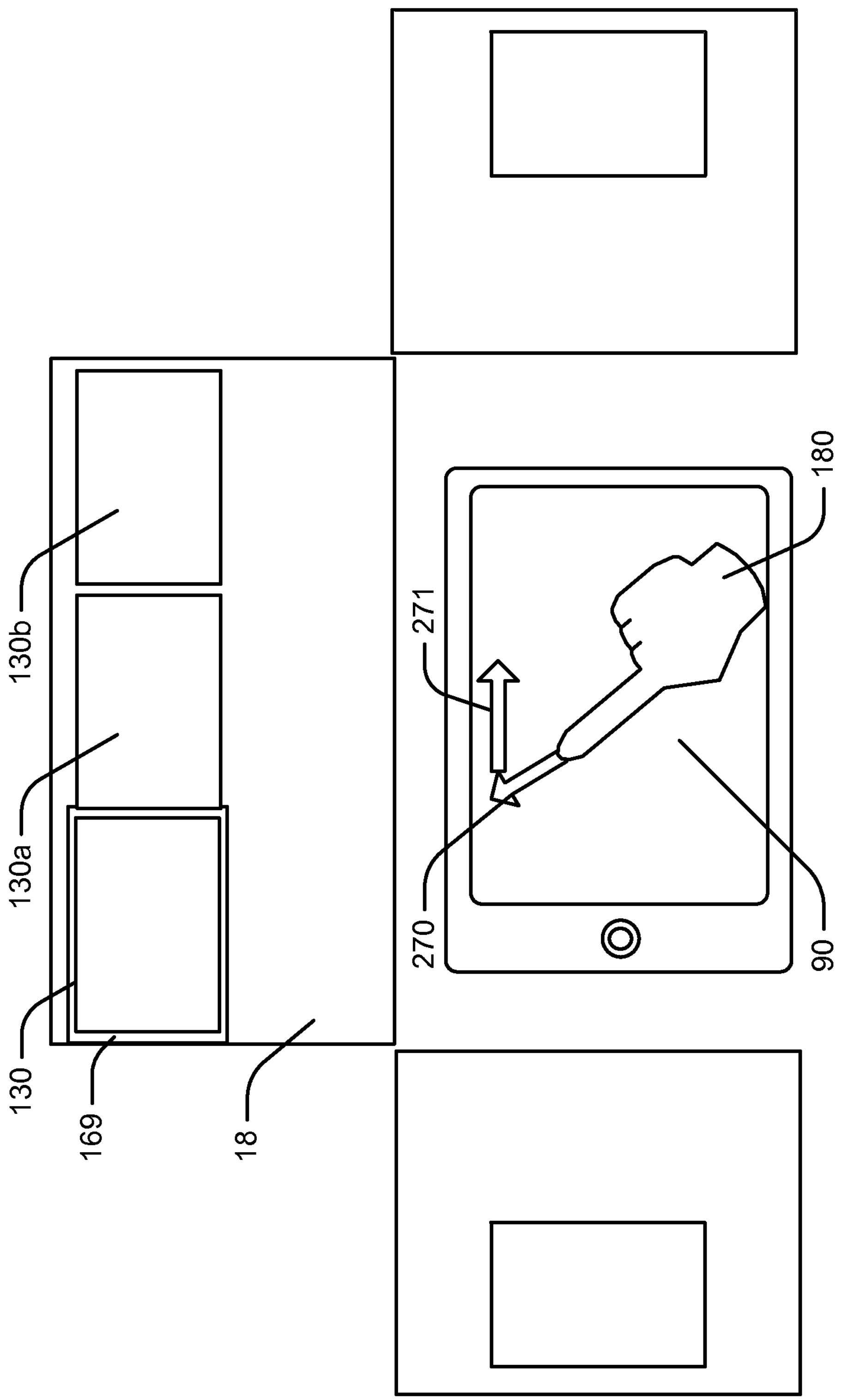
FIG. 21 is similar to FIG. 17, albeit showing a double gesture on an action on an interface device.

Referring again to FIG. 9, while wall fields 112, 114, 116 and 118 and content field icons like icons 146, 148 and 150 can be presented on some oriented interfaces to help orient device users relative to space walls and content fields presented thereon, in other cases an oriented interface provided by a conferencing application may have minimal or even no visual representation on a device display screen. Instead, a simple directional gesture like a drag or swipe on a device screen toward a wall 12, 14, 16 or 18 or toward an existing content field (e.g. 130) on one of the walls may result in replication of device content. To this end, see FIG. 21 where the device screen 90 does not include any visual conferencing application interface features. Here, instead, a general device 80*a* application may run and provide application output on screen 90. In this case, a simple touch and sweep as indicated by hand 180 and arrow 270 toward a content field 130*a* may cause content from screen 90 to be replicated in field 130*a*. Other directional swiping action toward other fields would result in replication in the fields swiped toward. Other directional swiping to an open space (e.g. a space that does not include a content field 130, 130*a*, etc.) would result in dynamic creation of an additional content field at the location swiped toward and replication of the screen 90 content in the new field.

Figure 22:
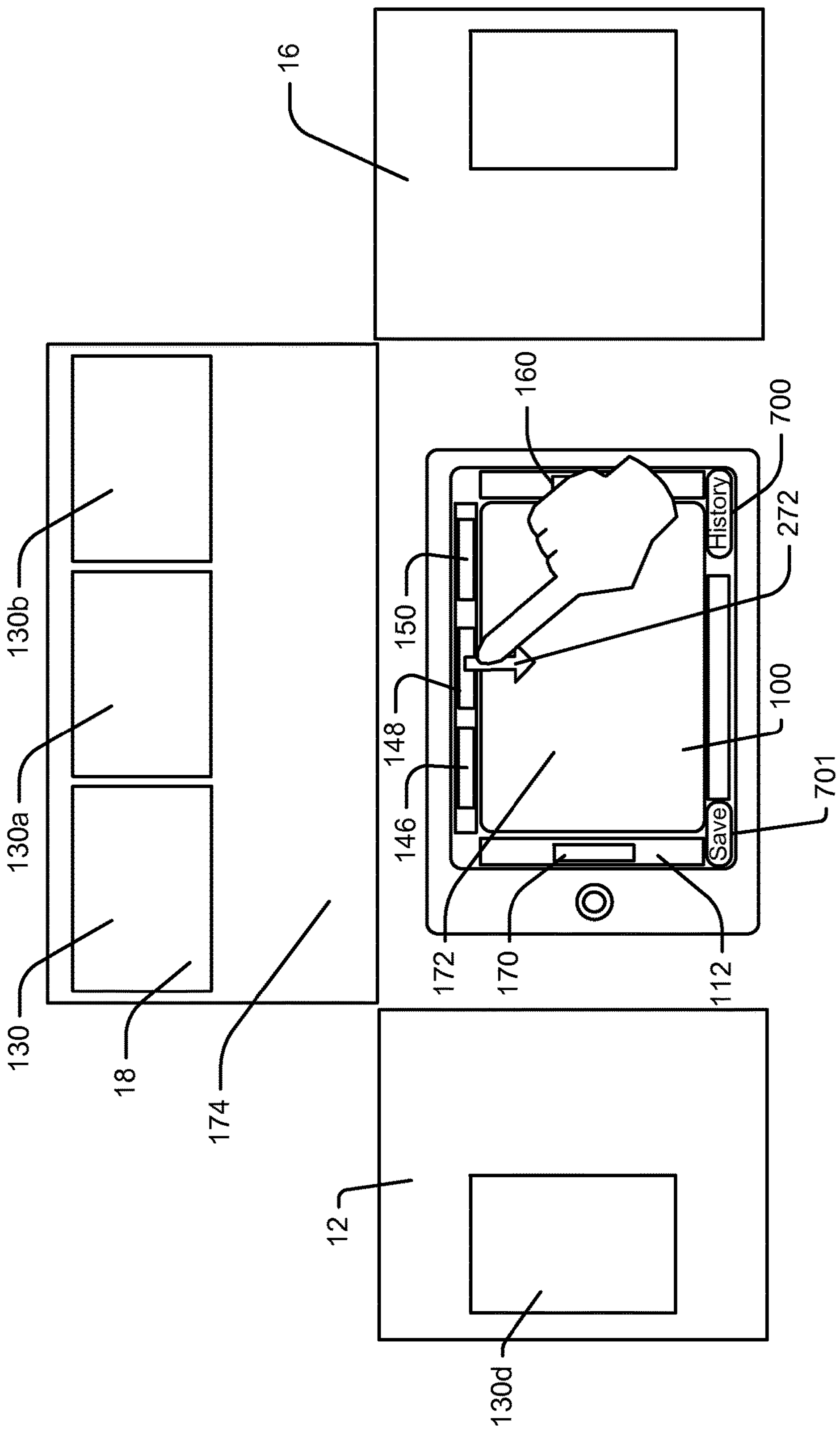
FIG. 22 is similar to FIG. 21, albeit showing a gesture action for moving content from a content field on one of the walls on the conference space onto the interface device display screen.

In at least some embodiments, when a device 80*a* user presents content in one or more content fields (e.g., 130, 130*a*, etc.), the user may have the option to remove the user's content from the content fields in which the content is current shared. To this end, see FIG. 22 where an interface akin to the interface shown in FIG. 12 is illustrated. Here, assume that the user of device 80*a* has replicated content from space 100 in content field 130. In this case, the device 80*a* user may be able to remove content from field 130 by simply contacting content field icon 148 and dragging from the icon 148 into space 100 as indicated by arrow 272. This action 272 causes device 80*a* to transmit a signal to processor 50 instructing the processor 50 to remove the content from field 130.

When current content is removed from field 130, the field 130 may be eliminated or removed from wall 18. Here, when field 130 is removed, the other fields 130*a*, 130*b*, etc. on wall 18 may persist in their present locations or may be rearranged more centrally on wall 18 for optimal viewing within space 13. Where fields are removed or rearranged on wall 18 or other space walls, the interfaces on devices 80*a*, 80*b*, etc., are altered automatically to reflect the new arrangement of content fields.

In other cases field 130 may persist after current content is removed as a blank field to which other content can be replicated. In still other cases, when content is removed from field 130, content that existed in field 130 prior to the removed content being placed there initially may again be presented in field 130.

In addition to the author of content in the content fields being able to remove the content, in at least some embodiments any user of a device that runs the conferencing application may be able to remove content from any of the content fields presented on walls 12, 14, 16 and 18. For instance, referring again to FIG. 22, device 80*a* may be a device used by a person that did not create the content presented in field 130. Nevertheless, here, the device 80*a* user would be able to remove content from field 130 in the same way described above by simply contacting icon 148 associated with field 130 and dragging into space 100.

Referring again to FIG. 22, in still other embodiment, instead of removing content from a field, a dragging gesture from a content field icon (e.g., 148) associated with a content field (e.g., 130) into space 100 may cause the content in field 130 to be reverse replicated in space 100. Once replicated in space 100, in at least some cases, the conferencing application or some other application may enable a device user to annotate or otherwise modify the content in space 100. In some cases annotations in space 100 may be replicated in real time in the field 130 associated with the reverse replicated content. Thus, for instance, in FIG. 22, after content in field 130 is replicated in space 100, a doodle on the content in space 100 would be replicated on the content in field 130 in real time. In other cases annotations or other modifications of the replicated content may not be shared in real time and instead, may only be shared upon the occurrence of some other gesture such as a drag or swipe from space 100 back to content field icon 148 associated with space 130.

In at least some embodiments where content in a field (e.g., 130, 130*a*) represents output of a dynamic application program run by a first device 80*a* and the user of a second device 80*b* replicates the content on the other device 80*b*, the act of replicating may cause the user of the second device 80*b* to assume control of the dynamic application program. To this end, in some cases the second device 80*b* would open an instance of the application program stored in its own memory and obtain an instantiation file from either processor 50 or device 80*a* including information usable by the application program to create the exact same content as the application program run on device 80*a*. Once the application program is opened on device 80*b* and the instantiation file information is used to re-instantiate the content, any changes to the content initiated on device 80*b* would be replicated in real time in field 130.

In order to order to expedite the process of a second device 80*b* taking over an application program that generates shared content in space 13 that is run by a first device 80*a*, when any device drives a field 130, 130*a*, etc., with dynamic output from an application program, in addition to transmitting the dynamic output to processor 50, the device may also transmit an application identifier as well as an instantiation file to processor 50 for storage in association with the content field. Thus, for instance, where first device 80*a* runs a word processor application and generates output in space 100 as well as in content field 130 in FIG. 22, in addition to transmitting data to processor 50 to drive field 130, device 80*a* would also transmit an identifier usable to identify the word processor application program as well as the actual document (e.g., a Microsoft Word document) to processor 50.

Upon receiving the image data, the program identifier and the actual document (e.g., an instantiation file), processor 50 drives field 130 with the image data and would also store the program identifier and actual document in database 52 (see again FIG. 1) so that the identifier and document are associated with field 130. Where the content in field 130 is moved to some other content field in space 13, the identifier and file would be re-associated with the new field.

Here, when the second device 80*b* is used to replicate the content from field 130 in space 100, processor 50 transmits the application identifier and the instantiation file (e.g., the document in the present example) associated with field 130 to device 80*b*. Upon receiving the identifier and instantiation file, device 80*b* automatically runs an instance of the word processor application program stored in its own memory or obtained via a wireless connection from a remote storage location and uses the instantiation file to re-instantiate the document and create output to drive field 130 with content identical to the content generated most recently by device 80*a*. As any device 80*a*, 80*b* is used to modify the document in field 130, the device transmits modifications to processor 50 which in turn modifies the instantiation file so that any time one device takes control of field 130 and the related application from another device, the instantiation file is up to date and ready to be controlled by the new device.

In other cases devices 80*a*, 80*b*, etc., may only operate as front end interfaces to applications that generate output to drive fields 130 and processor 50 may instead run the actual application programs. For instance, where a device 80*a* user initially runs an application program to generate output in space 100 on the device screen 90 without sharing on the emissive wall surfaces in space 13, the application program may be run from the device 80*a* memory. Here, however, once device 80*a* is used to share the application program output via a content field 130 on one of the walls that define space 13, instead of transmitting the content to processor 50, the application program identifier and the instantiation file may be transmitted to processor 50. Upon receiving the identifier and file, processor 50 may run its own instance of the application program and create the content to drive field 130. Processor 50 may also be programmed to transmit the content to device 80*a* to be used to drive space 100 so that device 80*a* no longer needs to run the word processor application program. In effect, operation of the application program is transferred to processor 50 and the information presented in space 100 is simply a duplicate of information in field 130. The device 80*a* screen would still be programmed to receive input from the device 80*a* user for controlling the program, input resulting in commands to processor 50 to facilitate control.

In this case, when a second device 80*b* is used to assume control of the application program, in some cases processor 50 would simply stop transmitting the application program output to device 80*a* and instead would transmit the output to device 80*b* so that the output would appear in space 100 of device 80*b*. In other cases it may be that two or more devices 80*a*, 80*b*, etc., can simultaneously control one application program in which case the processor 50 may be programmed to transmit the application program output to two or more devices as additional devices are used to move field content into their spaces 100.

As described above, in at least some cases content in a field 130, 130*a*, etc., may represent static content generated using a dynamic application program. For instance, device 80*a* may have previously run a drawing program to generate an image where a static version of the image was then shared in field 130. Next, device 80*a* may be used to run a second application program to generate dynamic output shared in space 130*b*. While the content in space 130 in this example is static, in some cases the system may be programmed to enable re-initiation of the program used to generate the static content at a subsequent time so that the application program can be used to again change the content if desired. To this end, in some cases when static output of an application program is used to drive a field 130, in addition to providing the static content to processor 50, a device 80*a* may provide the application program identifier and an instantiation file akin to those describe above to processor 50. Here, the processor 50 stores the program identifier and instantiation field in association with the static content in database 52.

Subsequently, if any device 80*a*, 80*b*, etc., is used to replicate the static content from field 130 in space 100, processor 50 accesses the associated program identifier and instantiation file and either processor 50 or the device (e.g., 80*a*) used to replicate the field 130 content then runs the program indicated by the identifier and uses the file to re-create the dynamic output that generated the static content. Again, changes to the content on the device 80*a* are replicated in real time in the content field 130.

Thus, in at least some embodiments of this disclosure, a device 80*a* user in space 13 is able to replicate device 80*a* content at essentially any location on the walls that define space 13, replicate content from any of the locations on the walls on the device 80*a* screen, can assume control of any application program that is running or that has previously run by any device 80*a*, 80*b*, etc., to generate static or dynamic content on the walls using a directional interface that is easy and relatively intuitive to operate. Sharing fields can easily be added and removed from emissive surfaces, content can be moved around among different fields, and content can be modified in real time in any of the fields.

In addition to dragging and swiping, other content sharing and control gestures are contemplated. For instance, in cases where the general application program running in space 100 already ascribes some meaning to a simple swipe, some additional gesture (e.g., two clockwise circles followed by a directional swipe) may be required to create a content field with replicated content. As another instance, referring again to FIG. 12, a double tap in space 100 followed by a double tap in one of fields 112, 114, 116 or 118 may result in content sharing. Here, where a double tap is on an existing content field icon such as 170, for instance, the sharing may be in the content field 130*d* associated therewith. Similarly, where a double tap is in space 112 but outside any existing field icon, a new field icon and associated content field may be created in field 112 and on wall 12, respectively.

In still other cases tablet and other types of devices have already been developed that can sense non-touch gestures proximate surfaces of the device screens. In some cases it is contemplated that the directional touch bases gestures described above may be supplemented by or replaced by non-touch directional gestures sensed by devices 80*a*, 80*b* adjacent device screens or in other spaces adjacent devices 80*a*, 80*b*, etc. For instance, in some cases a simple directional gesture near a device 80*a* screen toward one of the walls 12, 14, 16 or 18 or toward a specific content field 130, 130*a*, etc., may cause replication of the device content on an aligned wall or in an aligned field in a manner akin to that described above.

It has been contemplated that at least some location and orientation determining systems may not be extremely accurate and that it may therefore be difficult to distinguish which of two adjacent content fields is targeting by a swipe or other gesture input via one of the devices 80*a*. This is particularly true in cases where a device 80*a* is at an awkward (e.g., acute) viewing angle to a content field. For this reason, at least one embodiment is contemplated where processor 50 may provide some feedback to a device user attempting to select a specific target content field. For instance, referring again to FIG. 21, assume that content fields 130, 130*a*, 130*b*, 130*c*, 130*d* and 130*e* already exist when device 80*a* user gestures as indicated via arrow 270 in an effort to move content from device 80*a* to field 130*b*. Here, it will be presumed that the gesture 270 is not substantially aligned well with field 130*b* because of an odd viewing angle of the device 80*a* user. In this case, processor 50 is programmed assuming that, at best, the direction of the flipping action can only be determined to be generally toward one of walls 12, 14, 16 or 18. Thus, gesture 270, regardless of precise angular trajectory, may only result in a command to replicate information in one of the fields 130, 130*a* and 130*b* on wall 18.

In response to the gesture 270, to help the device 80*a* user identify which of the three fields the content should be replicated in, processor 80*a* may visually distinguish one of the fields. For instance, in FIG. 21, field 130 is initially highlighted 169 to visually distinguish. A second gesture by the device 80*a* user may either confirm that field 130 is the target field or that some other field 130*a*, 130*b* was intended. For instance, a double tap while field 130 is highlighted may cause replication of the content in field 130. A second swipe action 271 on device 80*a* screen 90 to the right may cause the highlight to skip from field 130 to the next field 130*a* and then to the next field 130*b* if the swipe continues. Here, once a field is selected, the content is replicated in the selected field and the highlight may be removed.

In other cases a single dual action swipe where each of two consecutive portions of the action operates as a unique command may be used. For instance, referring again to FIG. 21, first swipe action 270 may cause processor 50 to highlight the first field 130 that exists on the wall 18 swiped toward. Without lifting her finger, the device 80*a* user may continue the swipe action as at 271 to the right to move the highlight to other fields on wall 18. At any point in this action, when the user lifts her finger, the highlighted field is selected and content from device 80*a* is replicated in the selected field.

While a generally rectangular conference space and associated emissive walls have been described above, it should be understood that many aspects of the present disclosure are applicable to many other embodiments. For instance, a conference room may only include two emissive walls 18, 16 as in FIG. 10. Here, the directional interface would have characteristics that are consistent with a two wall configuration. For instance, instead of having four wall fields 112, 114, 116 and 118 that surround a general application space 100 as in FIG. 11, the interface would only include two wall fields 116 and 118 corresponding to walls 16 and 18, respectively. Similarly, a conference space may only include one emissive wall, three emissive walls or more than four emissive walls. In each of these cases the interface would be modified accordingly.

Figure 23:
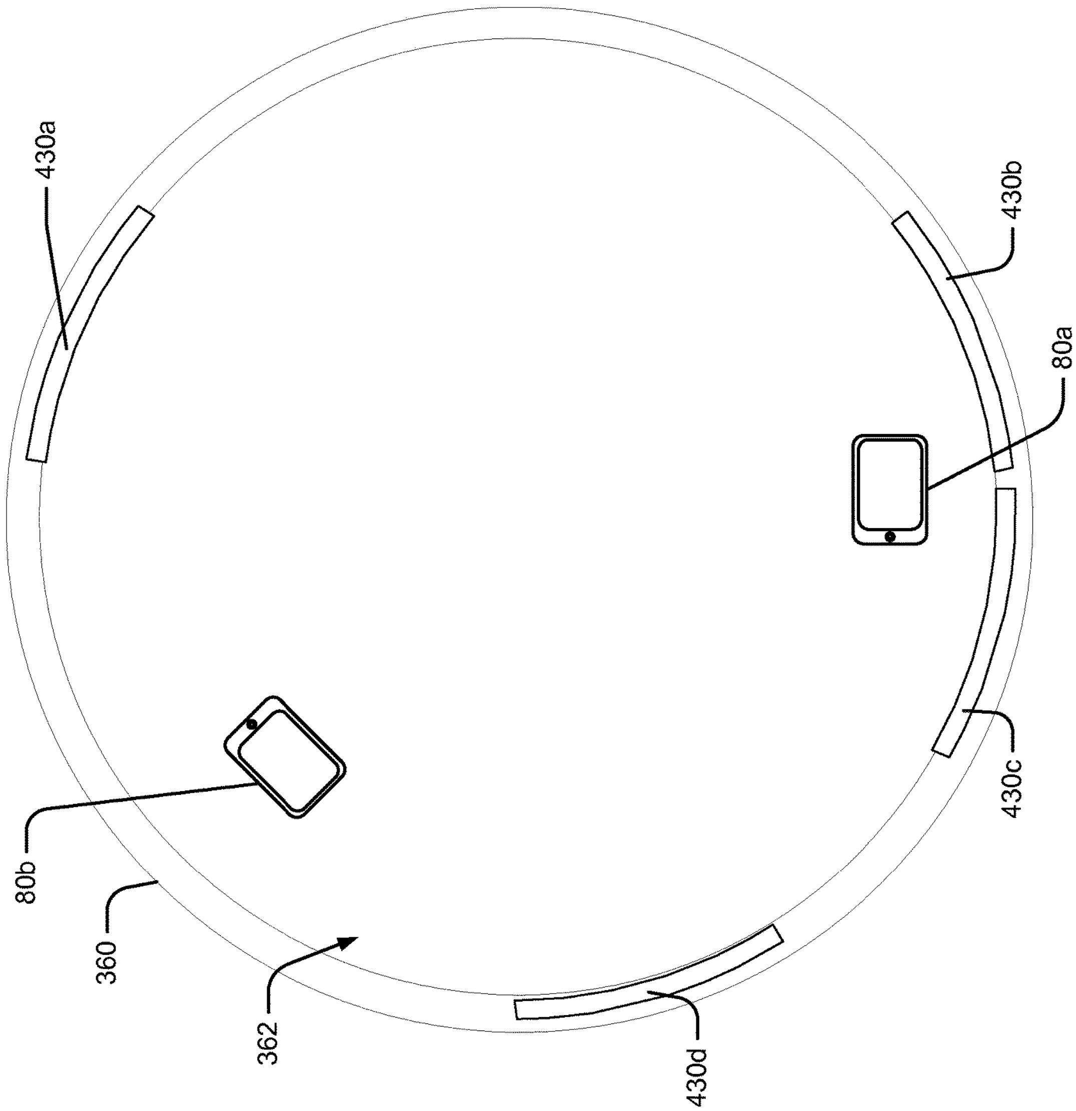
FIG. 23 is a schematic illustrating two interface devices within a circular conference space including content fields about the circular space walls.
Figure 24:
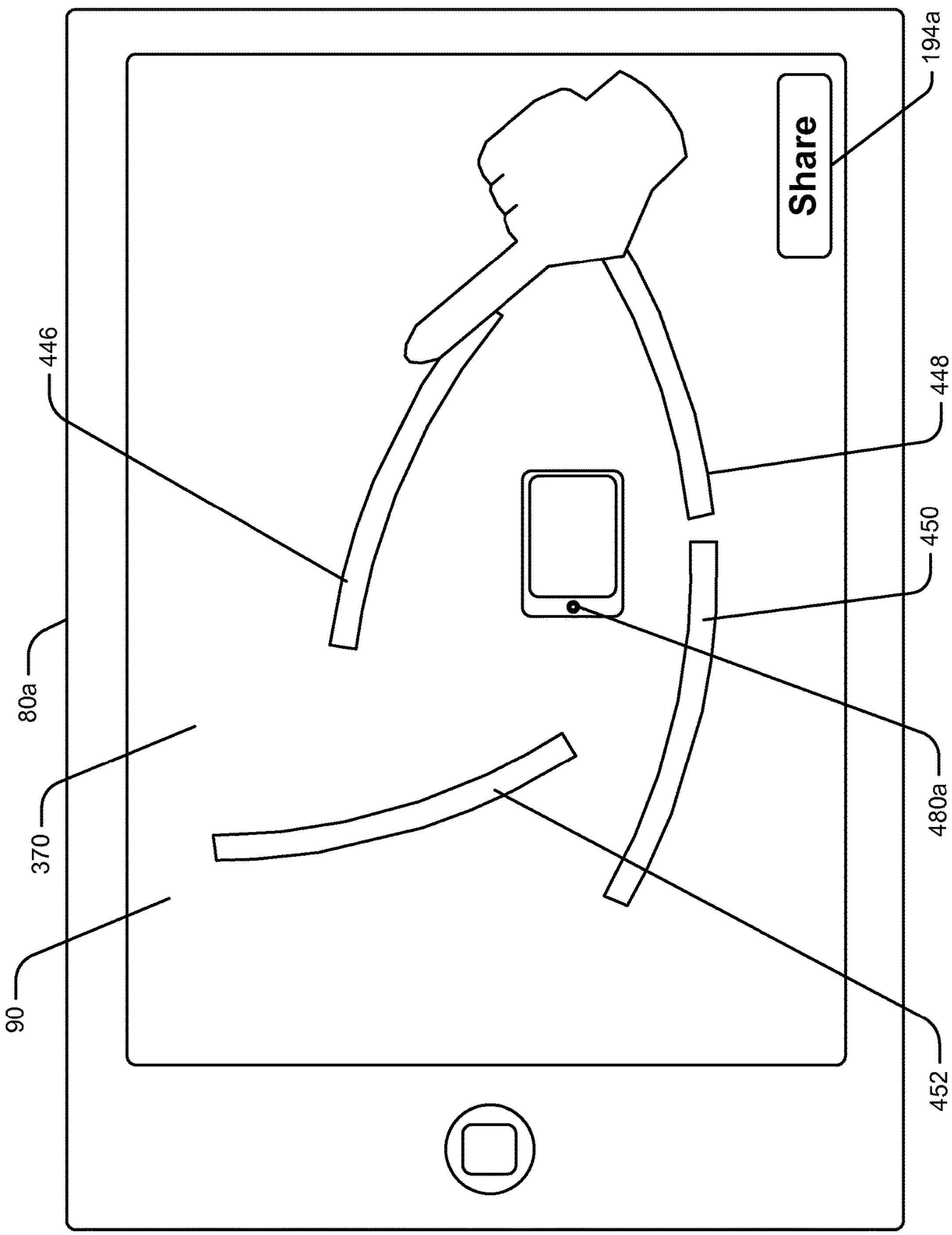
FIG. 24 shows an exemplary interface device presenting tools for sharing content in conference content fields.

As another instance, technology currently exists for forming curved emissive surfaces. An embodiment is contemplated where one or more flat surfaces within a conference space may be replaced by one or more curved emissive surfaces. For instance, in a particularly interesting embodiment curved surfaces may be configured into a cylindrically shaped room as shown in FIG. 23. As shown, four content fields 430*a*, 430*b*, 430*c* and 430*d* currently exist on a cylindrical wall 360 that defines a space 362. A user device 80*a* is located adjacent content fields 430*b* and 430*c* as shown and is oriented so that a user thereof currently faces a portion of wall 260 opposite fields 430*b* and 430*c*. Referring also to FIG. 24, a directional interface 37—is presented on device 80*a* screen 90 where the directional interface 370 includes content field icons 446, 448, 450 and 452 corresponding to the existing content fields 430*a*, 430*b*, 430*c* and 430*d*, respectively, on wall 360 as well as a device representation 480*a* corresponding to device 80*a* in FIG. 23. Here, icons 446, 448, 450 and 452 are presented relative to device representation 480*a* such that the relative juxtapositions reflect the juxtaposition of actual device 80*a* in space 362 relative to fields 430*a* through 430*d*. In this case, a swipe or dragging action from device representation 480*a* toward or to any one of the field icons 446, 448, 450 or 452 results in replication of device 80*a* content in an associated content field 430*a* through 430*d*. As in embodiments above, after content has been replicated on a common content field, the interface icons and representations in FIG. 24 is removed from screen 90 so that the device 80*a* user can interact with applications via screen 90. Here, the only aspect of the FIG. 24 interface that may be persistent is a share icon 194*a* which can be selected to replicate device 80*a* content again.

Figure 25:
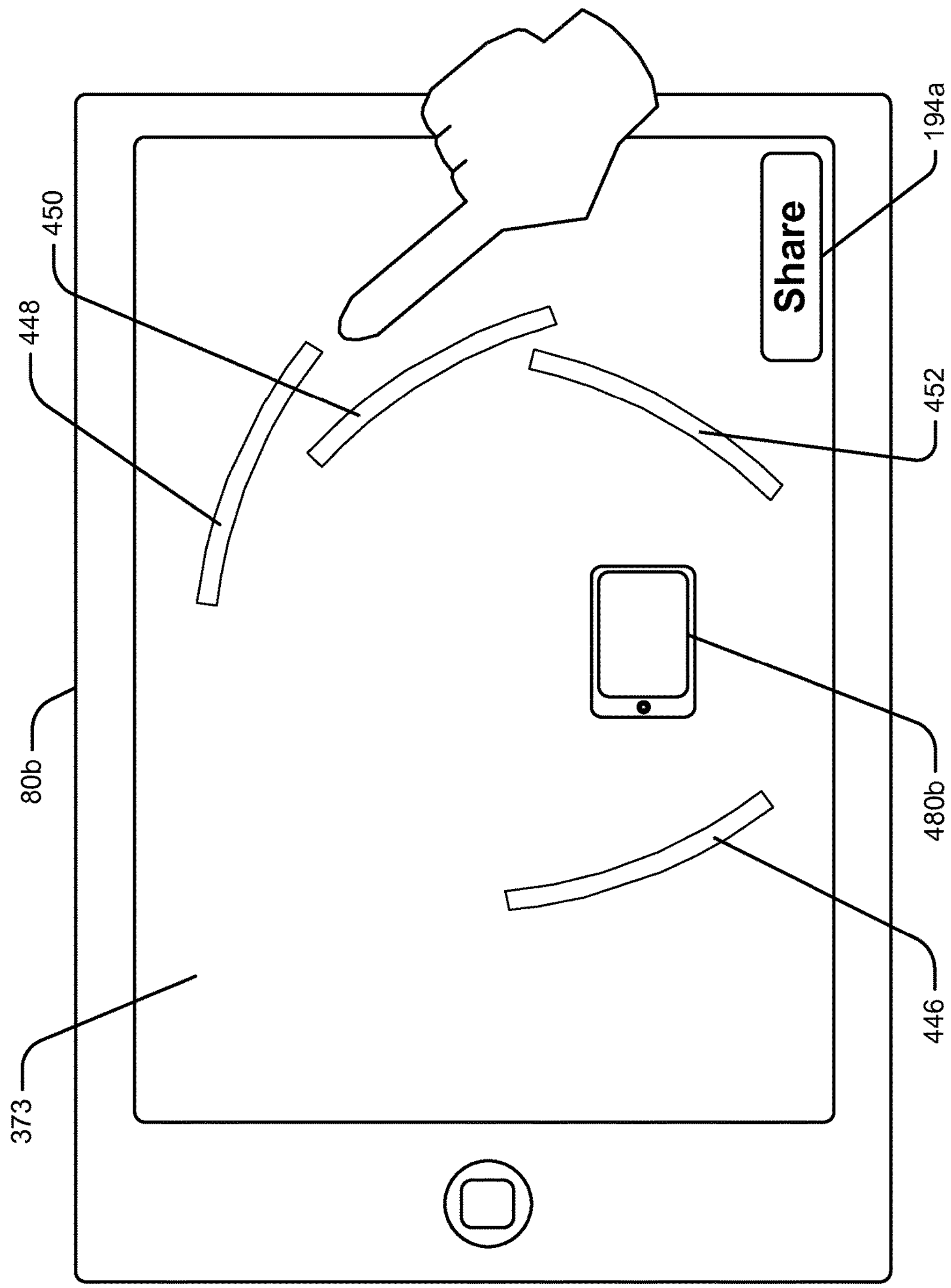
FIG. 25 is similar to FIG. 24, albeit showing a different arrangement of interface tools.

Referring again to FIG. 23, a second user device 80*b* is shown in a different position in space 362. Referring to FIG. 25, an exemplary interface 373 on device 80*b* is shown which includes content field icons and a device 80*b* representation. Here, however, because of the different relative juxtaposition of device 80*b* to the fields 430*a* through 430*d* in FIG. 23, device representation 480*b* and content field icons 446, 448, 450 and 452 have different relative juxtapositions. If device 80*b* user moves device 80*b* to the exact same location as device 80*a*, the interface on device 80*b* would be identical to the interface in FIG. 24.

Figure 26:
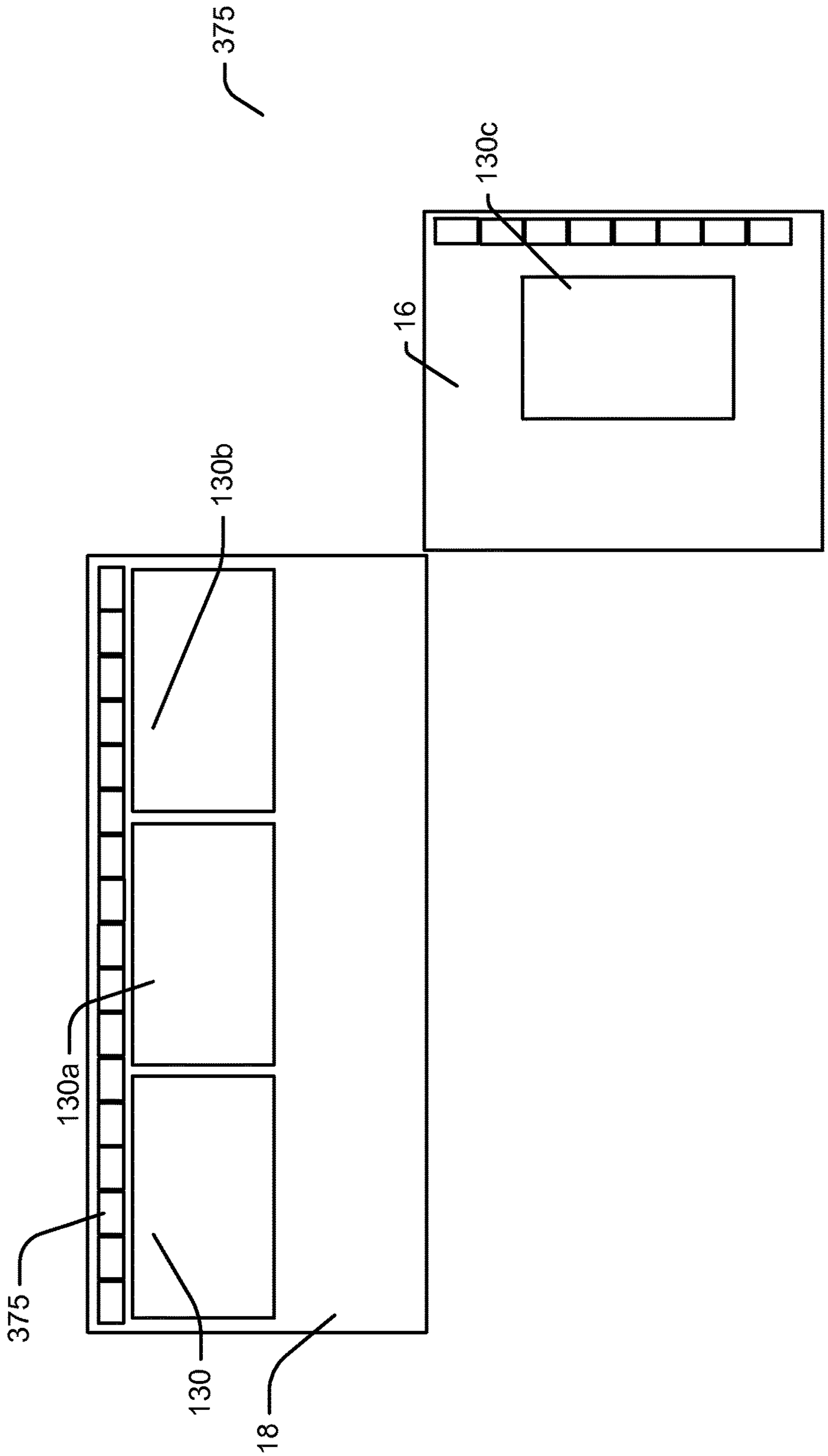
FIG. 26 shows content on two conference space walls as well as relatively smaller thumbnails of previously presented content.

In at least some embodiments a system may at least temporarily store all or at least a subset of content presented via common content fields on the emissive surfaces for subsequent access during a collaboration session. For instance, referring to FIG. 26, any time content is shared in one of the content fields 130, 130*a*, 130*b* or 130*c* and is then replaced by other content or otherwise removed from the content field, the replaced or removed content may be stored as a still image. In the case of dynamic application output, in addition to storing a still image, an application identifier and an instantiation file may be stored with the still image for, if desired, re-initiating the application to recreate the dynamic output at a subsequent time. In FIG. 26, archived content is shown as still image thumbnails at 375 where the thumbnails extends along a top portion of wall 18. Once the thumbnails extend along the entire width of wall 18, the additional thumbnails 375 may continue along other walls that define a collaboration space. Here it is contemplated that any one of the thumbnails 375 may be selected to move the content into one of the existing content fields or into an open space on one of the wall surfaces to create a new content field for sharing. Where an image associated with an application identifier and an instantiation file is moved into a content field, processor 50 may cause the application program associated with the identifier to boot up and use the instantiation file to recreate the content associated with the still image.

Figure 27:
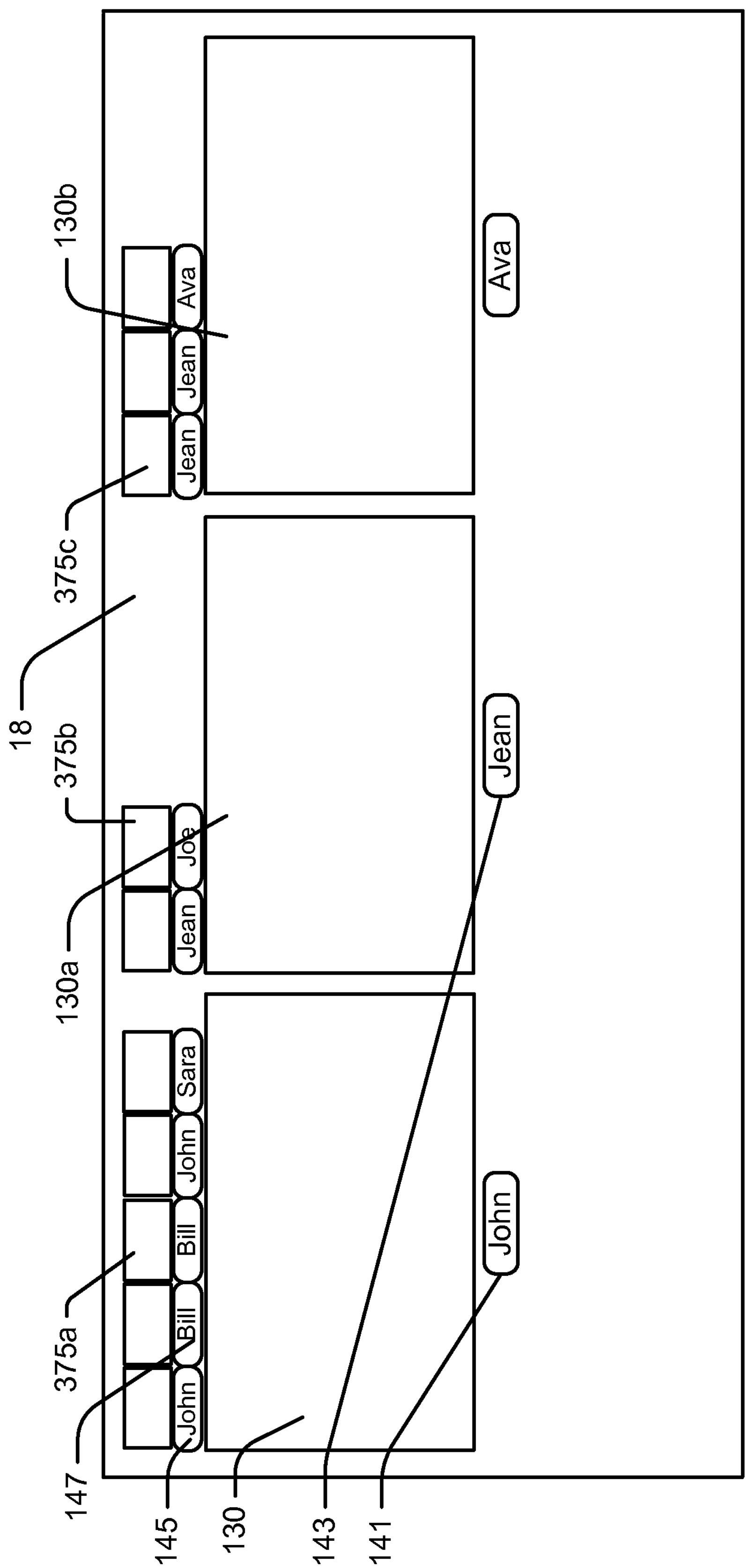
FIG. 27 shows content on content fields on a conference wall as well as author identifiers associated with each set of content.

In FIG. 27, a separate set of thumbnails 375*a*, 375*b*, 375*c* is provided for each of the content fields 130, 130*a* and 130*b*. Here, all content that is presented in field 130 and is then replaced in that field or otherwise removed, may be presented in set 375*a*. Similarly, all content that is presented in field 130*a* and is then replaced in that field or otherwise removed, may be presented in set 375*b* and all content that is presented in field 130*b* and is then replaced in that field or otherwise removed, may be presented in set 375*c*. As shown, five, two and three images are presented in sets 375*a*, 375*b* and 375*c*, respectively, indicating prior content of fields 130, 130*a* and 130*b*.

In at least some embodiments indicators of some type may be presented with each content field on a space wall indicating who posted the current content in the field and perhaps who posted previous content as well. For instance, see in FIG. 27 that simple identifiers 141 and 143 are provided below each content field 130 and 130*a* indicating the conferee that posted the content in each field, respectively. Similar identifiers 145 and 147, etc., are provided proximate each of the prior content thumbnails (e.g., the images in set 375*a*, etc.) to indicate conferees that posted that content. In at least some cases identifiers 141, 143, 145, etc., may be color coded to specific conferees. For instance, in some cases all identifiers for a conferee named "John" may be red, all identifiers for a conferee named "Ava" may be pink, and so on.

Figure 28:
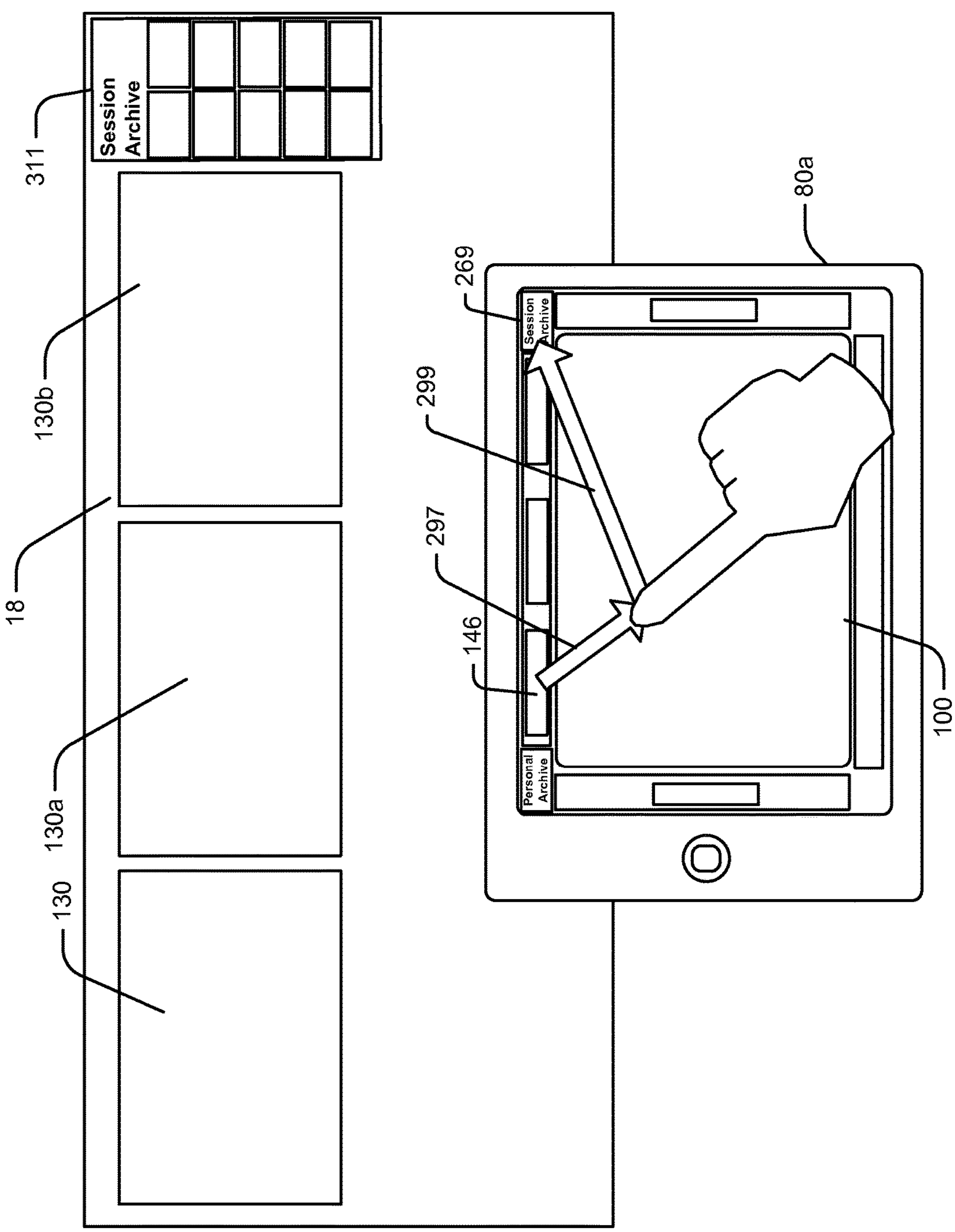
FIG. 28 shows a conference space wall including a session archive that is consistent with at least some aspects of the present disclosure.

In at least some embodiments conferees may be required to select content to be stored in a persistent fashion as part of session work product. To this end, it is contemplated that a session archive file may be maintained by processor 50 in database 52. In FIG. 28, an archive field 311 is presented on the emissive surface of wall 18. Here, a user device 80*a* includes, in addition to the content field icons 146, 148 and 150 associated with content fields 130, 130*a* and 130*b*, a session archive icon 269 that is directionally aligned with session archive field 311. In this case, a device 80*a* user can perform some directional gesture to add a still image (and perhaps a related application identifier and instantiation file) to the session archive. For instance, assume in FIG. 28 that content is currently presented in content field 130 that the device 80*a* user would like to add to the session archive. Here, the device 80*a* user may perform a first directional drag action as indicated by arrow 297 that starts in icon 146 associated with field 130 and ends in space 100 to replicate content from field 130 in space 100 on device 80*a*. Next, the device 80*a* user may perform a second directional drag action as indicated by arrow 299 that starts in space 100 and ends on icon 269 to replicate content from space 100 to the session archive 311 for storage.

Figure 29:
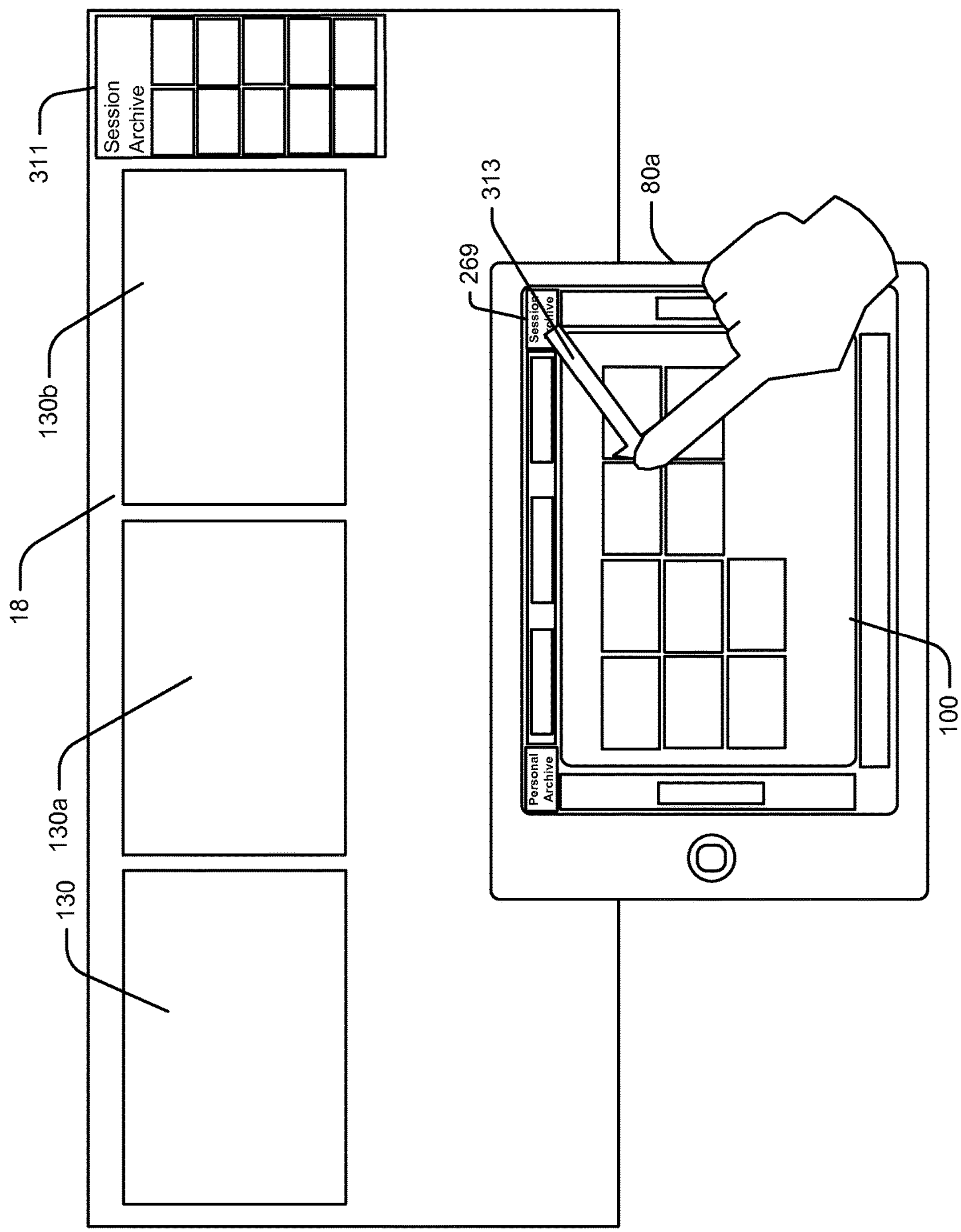
FIG. 29 shows an interface device being used to access a session archive that is consistent with at least some aspects of the present disclosure.

To access content in the session archive 311, referring to FIG. 29, a device 80*a* user may select the session archive icon 269 and drag to space 100 as indicated by arrow 313. As shown in FIG. 29 this action results in thumbnails of the archived images being presented in space 100. Tapping on any one of the thumbnails in space 100 may cause that thumbnail to be presented in large format in space 100. Here, a second drag action to one of the content field icons would cause the content from space 100 to be replicated in an associated content field.

Referring again to FIG. 28, it should be appreciated that there are several advantages to providing session archive field 311 in a vertically stacked fashion to one side of the content fields 130, 130*a*, 130*b*, etc. First, by providing archive filed 311 to one side, fields 130, 130*a* and 130*b* can be dimensioned with relatively large height dimensions. This is important as most collaboration spaces will include conference tables that obstruct the views of conferees of lower portions of space defining walls. For this reason content fields should be able to extend upward as much as possible in many cases. A content archive field 311 to the side of the content fields enables the option for larger height dimensions of the content fields.

Second, by presenting the archive field 311 to one side of the content fields, the directional interface on device 80*a* can be used to associate directional gestures with the session archive field 311 unambiguously. For instance, referring again to FIG. 26 where thumbnails 375 are above field 130. Here, how can an interface like the one presented via device 80*a* be used to unambiguously select the archived thumbnails as opposed to content field 130? In contrast, in FIG. 28, field 311 is the only field on wall 18 along the trajectory associated with gesture 299. Thus, one aspect of at least some embodiments includes presenting fields on emissive surfaces where the fields are limited to being arranged in a single row so that interface gestures can be unambiguously associated with specific fields.

It has been recognized that, while it is important to enable conferees to identify session content for storage in a session archive, many conferees may also find value in being able to create their own personal archive for a session. For instance, while viewing content presented by other conferees, a first conferee using device 80*a* may see content that is particularly interesting from a personal perspective that others in the conference do not think is worth adding to the session archive.

Figure 30:
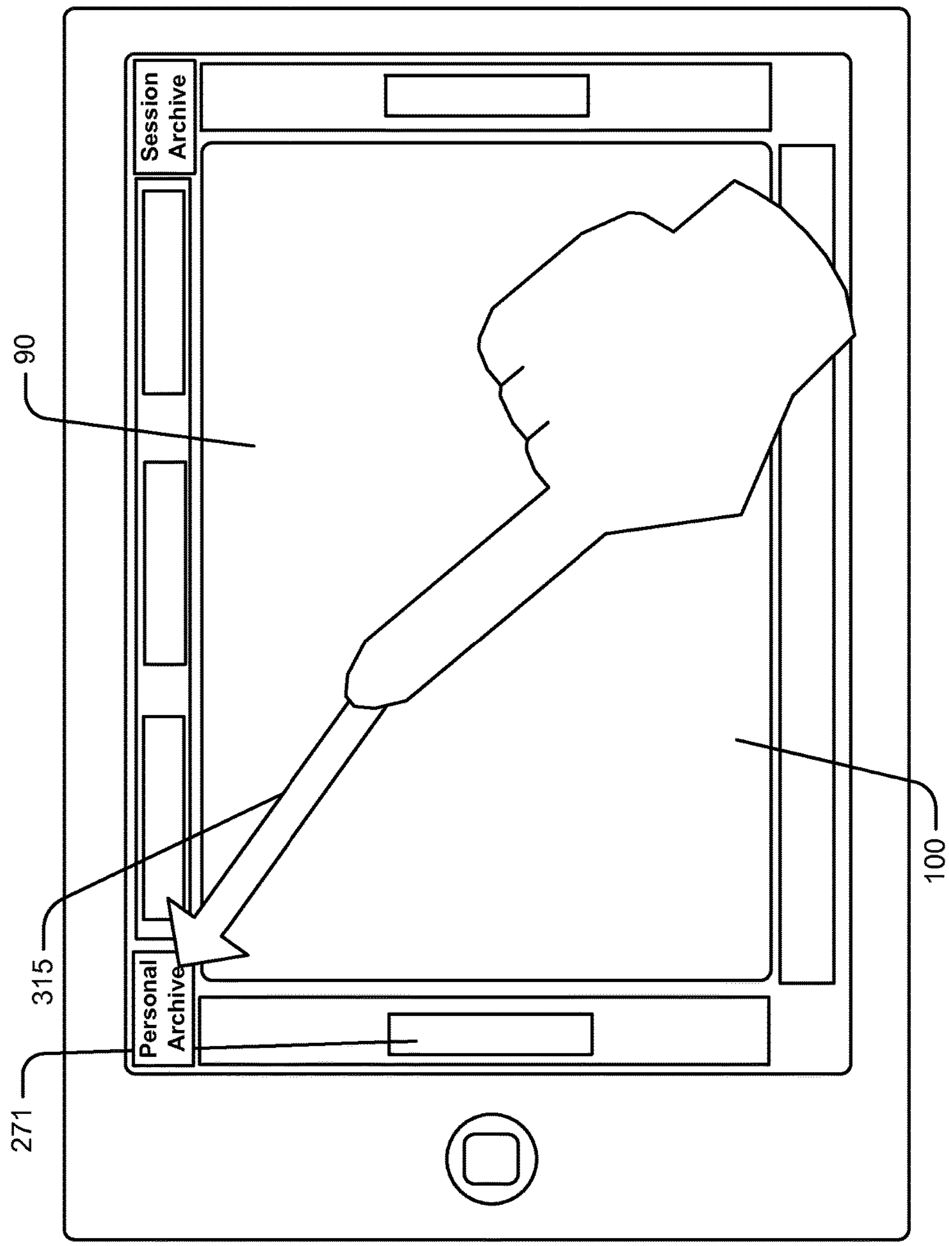
FIG. 30 shows an interface device being used to move content into a personal archive.

In at least some embodiments the system will support creation of personal archives for a session. To this end, see FIG. 30 where a personal archive icon 271 is provided on device 80*a* display screen 90. Here, to store content from space 100 in a personal archive, the device 80*a* user simply drags the content from space 100 to icon 271 as indicated by arrow 315. To review personal archive content, the device 80*a* user would simply drag from icon 271 to space 100 to access thumbnail images of the archive content.

In some cases it is contemplated that one or more of the emissive surfaces of walls 12, 14, 16 or 18 may be equipped to sense user touch for receiving input from one or more conferees in space 13. To this end, many different types of finger, stylus and other pointer sensing assemblies have been developed and any one of those systems may be used in embodiments of the present invention. Where one or more walls 12, 14, 16 or 18 is touch sensitive, the wall(s) may be used to control the number of content fields presented, locations of content fields and also to control content in the content fields. For instance, referring to FIG. 31, a system user is shown at 300 adjacent wall 18 where fields 130 and 130*a* already exist on wall 18. The user 300 in this embodiment may perform some gesture on or adjacent the surface of wall 18 to indicate that a new content field 130*b* (shown in phantom in FIG. 31) should be created. For instance, the gesture may include double tapping the space on wall 18 associated with where field 130*b* should be created. Another gesture may be simply drawing an "N" (see "N" at 302) for new field at the space on wall 18 associated with where field 130*b* should be created.

Figure 31:
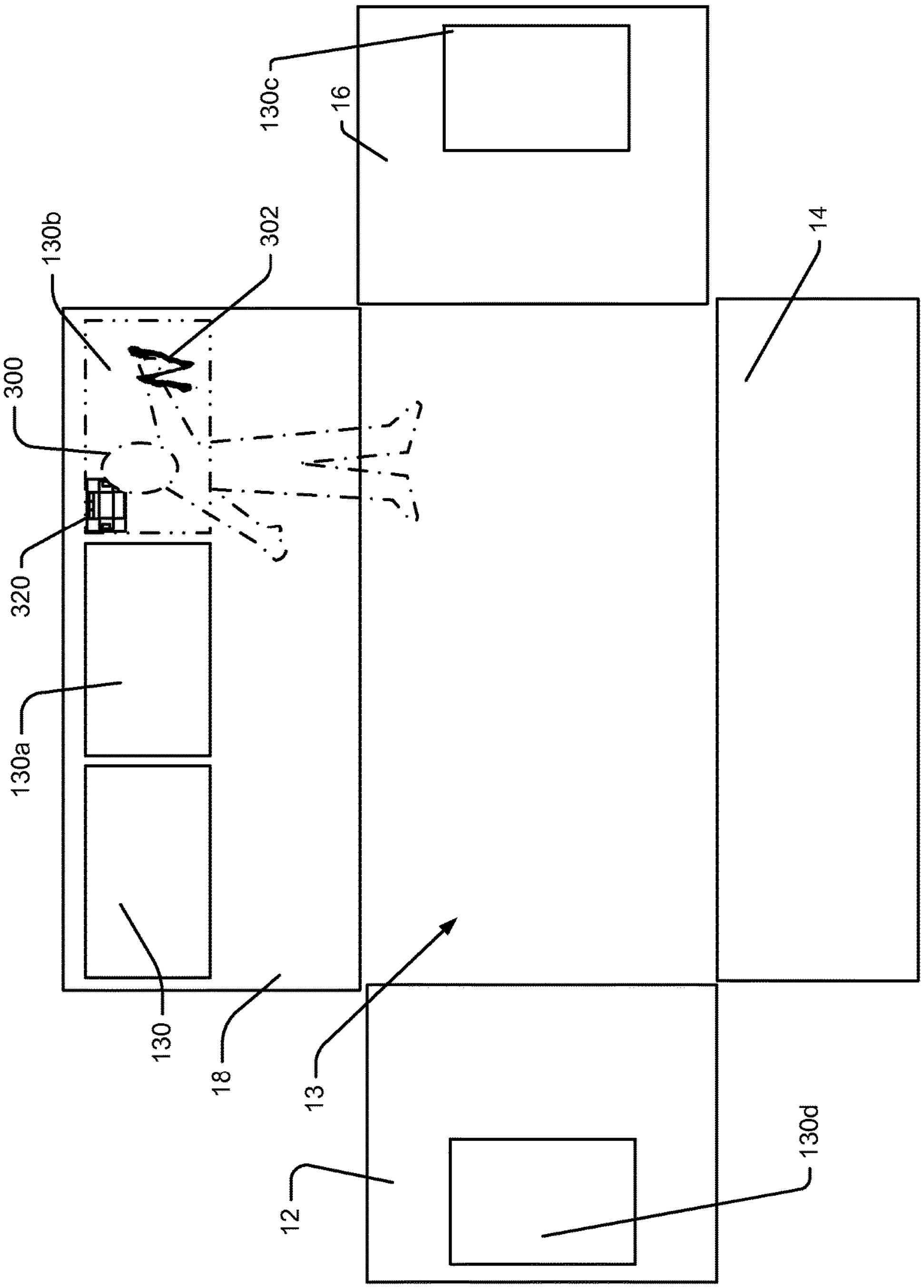
FIG. 31 shows a conference space where a space user creates a new content window or field on the conference wall.

Once a field 130*b* is created, the user 300 may be able to create content in field 130*b* by, for instance, running a drawing or doodling application. Once content is created in space 130*b*, the user may be able to move the content to other walls or fields associated with space 13 via directional swiping or other directional indication on the wall 18 surface. To this end, in at least some embodiments it is contemplated that that a direction interface akin to one of the interfaces described above may be presented to a user either persistently when the user is modifying content on a wall surface or upon recognition of a gesture intended to access the interface. For instance, in FIG. 31 an interface is shown at 320 which is shown in a larger view in FIG. 32. In FIG. 31, the interface 320 is presented adjacent the location of a user 300 interacting with the wall surface and at a location that clearly associates the interface 320 with field 130*b* as opposed to with other fields presented on wall 18. Thus, because user 300 is interacting with field 130*b*, interface 300 is presented at a location generally associated with field 130*b*. If the user were to move to a location adjacent field 130 and touched the wall at field 130, the interface 320 may be automatically presented adjacent field 130 in a spatial juxtaposition that clearly associates the interface 320 with field 130 as opposed to other fields on wall 18.

Figure 32:
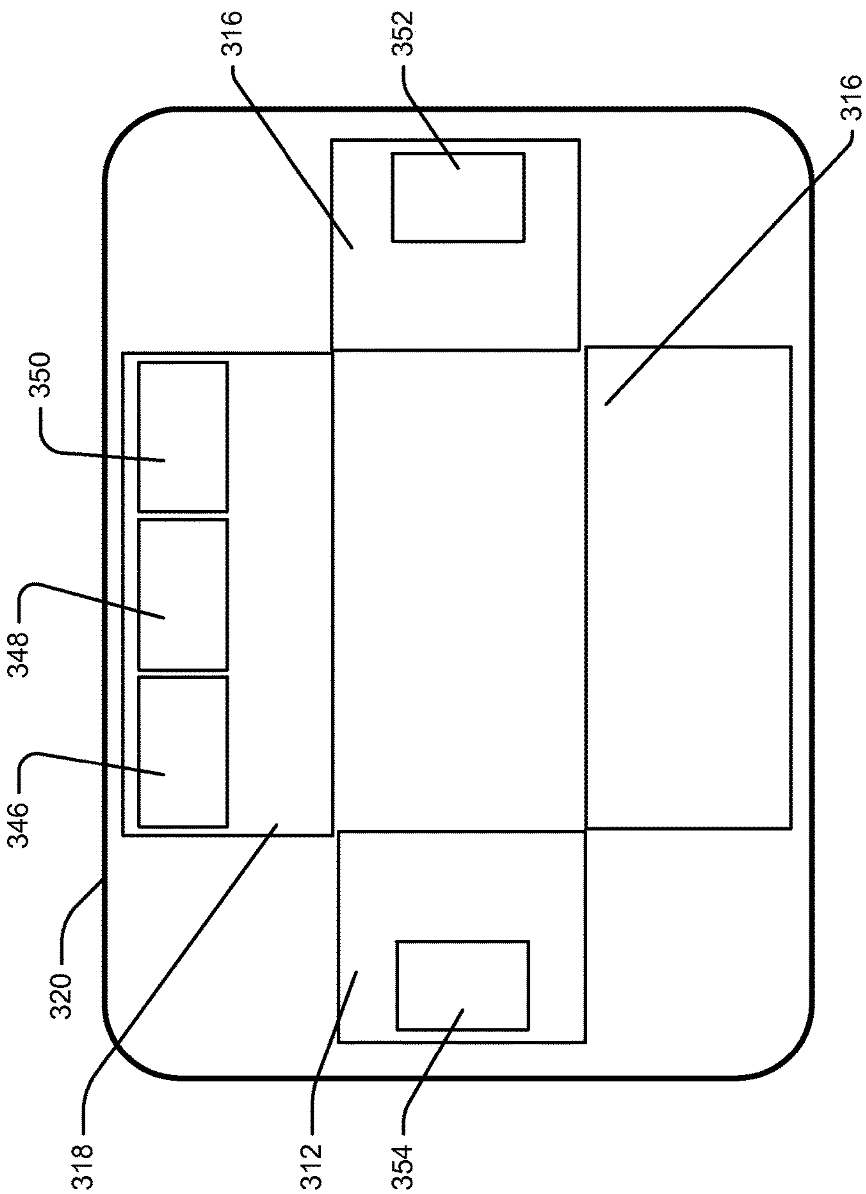
FIG. 32 is similar to FIG. 31, albeit showing the new content fields.

In FIG. 32, it can be seen that interface 320 has an appearance that generally mirrors the physical layout of space 13 including wall fields 312, 314, 316 and 318. In addition, content field icons 346, 348, 350, 352 and 354 are presented in wall fields 312, 316 and 318 which correspond to currently generated content fields 130, 130*a*, 130*b*, 130*c* and 130*d*. Here, to move content from field 130*b* to another one of the existing fields, a user may simply touch and drag content from field 130*b* to one of the field icons 346, 348, 352 or 354. Importantly, field icons 346, 348, 350, 352 and 354 are generally directionally aligned with associated fields 130, 130*a*, 130*b*, 130*c* and 130*d* and therefore target content fields for content being moved should be relatively intuitive.

Figure 33:
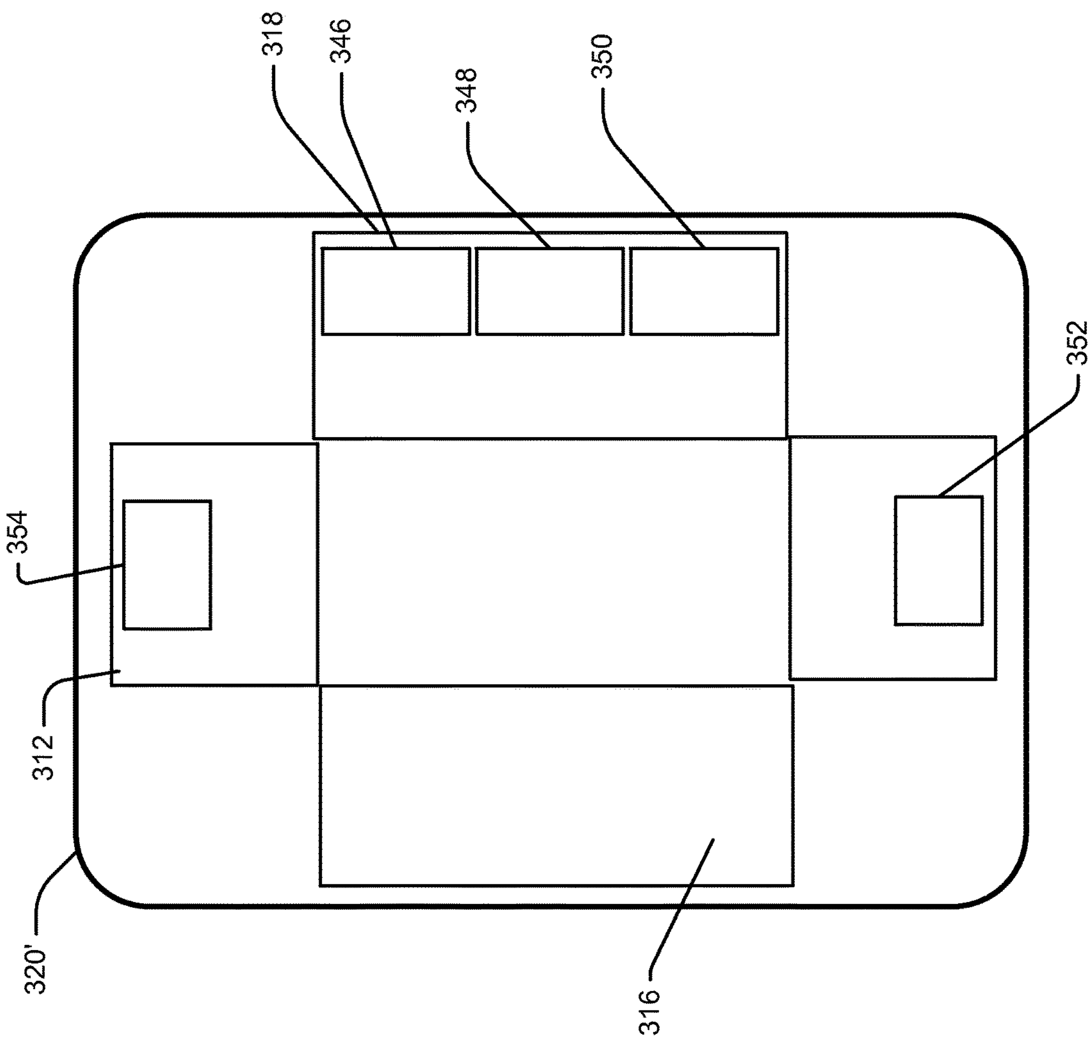
FIG. 33 is similar to FIG. 32.

It should be appreciated that if an interface like interface 320 is provided on one of the other walls 12, 14 or 16, the content field icons on that interface would be arranged differently to generally align with the locations of fields 130, 130*a*, etc., about space 13 relative to the location of the interface. For instance, see FIG. 33 where an interface 320' akin to interface 320 in FIG. 32 is shown, albeit for the case where interface 320' is located on wall 12 in FIG. 31. In FIG. 33, interface 320' is substantially aligned with the spatial layout of space 13 to again help orient users to walls and content fields to which content can be moved/replicated. As shown, wall field 312 is at the top of interface 320' and the other wall fields 314, 316 and 318 as well as existing content fields 346, 348, 350, 352 and 354 are arranged accordingly.

Figure 34:
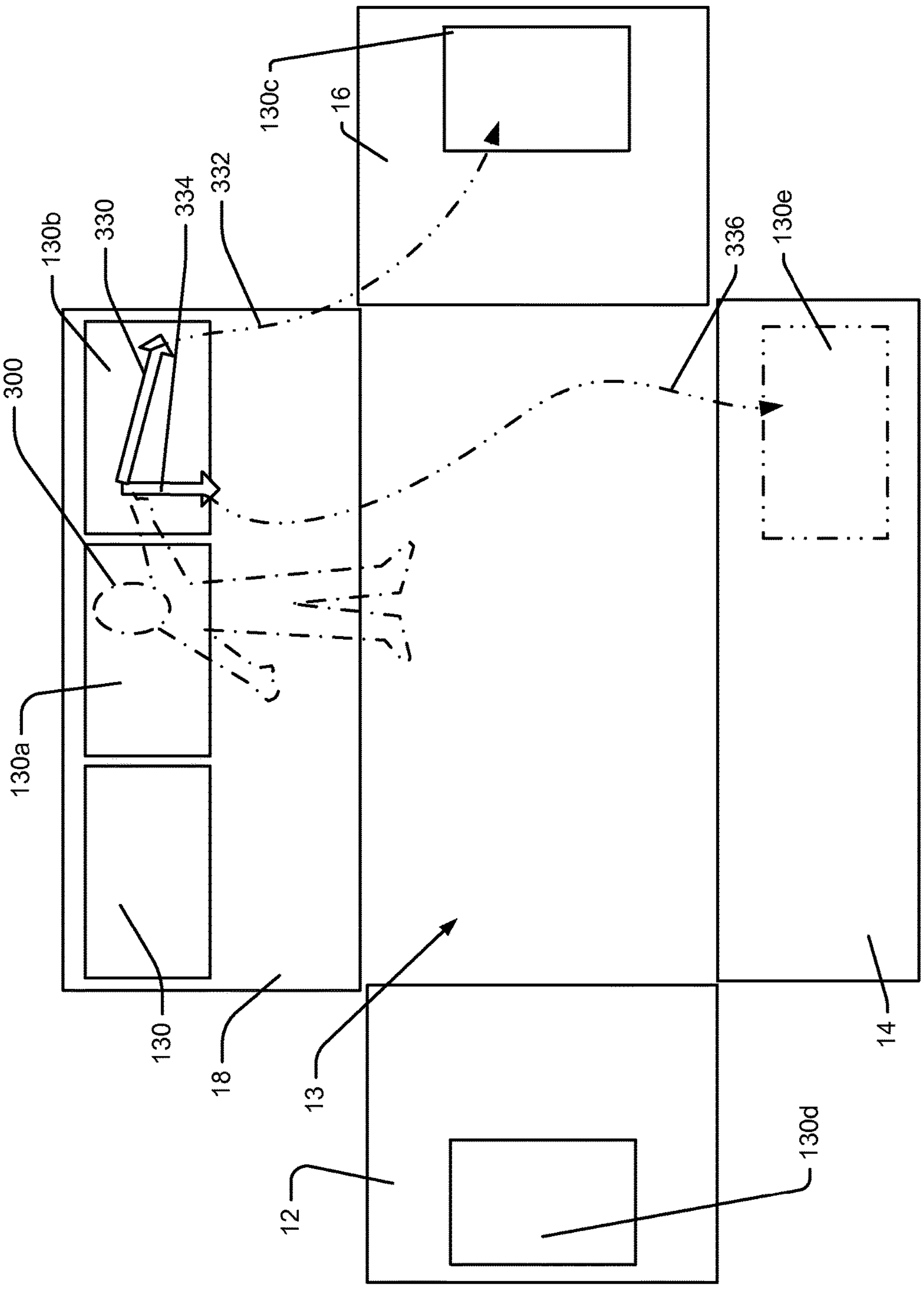
FIG. 34 includes a schematic diagram illustrating a conference space wherein a space user gestures on a content field to move content to a different content field on a wall within the space.

In still other embodiments the wall surface interface provided by a conferencing application may be programmed to truly support directional content movement. To this end, for instance, referring to FIG. 34, with content already presented in content field 130*b*, if a user 300 swipes to the right as indicated by arrow 330, the content in field 130*b* may be moved to existing field 130*c* on wall 16 as indicated by dashed arrow 332. Similarly, if user 300 swipes downward (or upward) as indicated by arrow 334, the content in field 130*b* may be moved to wall 14 and used to fill a new content field 130*e* as indicated by arrow 334.

Figure 35:
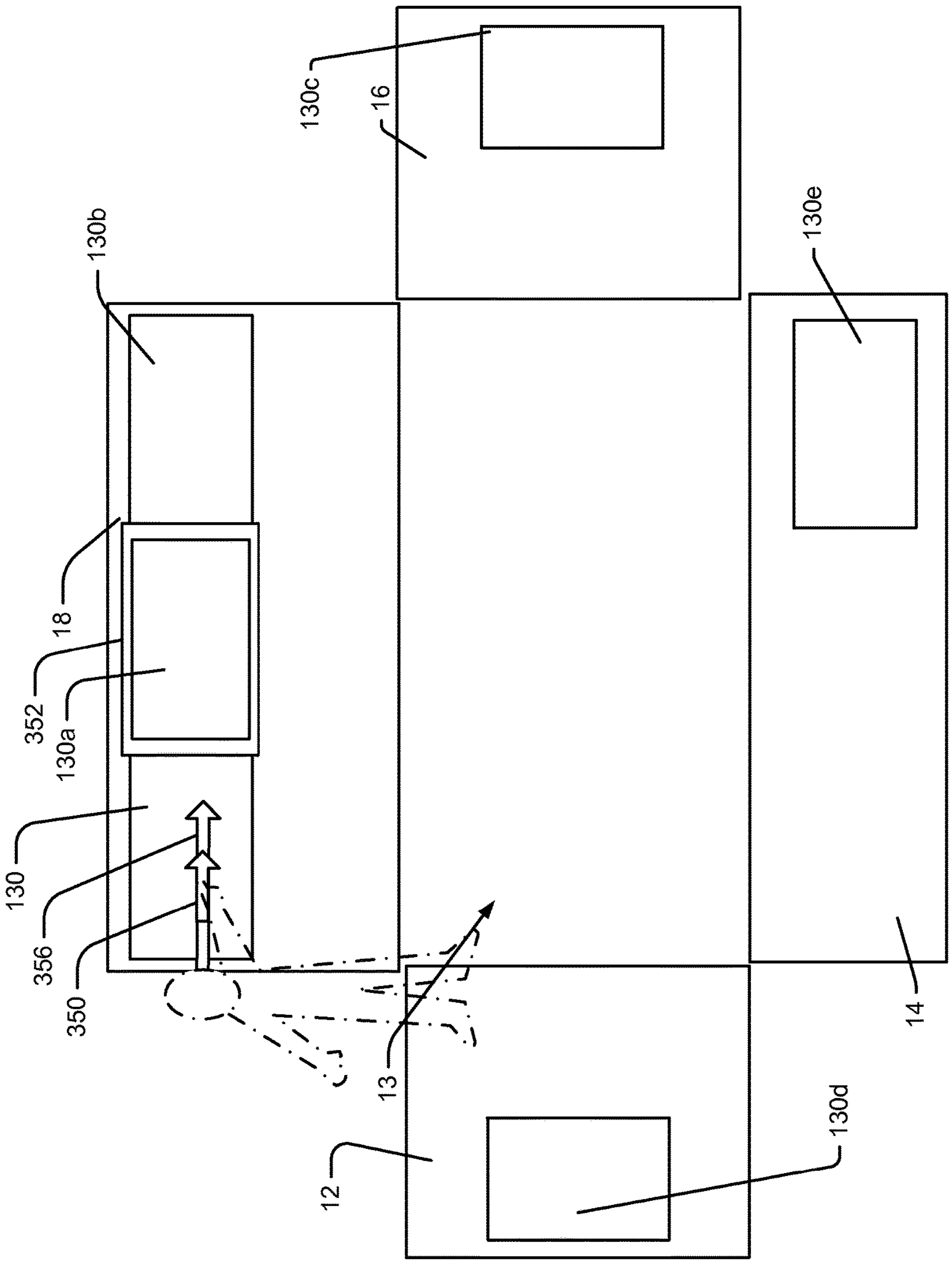
FIG. 35 is similar to FIG. 34, albeit showing a space user moving content from one field to the next that is consistent with other aspects of the present disclosure.

In still other cases the interface may allow a user to start a content moving swipe gesture and continue the swipe gesture as additional swiping causes an indicator to move about the fields on walls 12, 14, 16 and 18 visually distinguishing each field 130, 130*a*, etc., separately until a target content field is distinguished. Then, with a target field distinguished, the user may discontinue the swipe action indicating to processor 50 that the content should be moved to the distinguished field. For instance, in FIG. 35, with content initially presented in field 130, a relatively short swiping gesture in field 130 to the right as shown by arrow 350 may cause the next field 130*a* to the right of field 130 to be highlighted 352 temporarily. At this point, if user 300 were to lift her finger from the wall surface, content from field 130 would be moved to field 130*a*. However, if the user continues the swipe action further as indicated by arrow 356, the highlight would be removed from field 130*a* and the next right field 130*b* would be highlighted (not illustrated). Again, if the user were to lift her finger at this point, the content from field 130 would be moved to field 130*b*. Extending the swipe action further would continue to cause the highlight to move around the wall content fields until a target field is highlighted. In addition to highlighting, when a field is temporarily selected, the field may be increased in size (e.g., 20%) to make the field stand out as clearly instantaneously selected.

Figure 36:
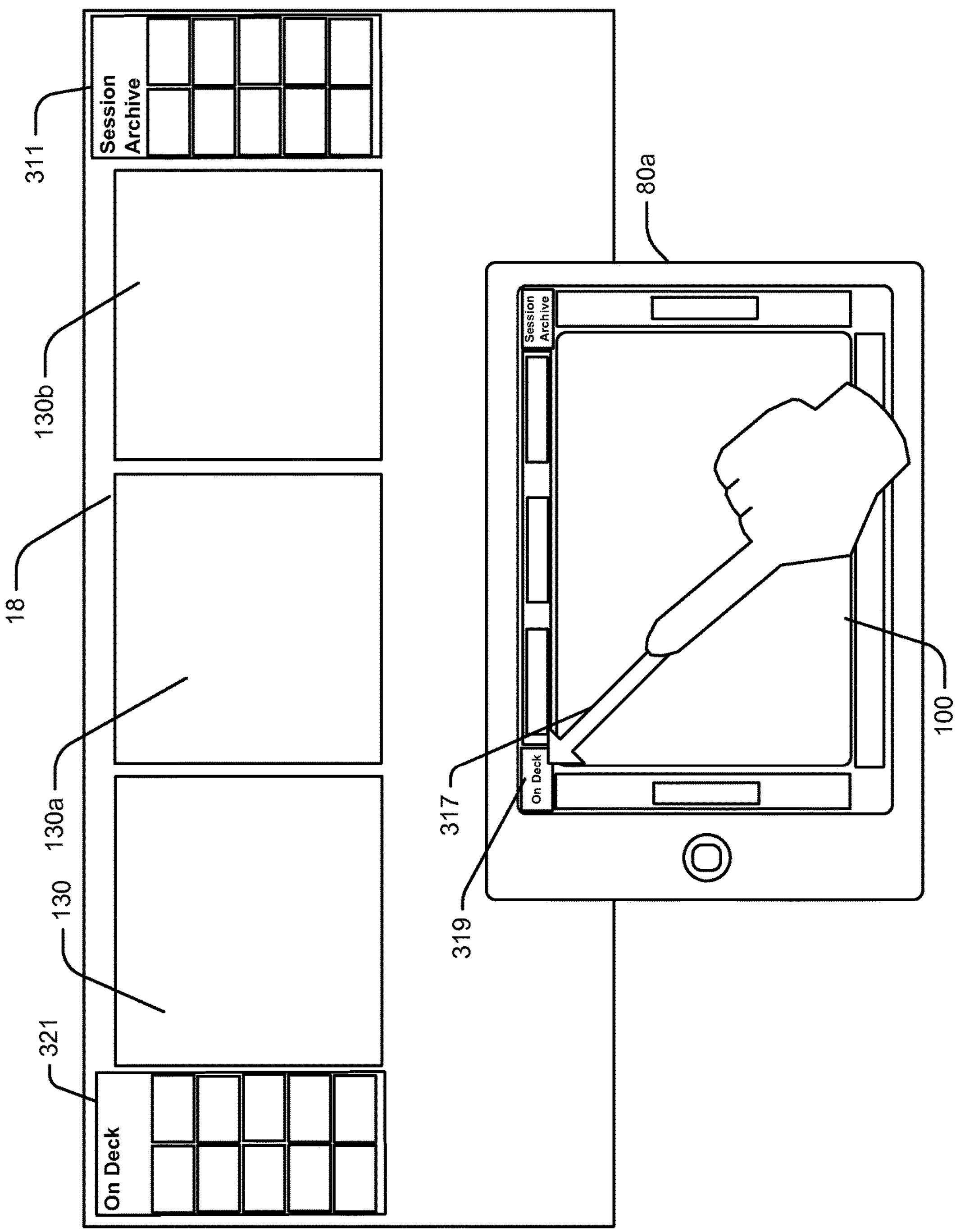
FIG. 36 is a schematic illustrating an on deck queue on a conference space wall and movement of content from an interface device into the on deck queue.

While the systems described above are designed around a generally egalitarian philosophy of control where any conferee can take control at essentially any time of any content field or even create additional content fields, in other embodiments the system may enforce at least some rules regarding how can control what and when. For instance, one system rule may be that where a content field on a primary wall is currently being controlled by one conferee, other conferees cannot take control of the field until the one conferee gives up control. In FIG. 36 assume that first, second and third conferees currently control fields 130, 130*a* and 130*b* and that a fourth conferee want to present content in one of those fields. Here, the fourth conferee's device 80*a* may include an "On Deck" icon 319 for receiving content waiting to be shared via one of the primary wall fields. The device 80*a* user may drag content from space 100 to icon 319 to add a thumbnail associated with the content to an on deck field 321 on the wall 18. Once a thumbnail is added to field 321, the thumbnail is placed in a queue and will be presented in one of fields 130, 130*a* and 130*b* when the thumbnail comes up in the queue and one of the fields is available. Here, again, field 321 can be directionally represented by icon 319 on device 80*a* for intuitive directional interaction.

Figure 37:
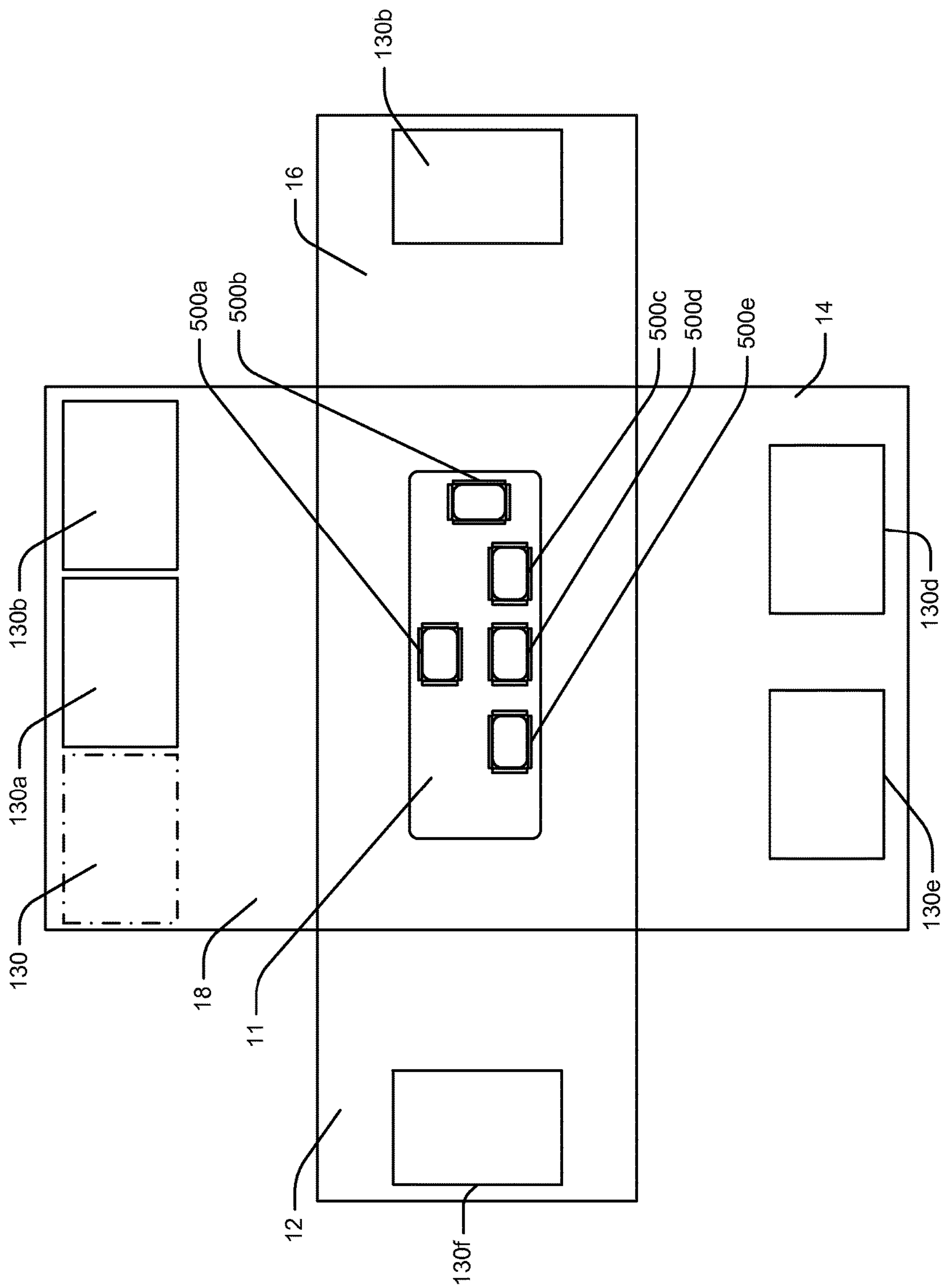
FIG. 37 is a schematic illustrating five interface prepresentations provided by an emissive table top surface within a conference with content in content fields on space walls.

In at least some embodiments other emissive surfaces may be presented in a conference space. For instance, see FIG. 37 that shows table 11 in the space defined by emissive walls 12, 14, 16 and 18. In FIG. 37 it is assumed that at least the top surface of table 11 is emissive and therefore can be used to present information of different types. Here, for instance, instead of requiring conferees to carry around personal devices like devices 80*a*, 80*b*, etc., as described above, conferees may be able to open up personal content in a desktop or the like presented on the table top surface 11 and then share from the desktop to wall surfaces that are better positioned for sharing content in the collaboration space. To this end, in FIG. 37 several virtual desktops are shown at 500*a* through 500*e*, one for each of five separate conferees. Here, it is envisioned that conferee location may be established about the table 11 and separate desktops generated at the locations of the conferees. For instance, surface 11 may be touch sensitive and a first conferee touch at a location may be sensed and cause a desktop to open. After identifying a specific conferee, content for the conferee may be accessible in the desktop.

Figure 38:
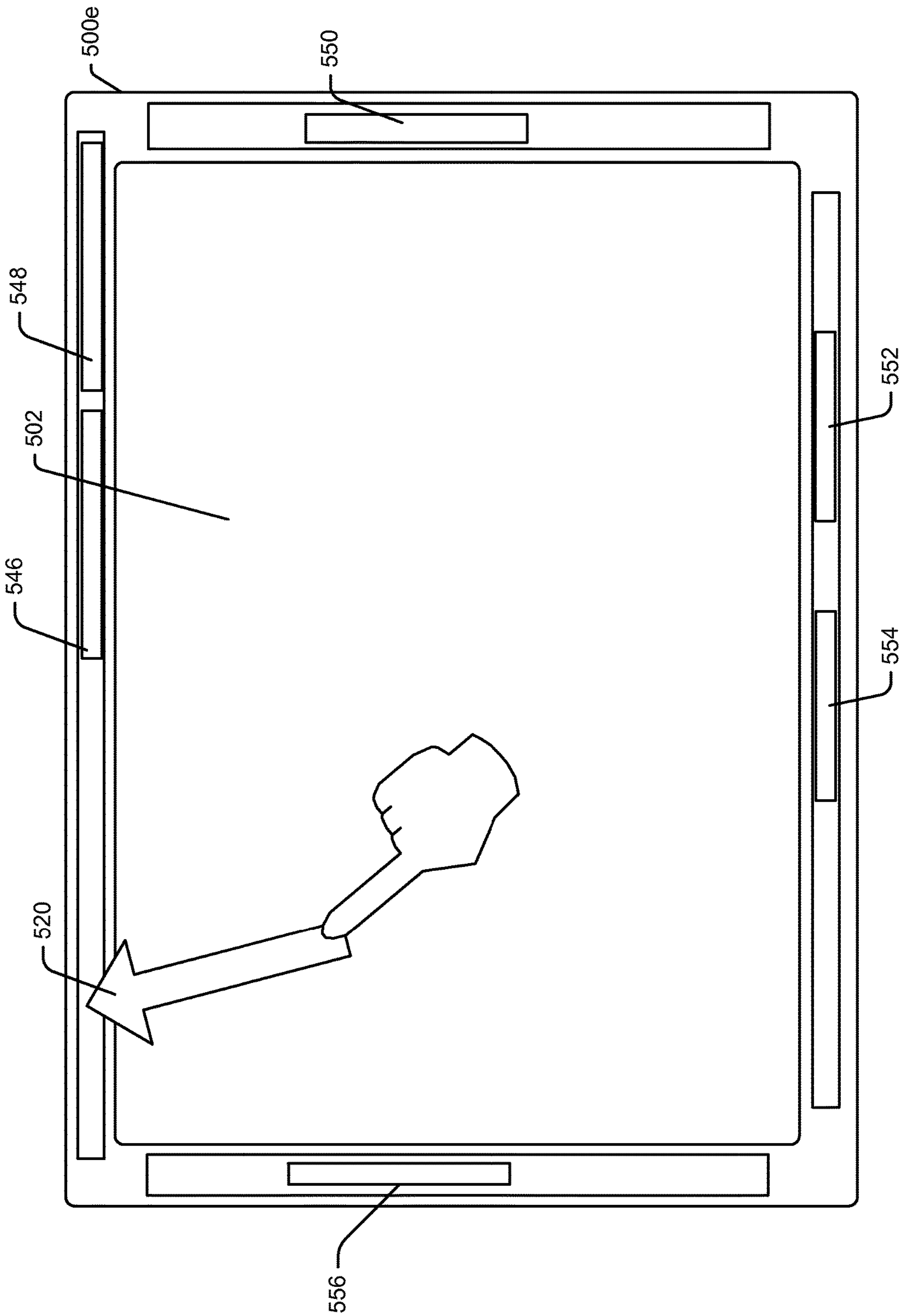
FIG. 38 is a schematic illustrating one of the interface devices including tools for interacting with content within the conference space in FIG. 37.

Referring also to FIG. 38, an exemplary desktop 500*e* is illustrated. Desktop 500*e* includes a general application workspace 502 in a central area as well as a frame around space 502 in which content field icons 546 through 556 are presented, a separate field icon for each of the existing content fields in FIG. 37. Comparing FIGS. 37 and 38 it should be appreciated that the field icons 546 through 556 are each directionally aligned with an associated one of the content fields 130*a* through 130*f*. Thus, for instance, field icon 546 would be substantially aligned with content field 130*a* in FIG. 37 while field icon 556 would be substantially aligned with content field 130*f*. Here, as in the embodiments described above, content from space 502 may be replicated in a content field in FIG. 37 by directionally swiping or otherwise directionally gesturing from space 502 toward or to one of the icons 546 through 556. A new content field may be created by directionally gesturing as indicated by arrow 520 to an open space in the border. To this end see also the phantom field 130 in FIG. 37 that would be created pursuant to the action associated with arrow 520 in FIG. 38. Where a new field is added to one of the space walls (e.g., field 130), a new content field icon would be added to the desktop 500*e* in a location aligned with the new field. Other operational features and options described above with respect to other interfaces may be supported in a similar fashion in the context of virtual desktop 500*c*.

Figure 39:
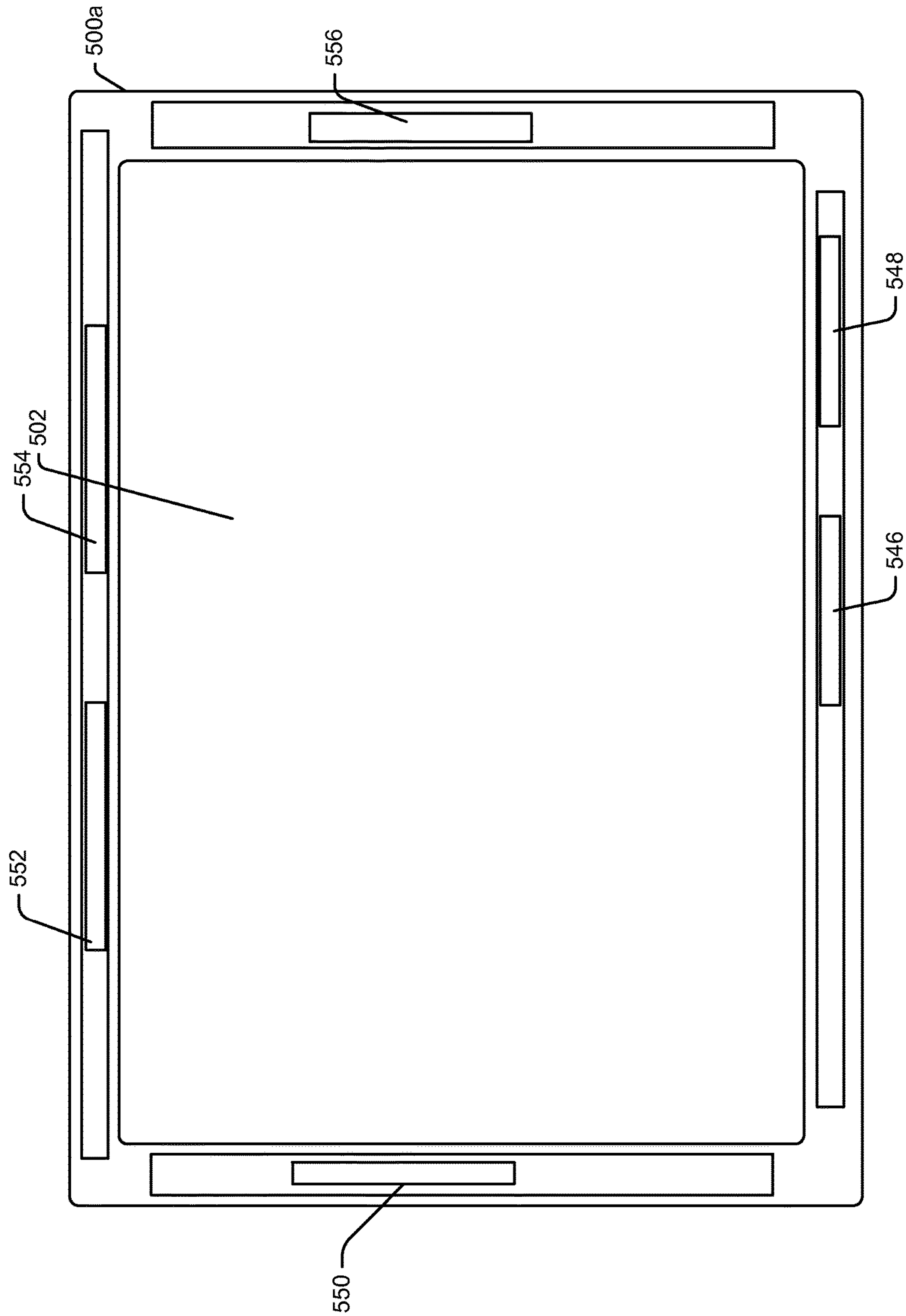
FIG. 39 is similar to FIG. 38, albeit illustrating the tools presented via a different one of the interfaces in FIG. 37.

Referring again to FIG. 37, while the interfaces provided with each desktop have similar general characteristics, the field icons (e.g., 546 through 556 in FIG. 38) would be located differently so that they would directionally align with the content fields 130*a* through 130*f* to provide an intuitive directional interface. To this end, see exemplary virtual desktop 500*a* in FIG. 39 where field icons 546, 548, 550, 552, 554 and 556 are arranged about a border area so that, from the perspective of desktop 500*a* in FIG. 37, the icons should align with associated content fields 130*a* through 130*f*, respectively, to facilitate directional replication and other directional interface activities as described above.

In at least some cases it is contemplated that the emissive wall surfaces may be formed using large flat panel displays arranged edge to edge. To this end, see FIG. 40 where a generally rectilinear conference space 13 is defined by four walls 12, 14, 16 and 18 and where large flat panel displays 600*a* through 600*g* are mounted to the walls. Two large (e.g., 80 to 100 inch diagonal) displays 600*a* and 600*b* are mounted to wall 18 in an edge to edge arrangement so that the wall surface at least above a table top height (and perhaps extending to a lower level) is essentially emissive (expect for the portion covered by thin bezels around each display). A single large flat panel display 600*c* is mounted to wall 16 and a single large flat panel display 600*d* is mounted to wall 12. A single large flat panel display 600*e* is mounted to wall 14 and two smaller but still relatively large flat panel displays 600*f* and 600*g* are mounted to wall 14 adjacent panel 600*e* so that wall 14 is substantially covered by emissive flat panel surfaces (except for where the space egress would be located).

Figure 40:
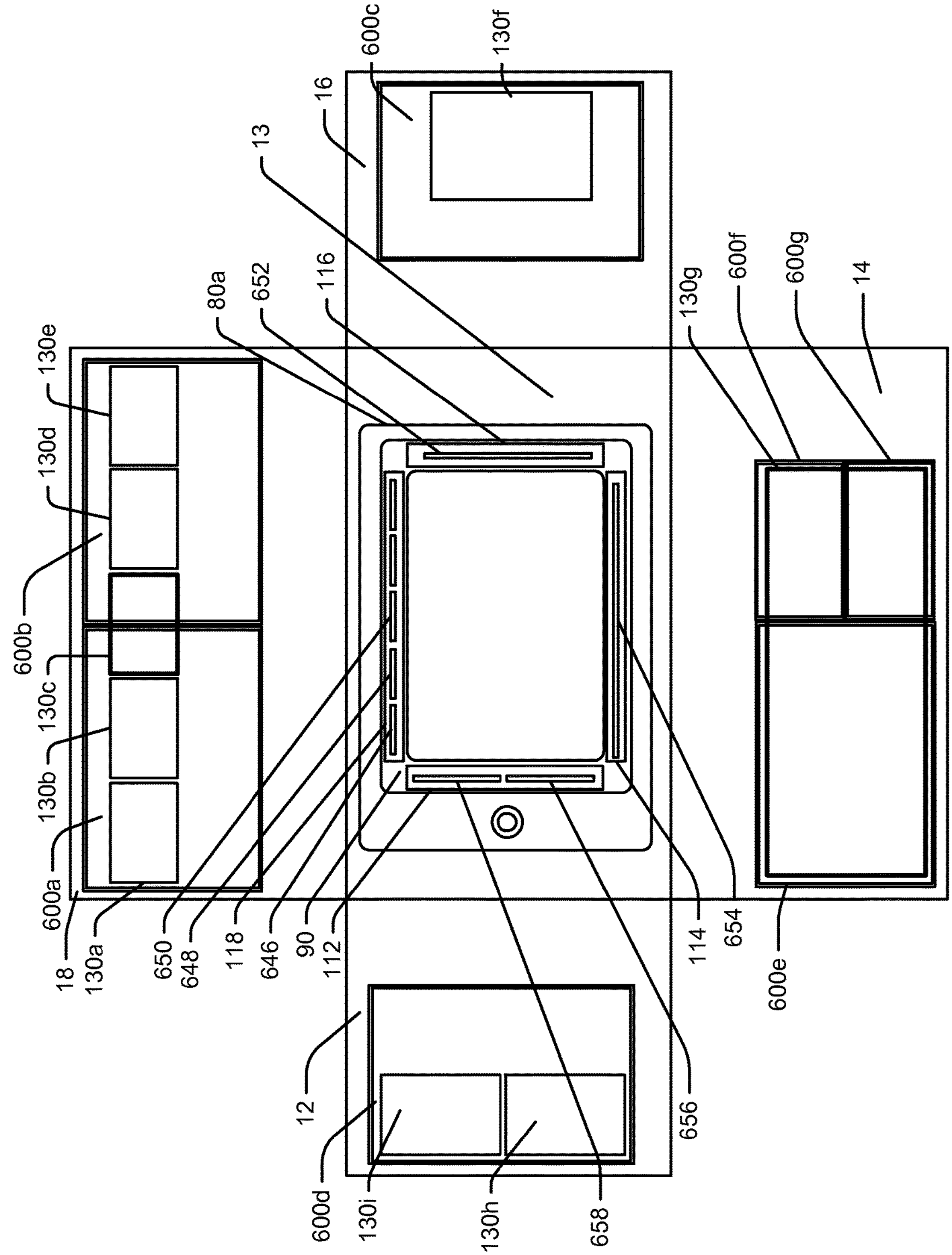
FIG. 40 shows yet another interface device within a conference space with tools for interacting with content presented in content fields on space walls.

In FIG. 40, the system server would operate in a fashion similar to that described above to enable dynamic creation of content fields on the emissive surfaces arranged about space 13 to suit the needs of conferees located in space 13 and to provide intuitive dynamic directional interfaces for the conferees to control the creation of content fields and the content presented in each of the fields. For instance, in FIG. 40, five content fields 130*a* through 130*e* are shown on the panel displays 600*a* and 600*b*. Content field 130*c* is located centrally with respect to displays 600*a* and 600*b* and therefore is shown half on the surface of display 600*a* and half on the surface of display 600*b*. One content field 130*f* is provided on display 600*c* and two content fields 130*i* and 130*h* are provided on display 600*d*. As shown, the sizes of the fields on displays 600*a* through 600*d* are different and may be a function of the number of content fields created on the displays associated with each wall. To this end, the five fields field 130*a* through 130*f* on wall 18 are relatively smaller than the two fields 130*h* and 130*i* on wall 12 which are in turn relatively smaller than the single field 130*f* on wall 16. A single large field 130*g* is provided on the combined emissive surfaces of the three displays 600*e* through 600*g*. Where the display bezels are relatively thin, any content field that traverses across bezels of adjacent display screens will be only minimally disrupted and should not affect content presentation substantially.

Referring still to FIG. 40, a single portable conferee device 80*a* is shown in space 13 where, consistent with the description above, a graphical interface on the device display 90 includes a separate wall field 112, 114, 116 and 118 for each of the space walls 12, 14, 16 and 18, respectively, as well as content field icons for each of the content fields provided on the display screens about space 13. To this end, exemplary field icons 646, 648 and 650 in wall field 118 correspond to spatially substantially aligned content fields 130*a* through 130*c* on wall 18 and field icons 652, 654, 656 and 658 in wall fields 116, 114 and 112 correspond to content fields 130*f*, 130*g*, 130*h* and 130*i*, respectively, on walls 16, 14 and 12. As shown, the sizes of the field icons 648 through 658 may be different and may be related to the relative sizes of associated content fields. For instance, field icon 646 corresponding to relatively small content field 130*a* on wall 18 is substantially shorter than content field icon 652 corresponding to relatively large content field 130*f* on wall 16. In addition to the directional aspect of the interface where field icons are directionally substantially aligned with related content fields, the different sizes of the field icons that are associated with different content field sizes help orient a device user within space 13.

Figure 41:
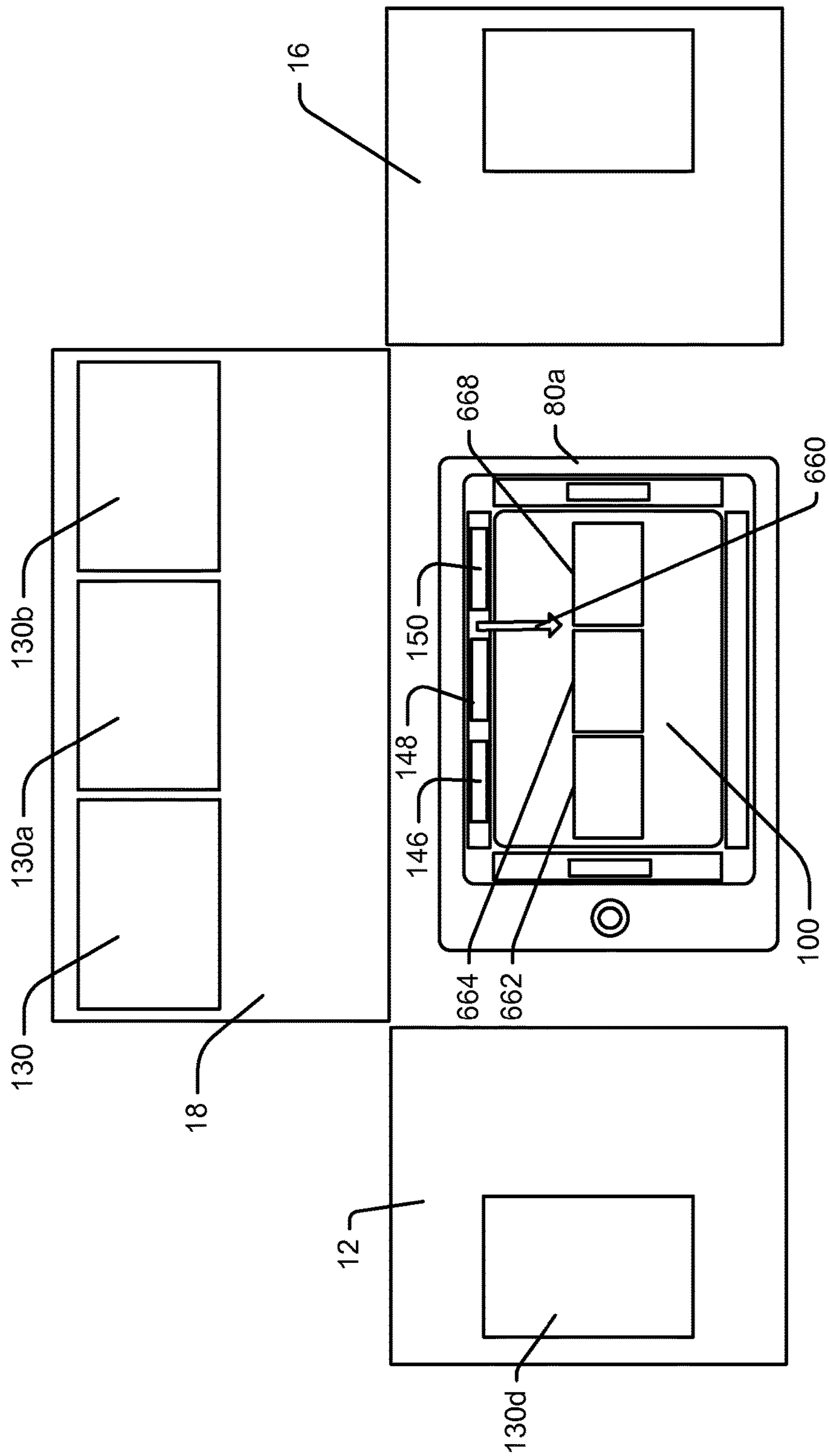
FIG. 41 shows an interface device being used to replicate content from a wall in a conference space on the interface device.

In some embodiments an conferee interface may enable a conferee to access the content of more than one field at a time. For instance, see FIG. 41 where the content fields 130, 130*a* and 130*b* on wall 18 are replicated in workspace 100 on device 80*a* as fields 662, 664 and 668. To facilitate this interface view of the fields on wall 18, a swiping action as shown by arrow 660 may be performed where the swipe begins in at a location in wall field 118 that is not associated with one of the content field icons 146, 148, 150 (i.e., initiated from a location between the field icons). This should be compared to FIG. 22 where swiping from a content field icon (e.g., 148) into space 100 causes the content from the single content field 130*a* associated with icon 148 to be replicated in space 100.

In some embodiments other directional queues are contemplated. For instance, see FIG. 42 where the directional queues on device 80*a* and 80*b* interfaces include single wall fields 118 and 116 corresponding to walls proximate and most aligned with top edges of devices 80*a* and 80*b*. Here, it is assumed that devices 80*a* and 80*b* are only used in the portrait orientation and a directional wall field is only provided along a top portion of the interface. In other cases devices may only be used in landscape mode and a directional wall field may only be provided along a long edge of the interface furthest away from a device user. In addition to enabling a potentially larger workspace 100*a*, 100*b* due to elimination of three of the wall fields about space 100*a*, 100*b*, the FIG. 42 interface allows full content replication of content in content fields on a wall that is "faced" by each device 80*a*, 80*b*. For instance, because device 80*a* is facing wall 18, content fields 682, 684 and 686 in wall field 118 may replicate the content in fields 130, 130*a* and 130*b* on faced wall 18. Similarly, because device 80*b* is facing wall 16, content field 680 in wall field 116 replicates the content in field 130*c* on faced wall 16. If device 80*a* were reoriented to the orientation of device 80*b* in FIG. 42, the interface on device 80*a* may be essentially identical to the interface on device 80*b*.

Figure 42:
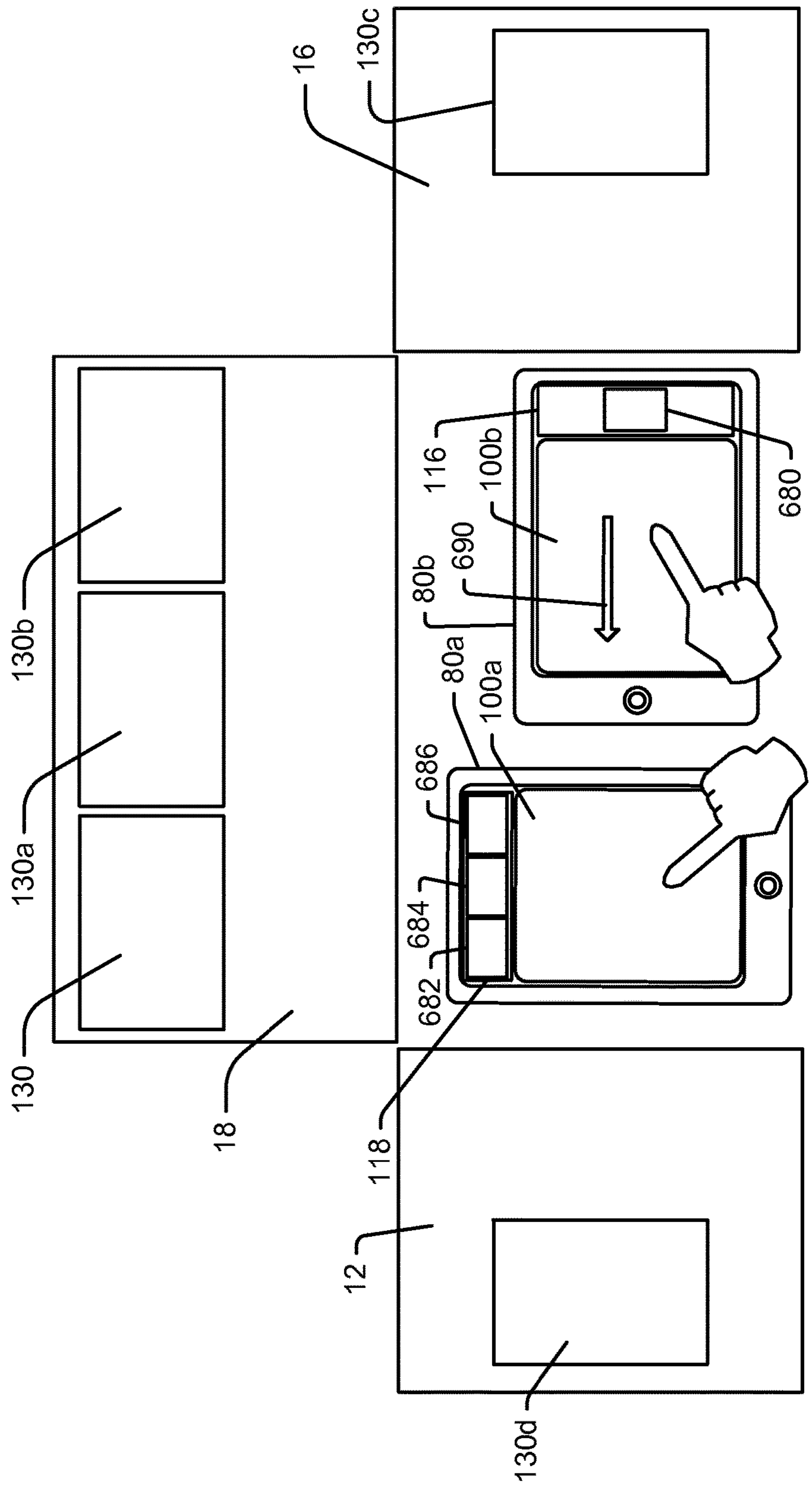
FIG. 42 shows first and second interface devices within a conference space where content from walls directly in front of the interface devices is replicated on the interface devices in a dynamic fashion.

In FIG. 42, in at least some cases multidirectional swiping action would be supported despite the fact that the illustrated interfaces only replicates a subset of the content field information about space 13. Thus, for instance, in these cases, a swipe as indicated by arrow 690 toward wall 12 would replicate content from space 100*b* in a content field on wall 12 while a swipe toward wall 18 would replicate content from space 100*b* in a field on wall 18. In other cases directional swiping may only be supported for swiping action toward the single wall field presented on a device interface so that a device user would have to turn the user's device toward a wall in order to replicate content into a content field on the wall. For instance, in FIG. 42, because device 80*a* currently faces wall 18, swiping action may only be toward that wall to cause content replication on that wall and any other swiping action to other walls (e.g., 12, 16) may not cause replication. To use device 80*a* to replicate on wall 16, device 80*a* would have to be rotated and reoriented as is device 80*b* at which point a forward swipe would replicate to wall 16.

Figure 43:
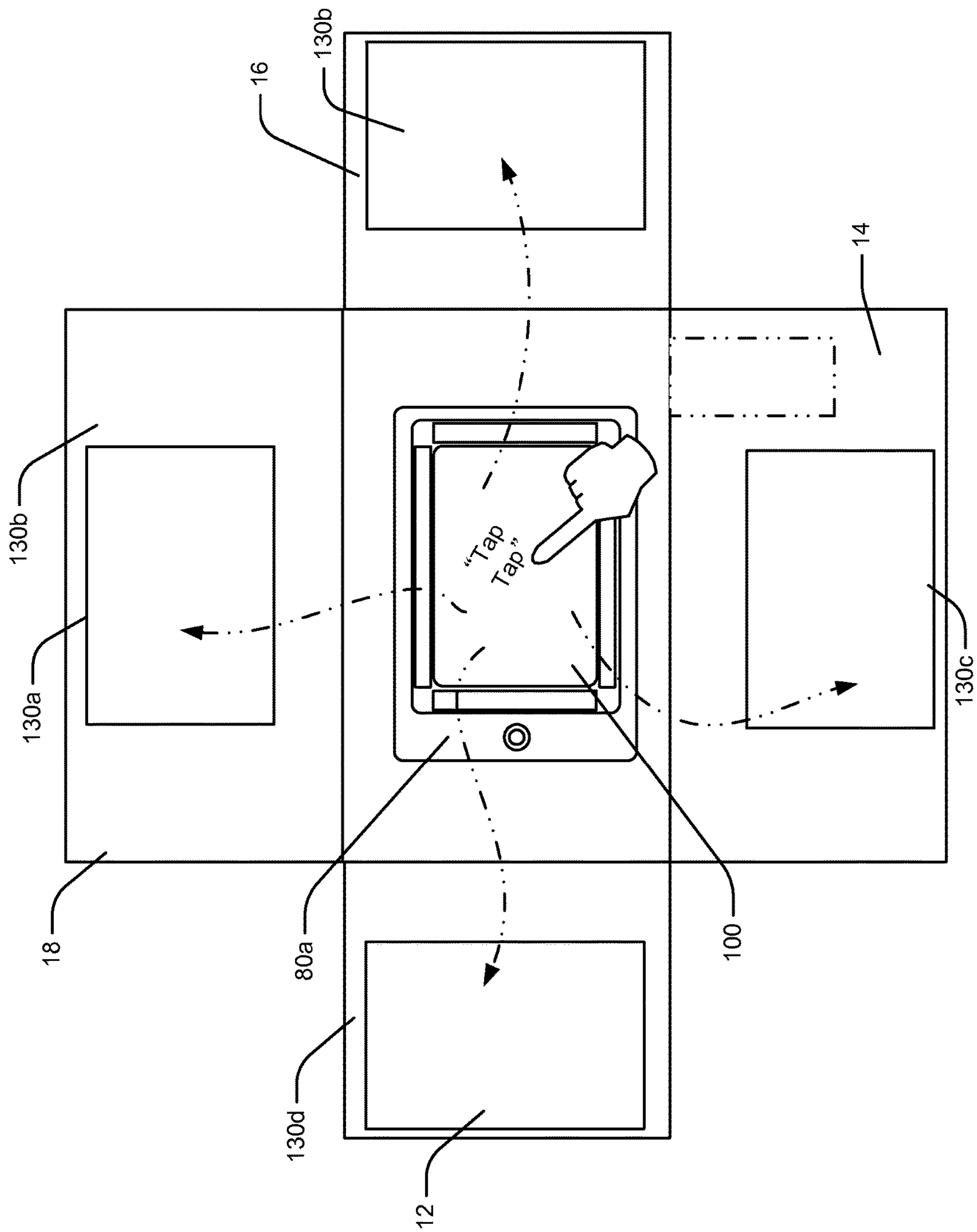
FIG. 43 is a schematic illustrating an interface device being used to move content from the interface device screen to each of the walls within a conference space via a gesture on the interface display screen.
Figure 44:
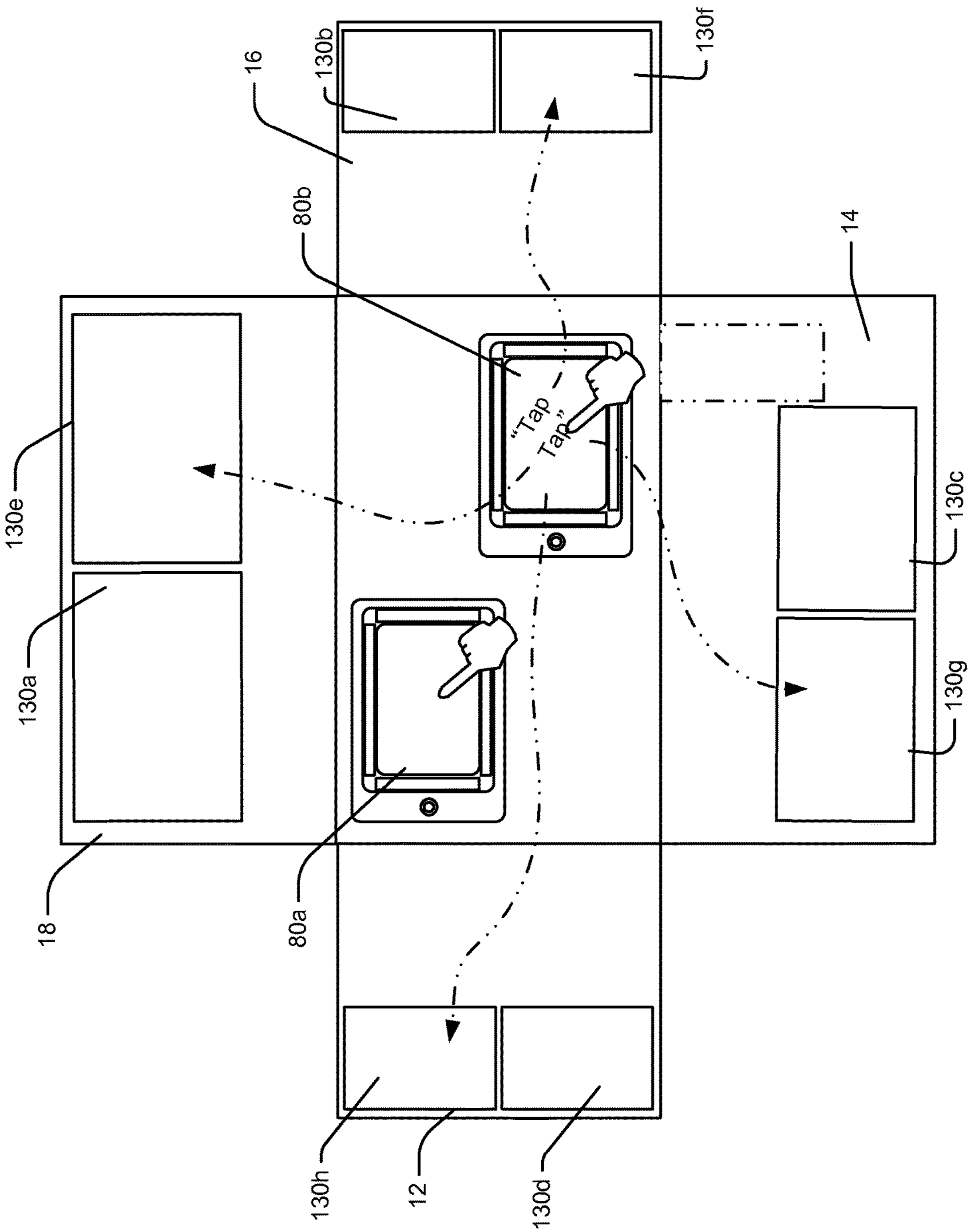
FIG. 44 is similar to FIG. 43, albeit showing content from a second interface device being added to content from a first interface device on space walls.

In some embodiments device interfaces may enable sharing on more than one emissive surface at a time when a specific control gesture is performed. For instance, see FIG. 43 where a dual tap is causes multiple surface sharing. More specifically, in FIG. 43, a dual tap in space 100 may cause interface 80*a* to send the content from space 100 to the system server along with a command to replicate the content on each of the four walls 12, 14 16 and 18 in relatively large content fields 130*a*, 130*b*, 130*c* and 130*d* as shown. Here, because only content from space 100 is replicated, fields 130*a* through 130*d* may be as large as possible given the dimensions of the walls 12 through 18. If a second user device were used to share on walls 12, 14, 16 and 18, in some cases the sharing action may simply replace content shared in FIG. 43 with content from the second device. In other cases, a second sharing action via a second device that follows a first sharing action via a first device 80*a* may cause the content fields 130*a* through 130*d* to be made smaller and may cause an additional four field 130*e*, 130*f*, 130*g* and 130*h* to be created for replicating the content from the second device. To this end, see FIG. 44 that shows second device 80*a* and additional content fields 130*e* through 130*h*. This process of replicating on all walls upon the specific sharing action may continue as other sharing actions are performed via other device.

Figure 45:
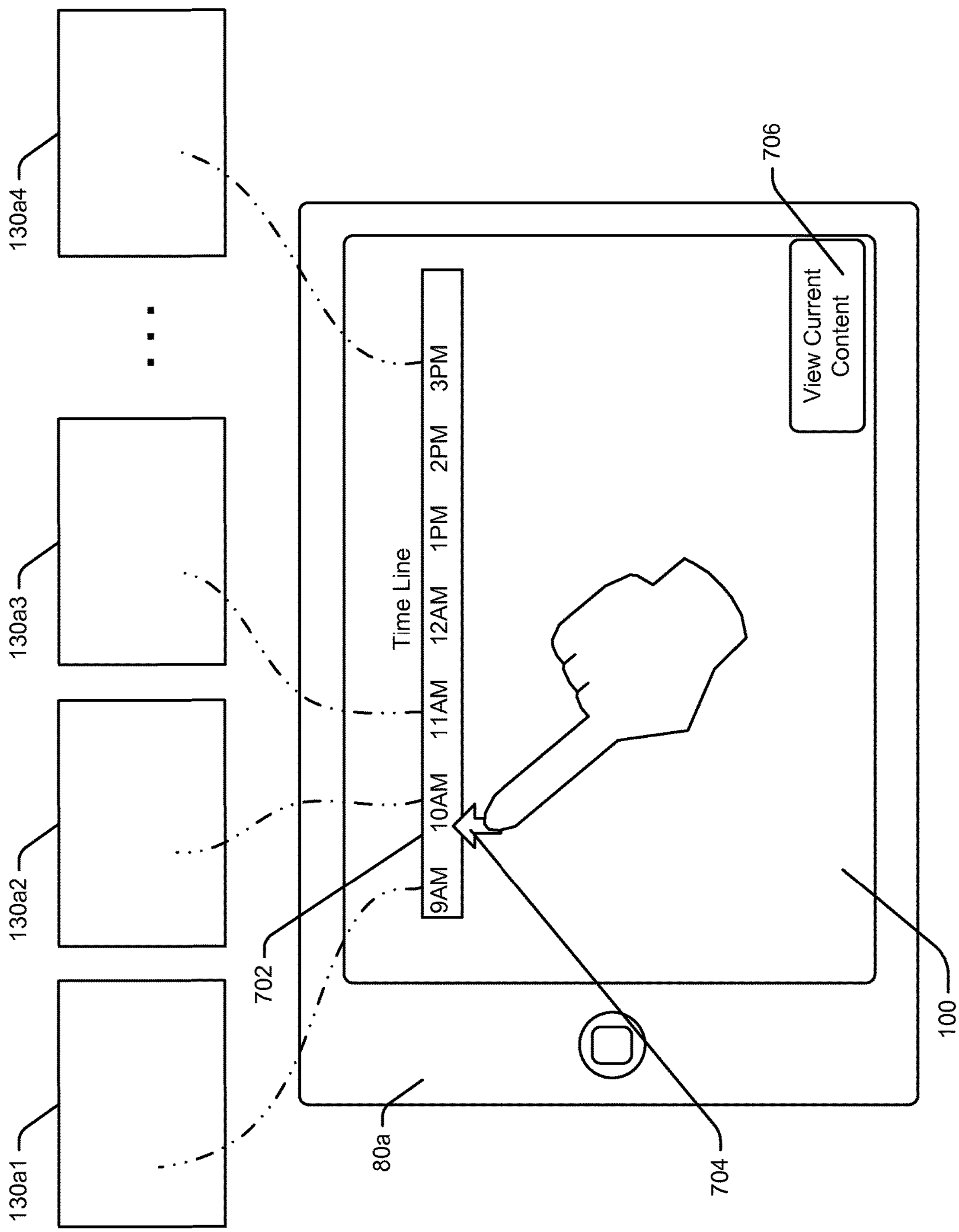
FIG. 45 is a schematic illustrating in interface device being used to access content associated with a time line.

It at least some embodiments it is contemplated that a history of content shared on the common emissive surfaces in a space 13 may be stored for subsequent access and viewing. To this end, in some cases the system server may simply track all changes to the shared content so that the content shared at any point in time during a session may be accessed. In other cases the server may periodically store content such as, for instance, every 15 minutes or every hour so that snapshots of the content at particular times can be accessed. In still other embodiments content may be stored whenever a command from a conferee to save a snapshot of the content is received via one of the conferee devices (e.g., 80*a*) or via one of the control interfaces. For instance, see selectable "Save" icon 701 in FIG. 22 that may be selected by any conferee to save an instantaneous snapshot of content in the content fields presented on walls 12, 14, 16 and 18 along with information specifying the arrangement of the fields on the walls.

Where content history is stored, the content may be re-accessed on the walls 12, 14, 16 and 18. For instance, see in FIG. 22 that a selectable "History" icon 700 is provided via device 80*a*. When icon 700 is selected, a timeline interface like the one in FIG. 45 may be provided for selecting a point in time at which the content is to be viewed. The FIG. 45 interface includes a timeline 702 corresponding to the period of time associated with a conferencing session. In FIG. 45 the timeline 702 indicates a period between 9 AM and 3 PM. Other shorter and longer (e.g., multiple days) session period are contemplated where the time breakdown in FIG. 45 would automatically reflect the duration of a session.

Referring still to FIG. 45, a device 80*a* user may move a time line pointer icon 704 along timeline 702 to select different times during the period of a session. Her, it is contemplated that as the icon 704 is slid along the timeline 702, the content presented in the content fields (e.g., 130*a*, 130*b*, etc.) on the emissive surfaces that surround the space and the content field number and arrangement on the surfaces would change essentially instantaneously so that conferees in the space 13 could be, in effect, virtually ported back in time to view the content at the times corresponding to the time selected via icon 704. In FIG. 45, the content in a single field is represented at four different times 9 AM, 10 AM, 11 AM and 3 PM, by different instances of the single field labeled 130*a*1, 130*a*2, 130*a*3 and 130*a*4, respectively. Thus, when icon 704 selects time 9 AM on timeline 702, the content in the single field would be the content corresponding to 130*a*1, when icon 704 selects time 10 AM, the content in the single field would be the content corresponding to 130*a*2, and so on. While not shown in FIG. 45, the content field numbers and arrangement and the content in the other content fields during the session would change along with the content in the single field to reflect the combined content of all fields at the selected time. At an point the device 80*a* user may lift her finger from icon 704 to cause the content associated with the selected time to persist on the emissive surfaces. At any time a "View Current Content" icon 706 may be selected as shown in FIG. 45 to return to the most recently shared content (i.e., to a current content view).

Figure 46:
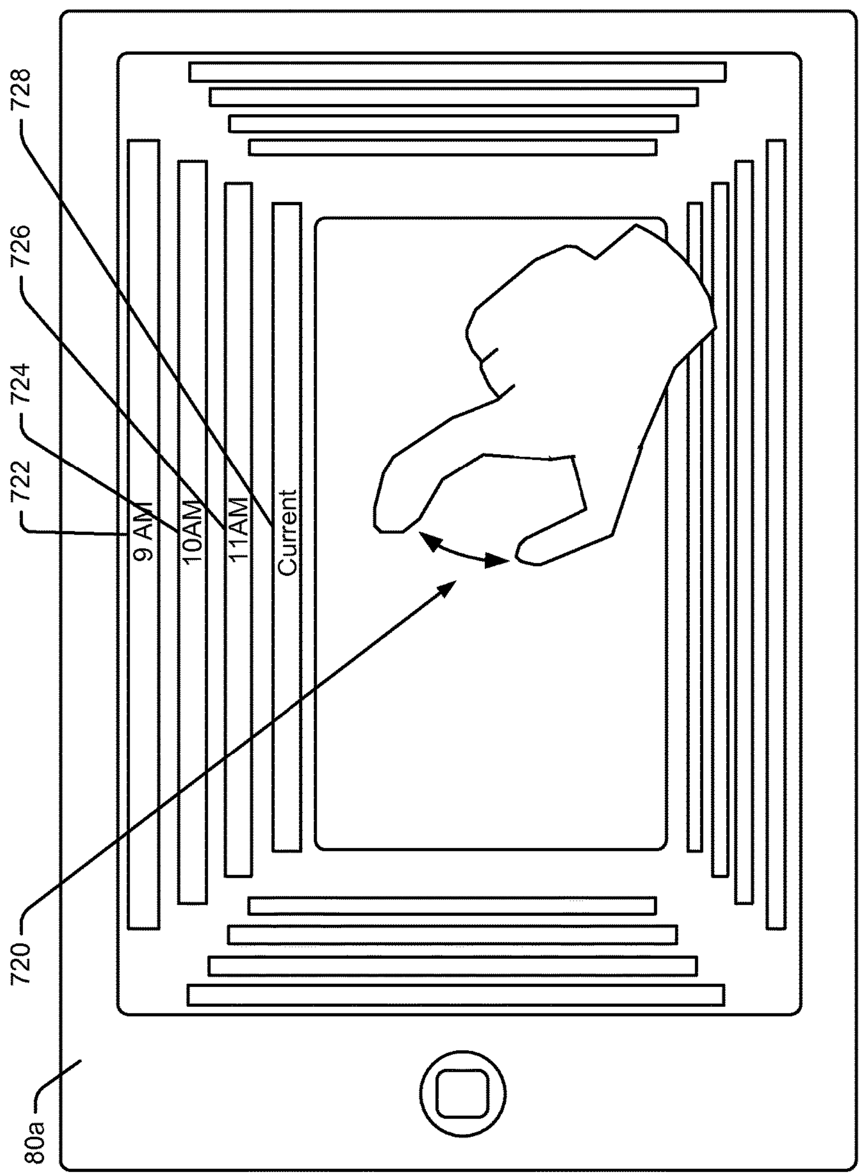
FIG. 46 shows another interface device being used to access content as a function of time.

Other ways to access a stored content history are contemplated. For instance, referring to FIG. 46, a device 80*a* may be programmed to recognize a pinching action as at 720 on the device screen as an indication to access content history where the pinch causes multiple frames 722, 724, 726, 728, etc., of wall fields to be presented where each frame corresponds to a different point in time that is selectable to replicate the content from that point in time on the emissive surfaces that surround space 13. In FIG. 46 there are four frames corresponding to times 9 AM, 10 AM, 11 AM and current (e.g., the current time). Selecting one of the frames would cause the content associated with that time to be presented in the space 13.

Figure 47:
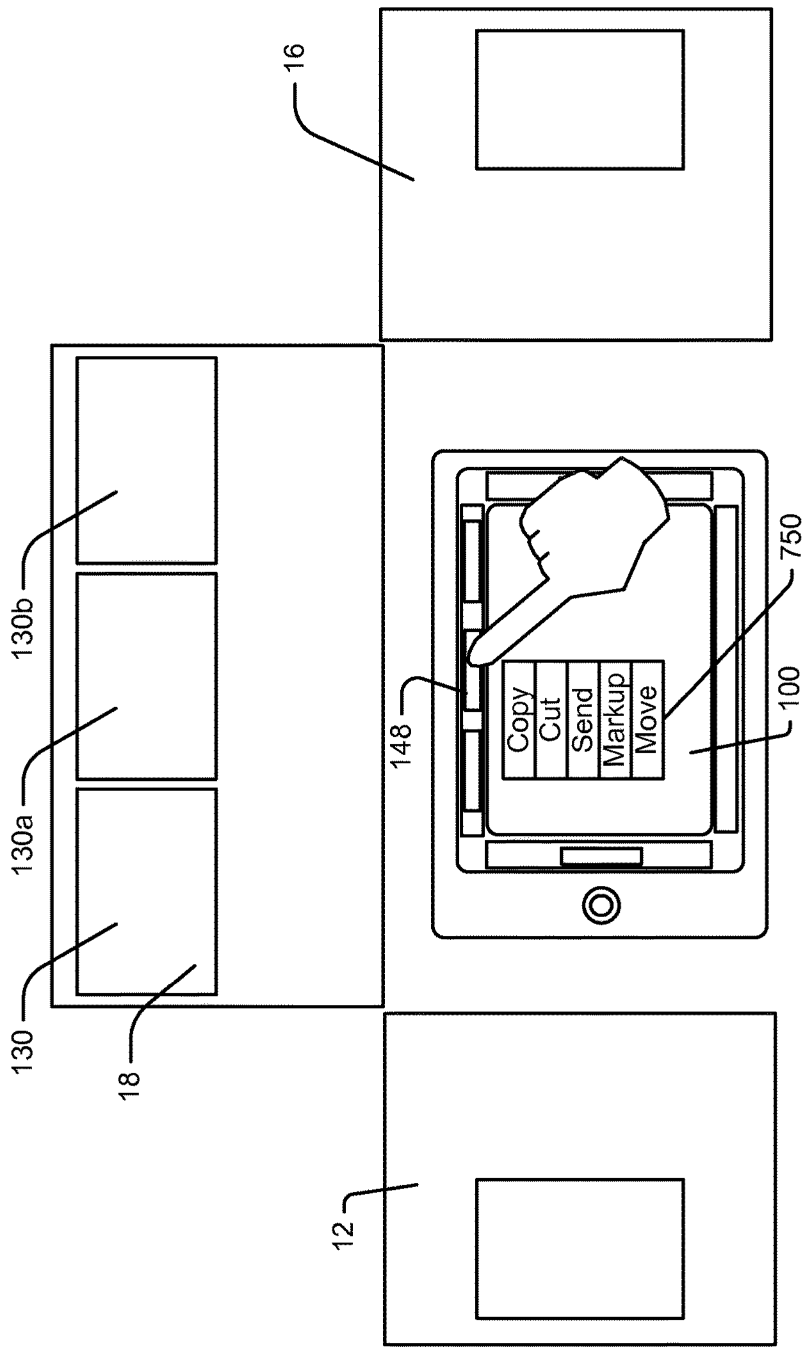
FIG. 47 is a schematic illustrating an interface device being used to control replicated content from one of the content fields on one of the walls in a conference space.

In some embodiments the interface may support other functions. To this end, see FIG. 47 where an interface on a device 80*a* enables a device user to copy, cut, send, markup or move content presented in one of the content fields (e.g., 130, 130*a*, 130*b*, etc.). For instance, in FIG. 47, when a user contacts content field icon 148 corresponding to content field 130*a* as shown and maintains contact for a threshold period (e.g., two seconds), the illustrated pull down menu 750 may be provided in space 100 including a set of selectable touch icons for causing different functions including the copy, cut, send, markup and move functions. Selecting one of the supported functions would cause the interface to provide other on screen tools for carrying out the selected function.

Figure 48:
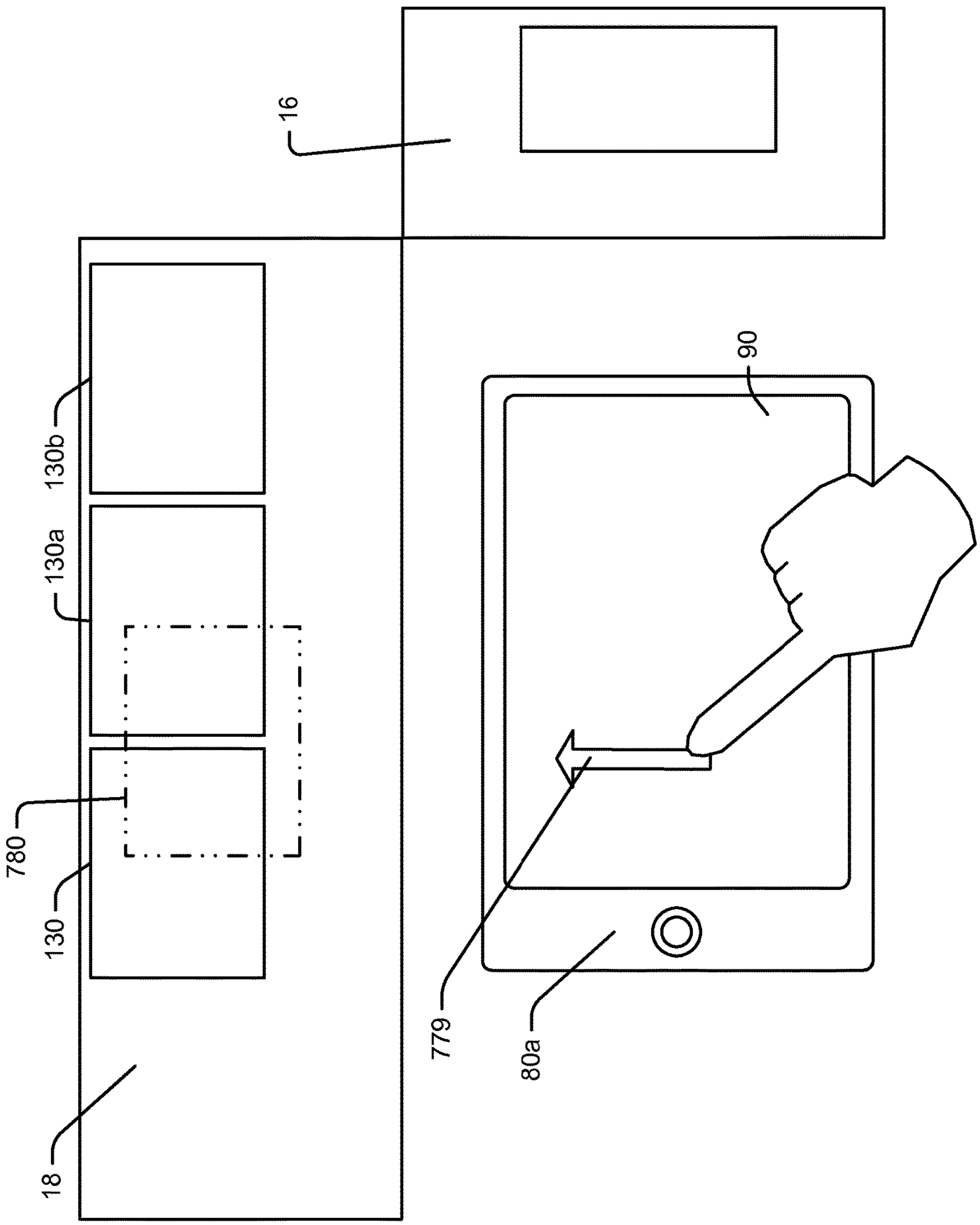
FIG. 48 is a schematic illustrating yet other tools for moving content from an interface device to a content field on a conference space wall.

Other interfaces similar to those described above for moving content about space 13 surfaces are contemplated. For instance, see FIG. 48 where one wall 18 that defines a space is shown which includes three virtual content fields 130, 130*a* and 130*b* at the time corresponding to the illustration. A user device 80*a* is oriented as shown. Here, when a user swipes on the surface of the device 80*a* display 90 toward wall 18 as indicated by arrow 779, a phantom or other representation (e.g., the actual content) 780 of the content on display 90 is created on the wall 18. With representation 780 on wall 18, display 90 may simply become a directional touch pad until representation 780 is moved to an intended location on wall 18. For instance, see FIG. 49 where, after representation 780 is presented on wall 18, a duplication 782 of the content fields 130, 130*a*, 130*b*, etc., on wall 180 including field 783 corresponding to content field 130*b* and the content in the fields is presented on screen 90 as is a duplication 784 of representation 780 to provide a visual queue to invite a device user to move the content in representation 780 to an intended location. The juxtaposition of image 784 with respect to the content fields (e.g., 783) on screen 90 is identical to the juxtaposition of representation 780 with respect to content field 130, 130*a* and 130*b* on wall 18 which results in an intuitive interface. IN at least some embodiments the representations 780 and 784 may be visually distinguished in a similar manner to help the device user understand the relationship between the two representations. For instance, in some cases each representation may be presented with a red or yellow outline or highlight about the representations to help the user associate the two representations.

Here, the intended location for the content associated with representation 780 may be any one of content fields 130, 130*a* or 130*b* or may be some other location on wall 18. Other locations may include a location 786 to the left of content fields 130, 130*a* and 130*b*, a location to the right of fields 130, 130*a* and 130*b* or any location between two fields (e.g., to a location between fields 130 and 130*a*). To move content to field 130*b* on wall, a user drags representation 784 to field 783 on screen 90 as shown at 788 causing representation 780 on wall 18 to similarly move toward and to field 130*b* as indicated by arrow 790. Where the content is moved to a location between two adjacent fields or to a side of the fields where there currently is no space on the wall 18, the other fields on the wall may be slid over or resized to accommodate a new field. After content in representation 780 has been moved to an intended location, the interface on display 90 may automatically revert back to one of the standard interfaces (e.g., see FIG. 48) described above.

Figure 49:
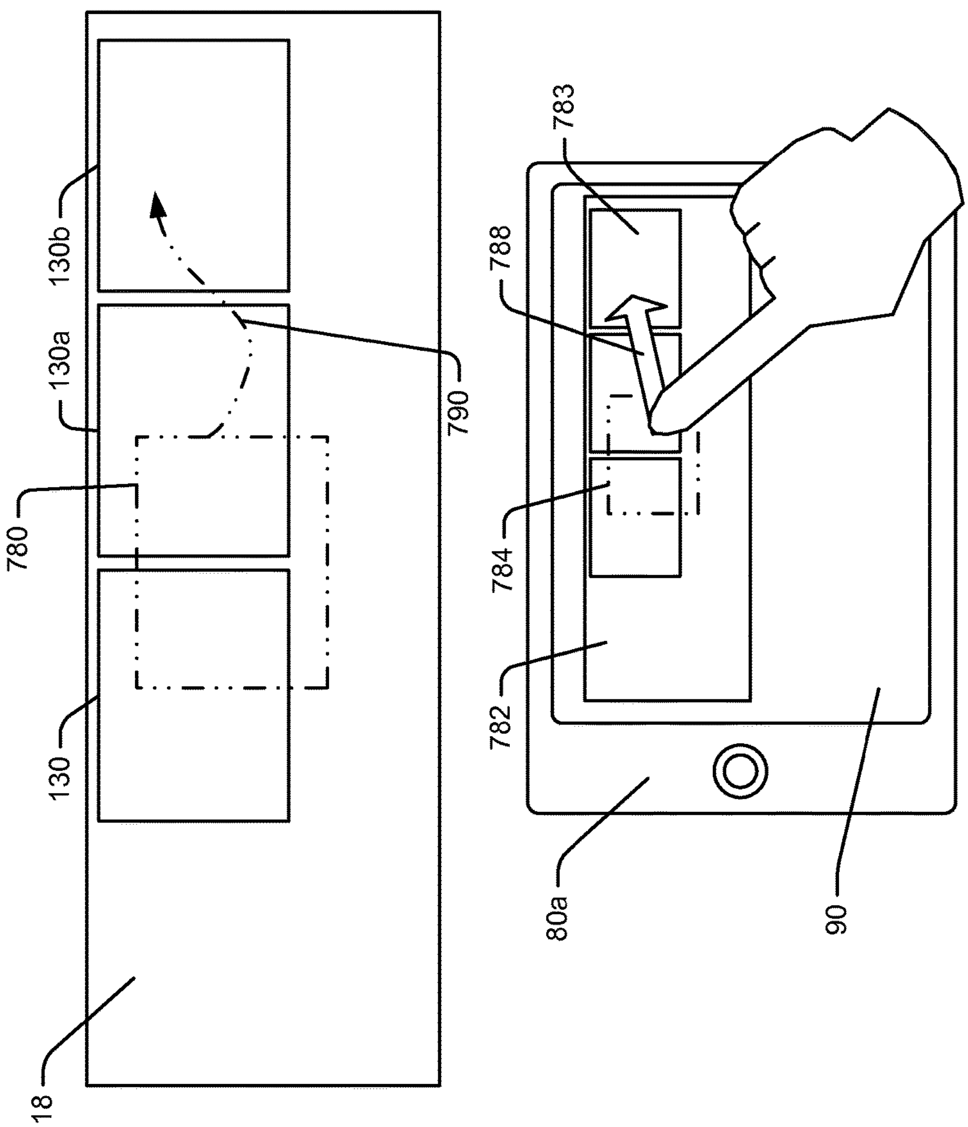
FIG. 49 is similar to FIG. 48, albeit showing continued movement of content using an interface device.

Referring still to FIG. 49, in addition to providing the visual representation of wall 18 fields as well as representation 784 on screen 90, the interface may also provide other temporary guidance to the device 80*a* user to select possible locations for the content associated with representation 780 as well as to coax or encourage the device 80*a* user into completing the location selection process. For instance, see FIG. 50 where the device interface on screen 90 includes the field representations 782 as well as representation 784 corresponding to representation 780 on wall 18. In addition, the interface includes target tags 800*a* through 800*g* selectable for indicating a location on wall 18 to which the content should be moved. Here, by dragging image 784 to one of the target tags or by selecting one of the targets, the content associated with image 784 can be moved to the selected location.

Figure 50:
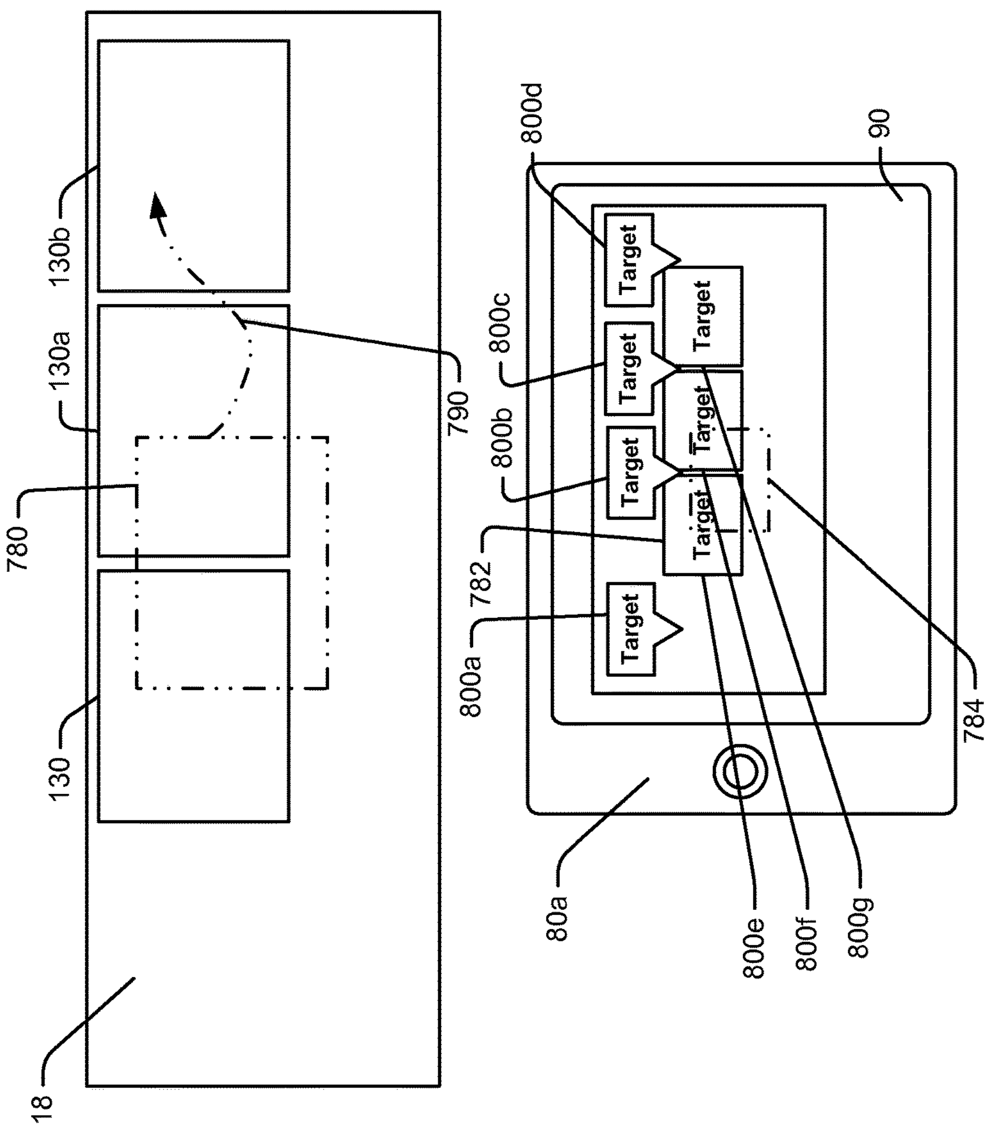
FIG. 50 is similar to FIG. 49, albeit showing other tools for controlling content via an interface device.

Referring still to FIG. 50, while the target tags 800*a* through 800*e* are only shown on display 90, in other embodiments the tags may be provided on the wall 18 in similar locations. Referring to FIGS. 49 and 50, while the visual queues for moving content around on wall 18 or other space walls may be provided on the walls themselves as indicated by representation 780, in other embodiments the queues may only be provided on the user device display 90. Thus, for instance, in FIG. 49, representation 780 may not be provided. In this case the device 80*a* user would only use the visual queues on display 90 to select the final location for presenting the content in the manner described above. Providing the content movement controls on only the user device interface has the advantage of not distracting other persons in space 13 during a sharing or conferencing session as a device user works through the process of moving content about on the space wall surfaces. On the other hand, where at least some visual queues are presented on the emissive surfaces in the space 13, the queues may provide some sense of what is happening in the space as content is being changed, moved, modified, etc.

In some embodiments it is contemplated that content field size, rotational angle and other attributes of fields on conference space walls may be changed and that fields may be presented in an overlapping fashion. To this end, see FIG. 51 where wall 18 is shown having content fields 830*a* through 830*f* displayed. Field 830*b* overlaps field 830*a* and field 830*c* overlaps field 830*b*. Similarly field 830*f* overlaps field 830*e* while field 830*d* stand alone. While each of fields 830*b*, 830*d* and 830*f* have generally vertical and horizontal boundaries, the other fields 830*a*, 830*c* and 830*e* are angled (e.g., have been rotated). In this case, in at least some embodiments, when a directional gesture as at 810 is performed to move content from a user device display 90 to wall 18, a representation of all fields on wall 18 may be presented on display 90 for facilitating selection of a desired location for the new content as shown at 812. In addition to showing the existing fields at 812, a phantom or full representation 814 of the content being moved onto the wall 18 from device 80*a* is provided on display 90 which the device user can move (e.g., via dragging, selection of an existing field if the new content is to replace existing content, etc.) on display 90 to the desired location with respect to the fields in representation 812. After the desired location is selected, the device user can select an "enter" icon 816 to complete the selection. Once icon 816 is selected, the new content is presented on wall 18 in the location selected by the device user via device 80*a*. In this example, because no visual queues were provided on wall 18, the content update simply occurs after selection by the device user without disrupting or disturbing conferees in the conference space.

Figure 51:
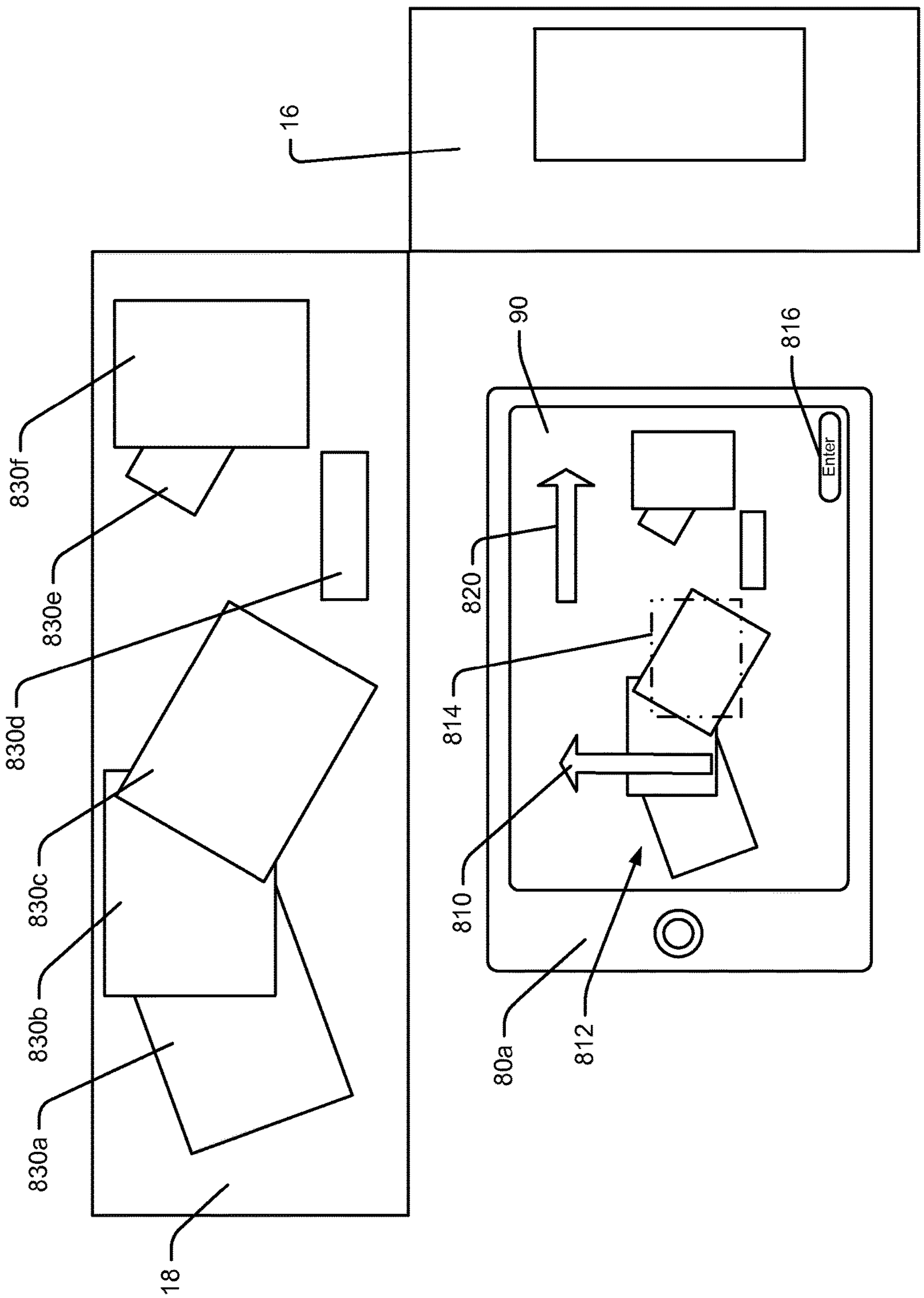
FIG. 51 shows yet other tools for moving content about on conference walls via an interface device.

In the case of the FIG. 51 embodiment, a directional swiping gesture in another direction such as to the right toward wall 16 as indicated by arrow 820 would result in the content from wall 16 located to the right of device 80*a* being represented on display 90 as well as representation 814 being presented on the display 90 as above. In this case, movement of icon 814 on display 90 would select a location on wall 16 to the right as opposed to on wall 18.

Figure 52:
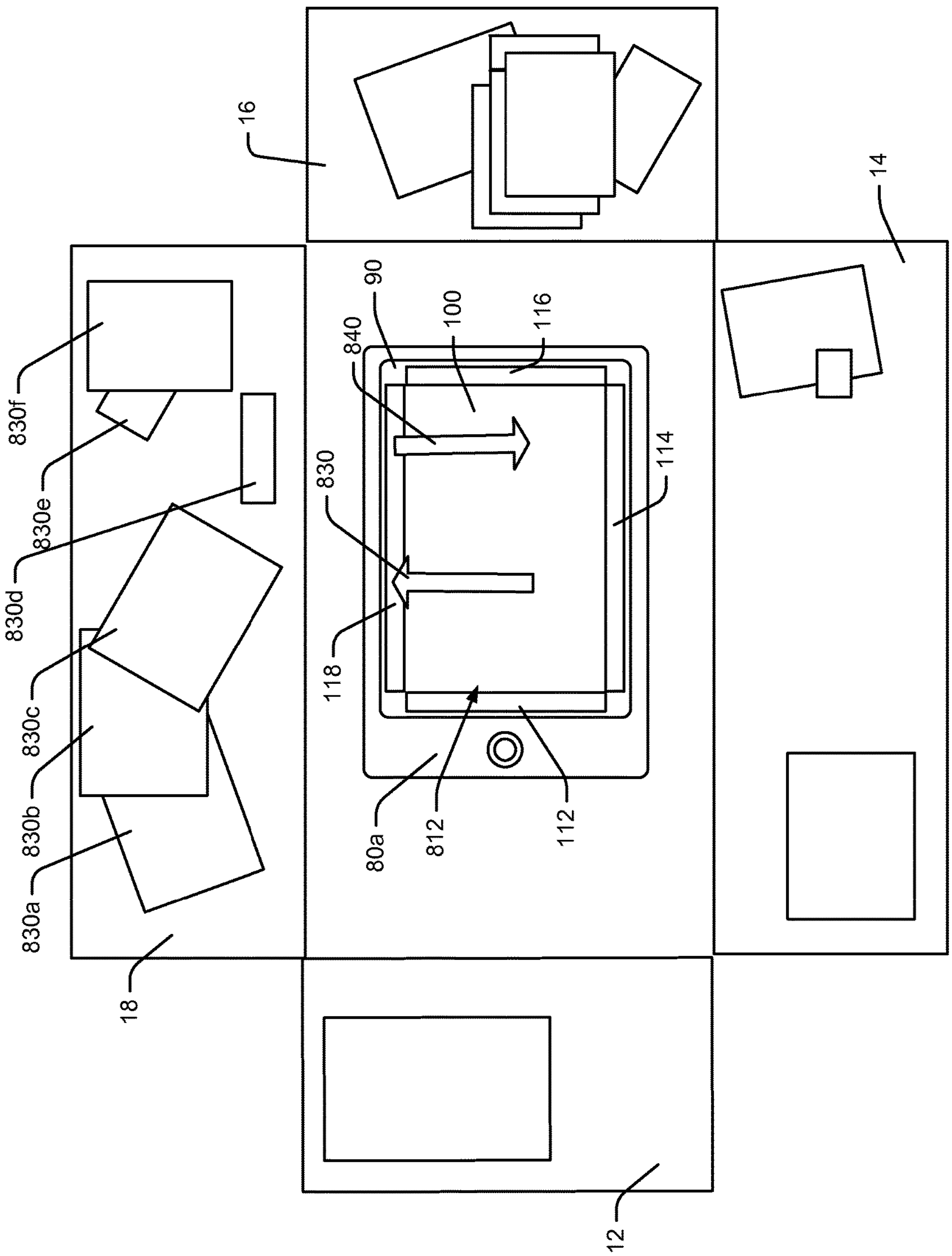
FIG. 52 shows an interface device being used to control content on conference room walls.
Figure 53:
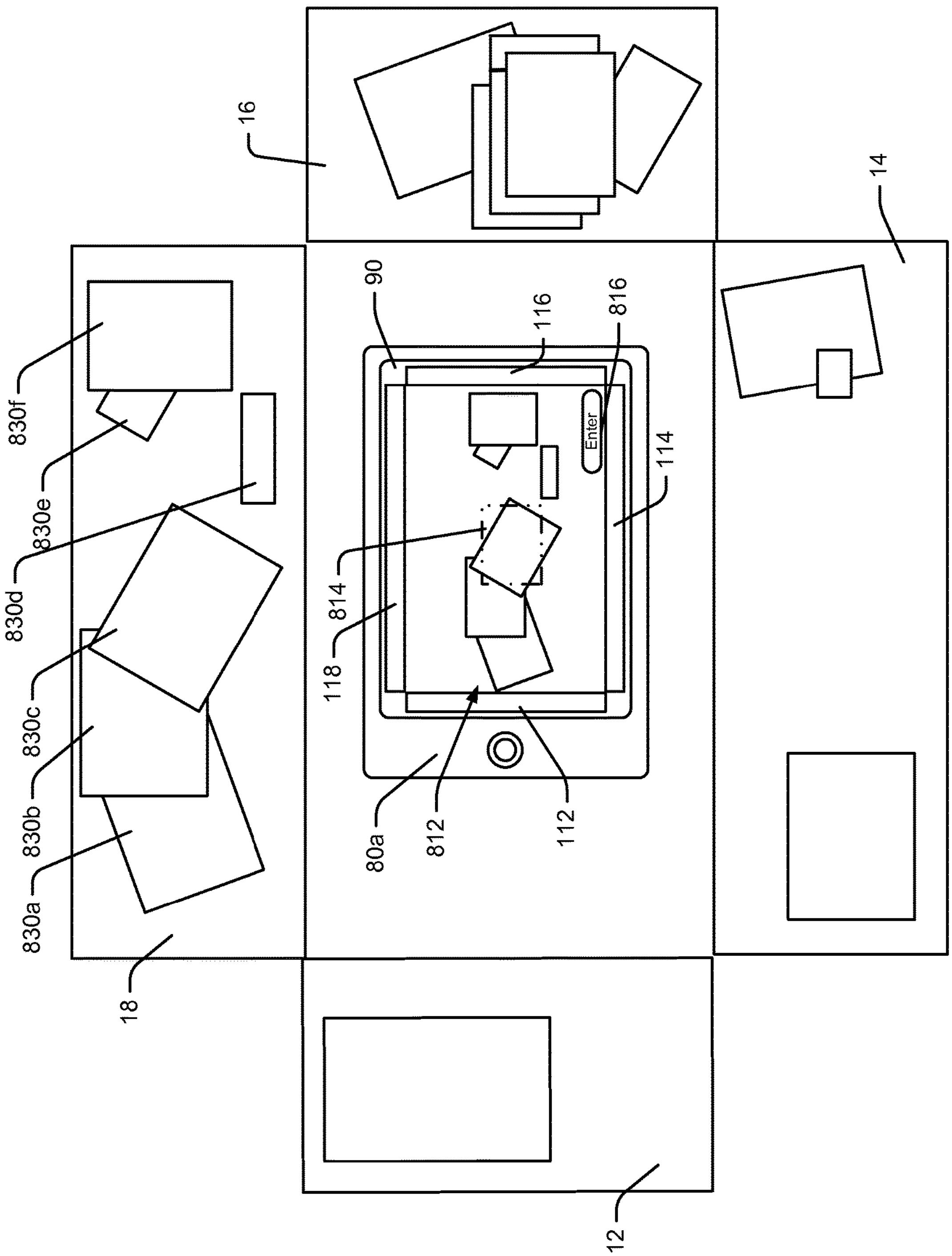
FIG. 53 is similar to FIG. 52, albeit showing replicated content from one of the space walls on the interface device screen.

Referring to FIG. 52, another interface is shown on display 90 that is similar to the interface shown in FIG. 51, albeit where wall fields 112, 114, 116 and 118 frame a device workspace 100. Here, to provide the field representations from wall 18 on display 90, a device user swipes from space 100 into field 118 associated with wall 18 as indicated by arrow 830. As shown in FIG. 53, the swipe 830 causes device 80*a* to generate a representation 812 of the fields and content from wall 18 in space 100 and also to provide representation 814 that corresponds to the content in field 100 prior to swipe 830. Again, the device user can move representation 814 to a desired location with respect to the content fields represented in space 100 and select the enter icon 816 to add the new content to wall 18 in a corresponding location.

Figure 54:
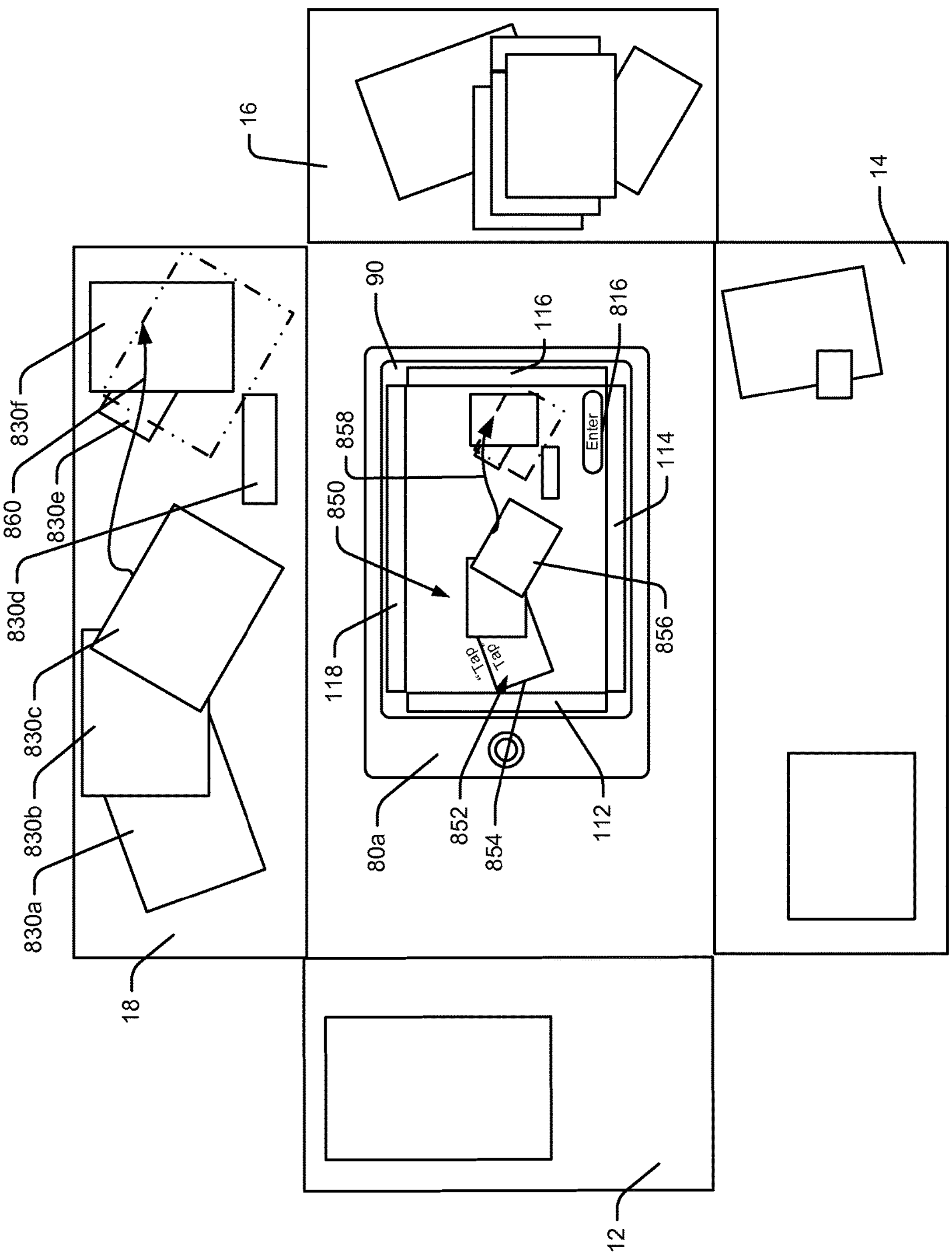
FIG. 54 is similar to FIG. 53, albeit showing movement of content on an interface device and associated movement of content on one of the space walls.

Referring again to FIG. 52, a swipe from wall field 118 corresponding to wall 189 into space 100 as indicated at 840 may cause the content fields and related content from the entire wall 18 to be represented 850 in space 100 as shown in FIG. 54. Here, instead of being used to place new content on wall 18, the interface would be used to move existing content (e.g., content fields or content presented in a content field) about on wall 18. The content fields in representation 850 may be selected and moved in space 100 relative to each other to move those fields and the related content to other locations on wall 18. For instance, see the movement of field representation 856 in space 100 indicated by arrow 858 which results in immediate movement of field 830*c* on wall 18 as indicated by arrow 860.

Referring still to FIG. 54, in some embodiments, with the content fields represented in space 100, one of the content fields may be selected on display 90 to be increased in size to take up the entire space 100 so that the device user can better see the content, change (e.g., annotate) the content, etc. For instance, a double tap as indicated at 852 on content field 854 on display 90 may cause field 854 to resize and cover the entire space 100 as shown at 854*a* in FIG. 55.

At least some embodiments of the present disclosure include other shapes or relative juxtapositions of emissive surfaces within a conference space. For instance, see FIG. 55 that shows a portion of an exemplary conference space wall structure 900 that includes substantially vertical top and bottom portions 902 and 904 and a tray extension substructure 906 including at least a substantially horizontal member 908 that forms a substantially horizontal upwardly facing surface 910. While surface 910 may be horizontal, in some embodiments surface 910 will form a slightly obtuse angle (e.g., between 90 degrees and 120 degrees) with the surface of top wall portion 902. In the embodiment of FIG. 56, a support brace member 912 extends from a top edge of bottom portion 904 to a distal edge of horizontal member 908.

In some cases the structure shown in FIG. 56 may be formed via a single curved emissive surface where the visible surfaces in FIG. 56 are all emissive and capable of presenting content to a system user. In other cases only portions of the surfaces visible in FIG. 56 may be emissive or portions of the visible surfaces in FIG. 56 may be formed using different flat panel displays. For instance, in many cases only the visible surfaces of top portion 902 and horizontal member 908 will be used to present information and therefore, in some cases, only those surfaces will be emissive. In some cases top portion 902 may be provided via a large flat panel display and surface 910 may be provided via an elongated flat panel display structure. Hereinafter, unless indicated otherwise, member 908 will be referred to as a tray member 908 and surface 910 will be referred to as a tray surface 910.

The overall height of the wall structure 900 may be around the height of a normal conference wall (e.g., 8 to 11 feet high). Tray member 908 will be located at a height that is comfortable for a normal adult standing adjacent the structure 900 to reach with an arm. For instance, surface 910 may be anywhere between 28 inches and 43 inches above an ambient floor surface. Surface 910 will have a width dimension Wd between 4 inches and 18 inches and, in most cases, between eight and twelve inches.

Figure 55:
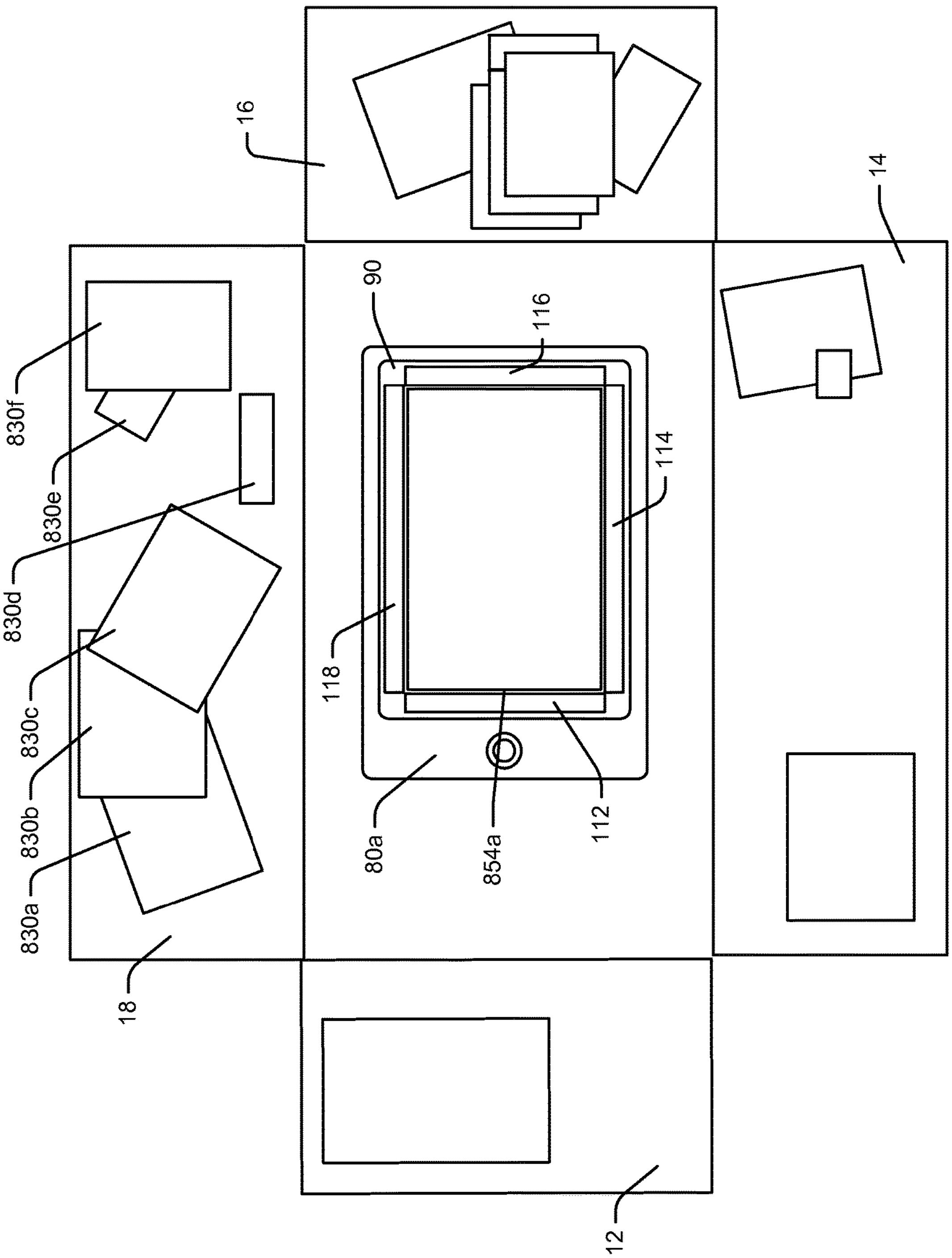
FIG. 55 is similar to FIG. 54, albeit showing a different state.
Figure 56:
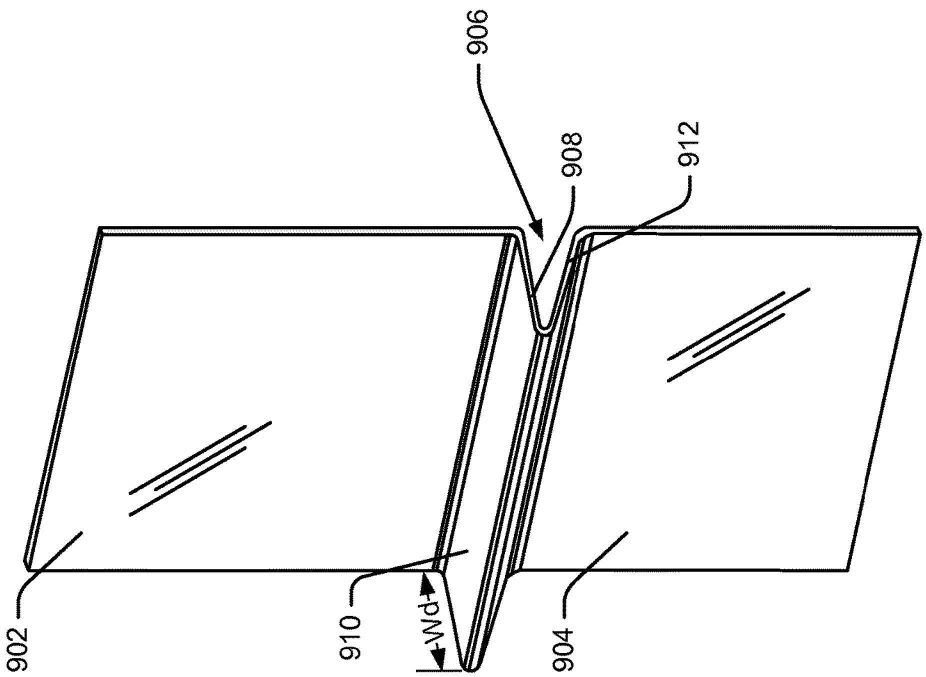
FIG. 56 shows a schematic of an emissive surface including and forming a shelf member.
Figure 57:
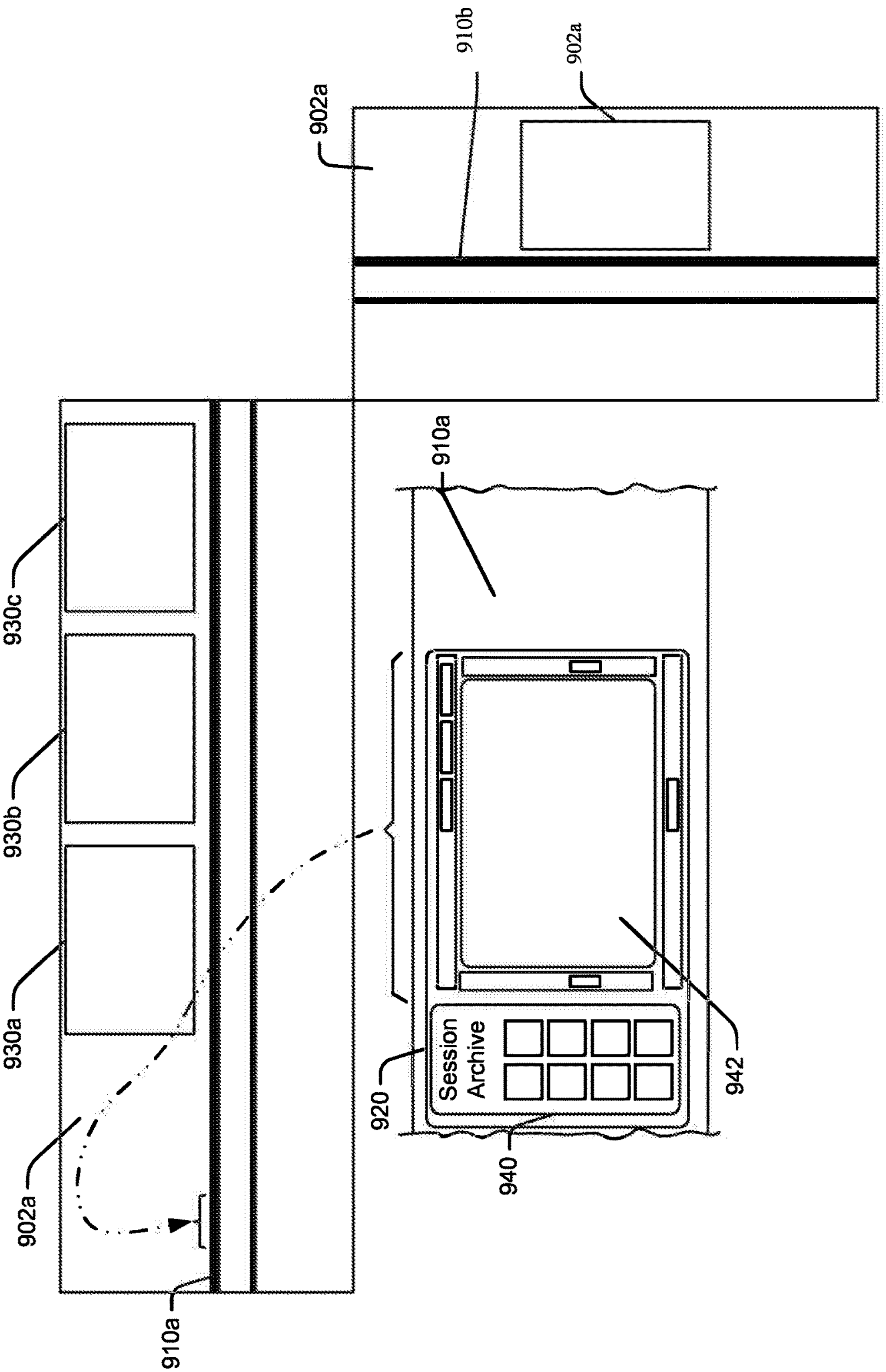
FIG. 57 shows two exemplary walls of a conference space that have the form shown in FIG. 56 where an interface device is presented on a top surface of one of the shelf members.

Referring to FIG. 57, two walls 902*a* and 902*b* of a conference space that are constructed using wall structure like the structure shown in FIG. 55 are illustrated where tray surfaces 910*a* and 910*b* extend along the entire length of each wall member 902*a* and 902*b*. Virtual content fields 930*a*, 930*b* and 930*c* are shown on the top portion of wall structure 902*a* and other content fields (not labeled) are presented on the other wall 902*b*. A portion of surface 910*a* at the location indicated by arrow 916 is shown in top plan view. A virtual interface 920 that has features similar to some of the interface features described above is provided on surface 910*a*. The interface 920 may be presented anywhere along surface 910*a* or at any location along any other tray surface (e.g., 910*b*, etc.). Interface 920 enables an interface user to add new content to wall 902*a* or to any of the other walls represented on the interface, to move content about on the space walls, to remove content from the walls, etc. In addition, interface 920 includes a session archive 940 that includes all session images previously shared on the space walls during a conference session. In this case, it is contemplated that any session image in space 940 may be moved via dragging, double clicking action, etc., into the interface workspace 942 to access the image and the image in the workspace 942 may be moved to one of the content fields on the space walls via a directional gesture in space 942 similar to the gestures described above.

To associate a specific system user with the user's content for sharing, the user may be able to log onto the system by contacting any emissive surface and being presented with a log on screen at the contacted location. For instance, the contacted location may be anywhere on an emissive wall surface or at a location on one of the tray surfaces. As another instance, where the top surface of a conference table is emissive, the contacted location may be anywhere on the top surface of the conference table. Once logged on, a desktop including the user's content may be provided at the contacted location. Where a user moves about a conference space to locations adjacent other emissive surfaces or other portions of emissive surfaces, the user's desktop may automatically move along with the conferee. For instance, in at least some cases, after a specific user logs onto a network at a specific location within a conference space and after the user's identity is determined and the user is associated with the user's desktop, cameras may be used to track movement of the user within the space to different locations and the desktop may be moved accordingly so that the user need not re-log on to access the user's content/desktop.

Referring again to FIG. 1, exemplary cameras 960 are shown in space 13 for capturing images of scenes within space 13 for, among other things, tracking locations of conferees within the space 13. The cameras may be similar to the types of cameras used by Microsoft in the Kinect gaming system or other similar types of camera systems.

In addition to determining conferee locations within space 13 and providing desktops or other interfaces at conferee locations within the space, the cameras 960 may also be used instead of or in conjunction with the access points 56 to determine locations, relative juxtapositions and orientations of user devices (e.g., 80*a*) within the space 13. For instance, Kinect type cameras may be programmed to sense devices and orientations in a space 13 and feed that information to system processors for driving the interface based features described above.

Figure 58:
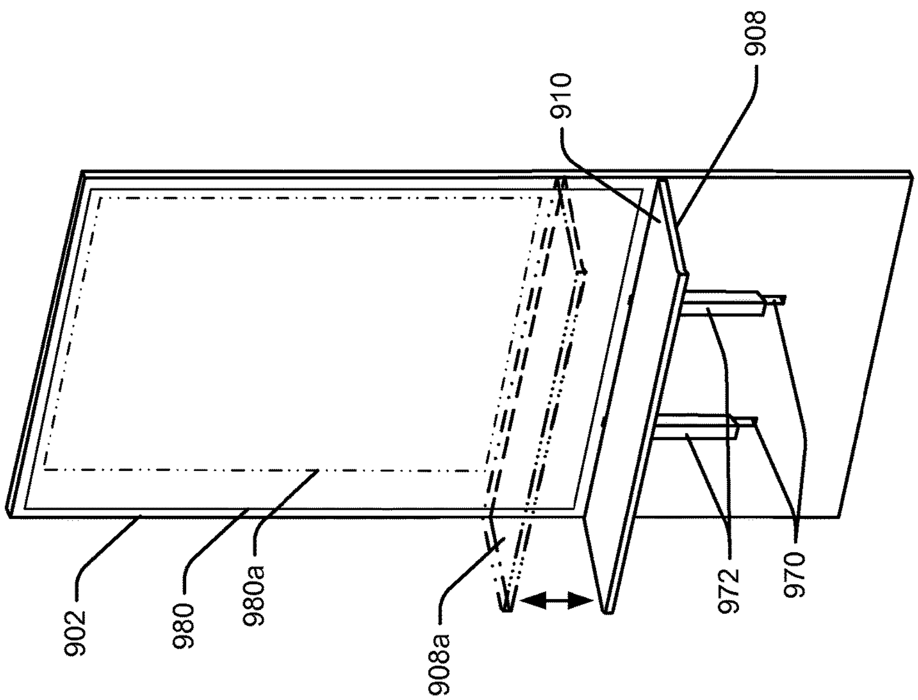
FIG. 58 shows an emissive structure including a shelf structure that can be moved up and down.

It has been recognized that the optimal or preferred height of a tray member (e.g., see 908 in FIG. 56) will depend on who is using the tray member where taller persons will likely prefer a higher tray member than shorter persons. For this reason, in at least some embodiments, it is contemplated that a tray member may be height adjustable. For instance, see FIG. 58 where vertical tracks 970 are formed in the lower portion of wall structure 902 and where tray member 908 is mounted to first and second carriages 972 to the tracks 970 for up and down vertical movement along a range of different heights. Carriages 972 extend down from an undersurface of tray member 908 to engage tracks 970 so that, even when tray 908 is in the lower position illustrated, the top portions of tracks 970 remain generally below member 908. In FIG. 58, member 908 is shown is a second higher position in phantom at 908*a*.

In at least some embodiments, when tray member 908 in FIG. 58 is raised or lowered, the dimensions of all content fields presented there above may be adjusted so that the content in the fields can remain visible, albeit at a different scale. For instance, in FIG. 58, an exemplary content field when tray member 908 is in the lower position illustrated is labeled 980. When the tray member is moved to the location indicated at 908*a*, content field 980 dimensions are reduced as indicated at 980*a* so that a smaller version of the content is presented above the tray 908*a* and the tray does not obstruct viewing of the content field 980*a*. In an alternative embodiment, if structure 902 extends above field 980 (e.g., by 1-2 feet) when tray 908 is in the lower position, as the tray is raised to the higher position, the content field may simply be raised along therewith while the dimensions remain the same.

While the interfaces described above are described as touch based where sensors identify contact gestures (e.g., swipes, pinches, taps, etc.) on a display screen surface, in at least some embodiments the interfaces may be configured with sensors to sense gestures in three dimensional space proximate display interfaces without requiring screen surface touch. For instance, some Samsung smart phones now support non-touch gesture sensing adjacent the phone display screens for flipping through a set of consecutive pictures, to answer an incoming phone call, etc. In at least some embodiments any of the gestures described above may be implemented in a content sharing application on a Samsung or other smart device that supports non-touch gestures so that directional interfaces like those described above can be configured.

In other cases sensors proximate or built into other emissive surfaces in a conference space may support non-touch gesture activity. For instance, where an interface is provided on a tray surface 908 as in FIGS. 56 and 57, non-touch gesture based sensors may be built into the structure 902 shown in FIG. 56 for sensing gestures adjacent surface 908. As another instance, in FIG. 2, in cases where the table top surface 60 is emissive, non-touch gesture sensors may be built into the table assembly for sensing non-touch gesture proximate one or more virtual desktops provided to system users on the surface 60. In some embodiments non-touch gesture sensing may only be supported at specific locations with respect to furniture artifacts in a conference space.

Thus, in at least some embodiments that are consistent with at least some aspects of the present disclosure, interface user intention to move content about on emissive surfaces within a conference space is determined based on gestures performed by a user on an interface, the location and orientation of the interface with respect to artifacts within the conference space and the locations and relative juxtapositions of dynamic and changing content fields on emissive surfaces in the space.

While some of the systems described above determine orientation of an interface with respect to emissive surfaces and content fields in a conference space directly, in other cases interface orientation may be inferred from information about locations and orientations of other user devices or even features of device users. For instance, if conferees wear identification badges and the orientation of an identification badge can be determined via sensing, it may be assumed that a conferee is facing in a specific direction within a space based on orientation of the conferee's badge.

Figure 59:
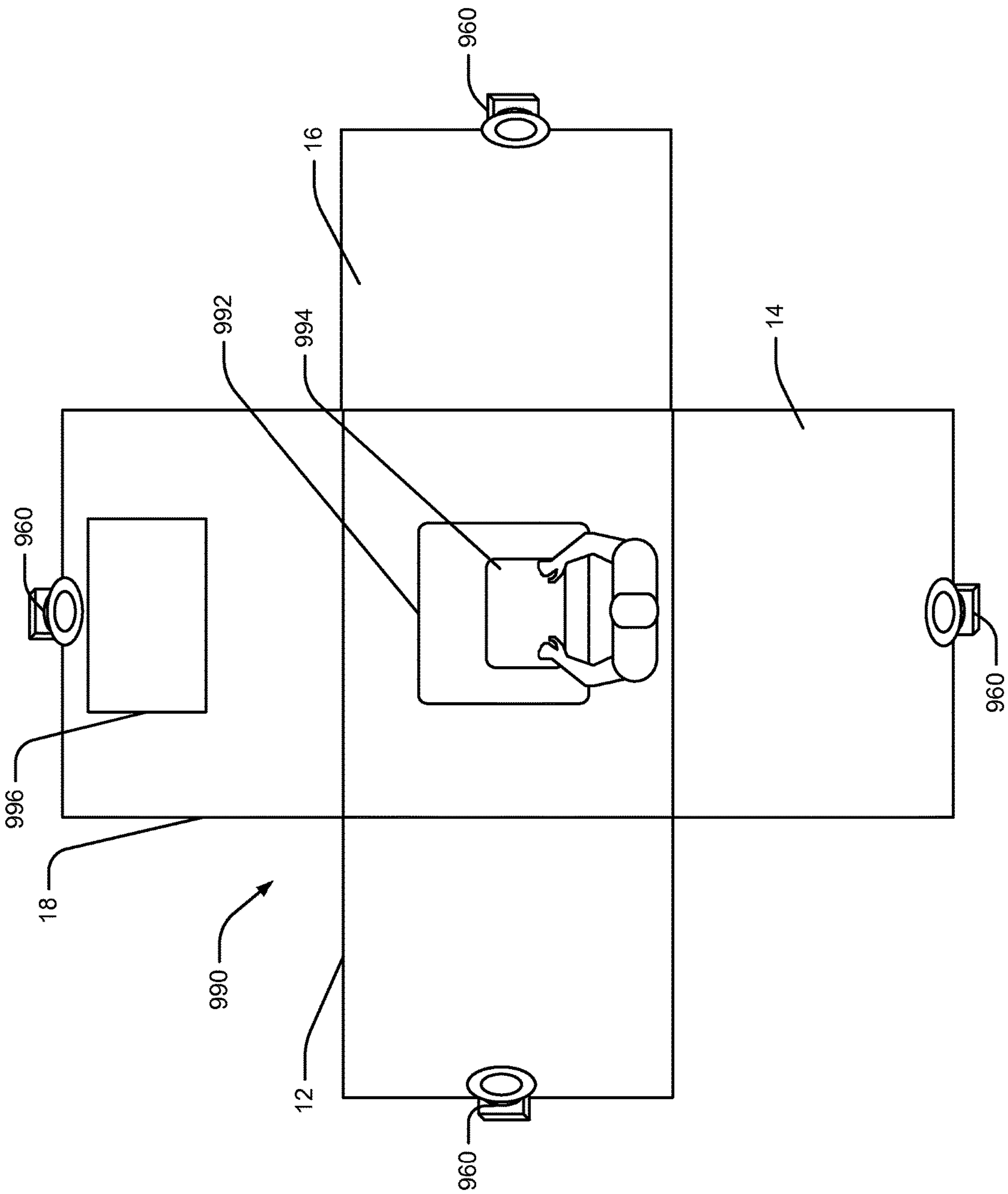
FIG. 59 shows a space user using a personal space to interact with content presented on a space wall.
Figure 60:
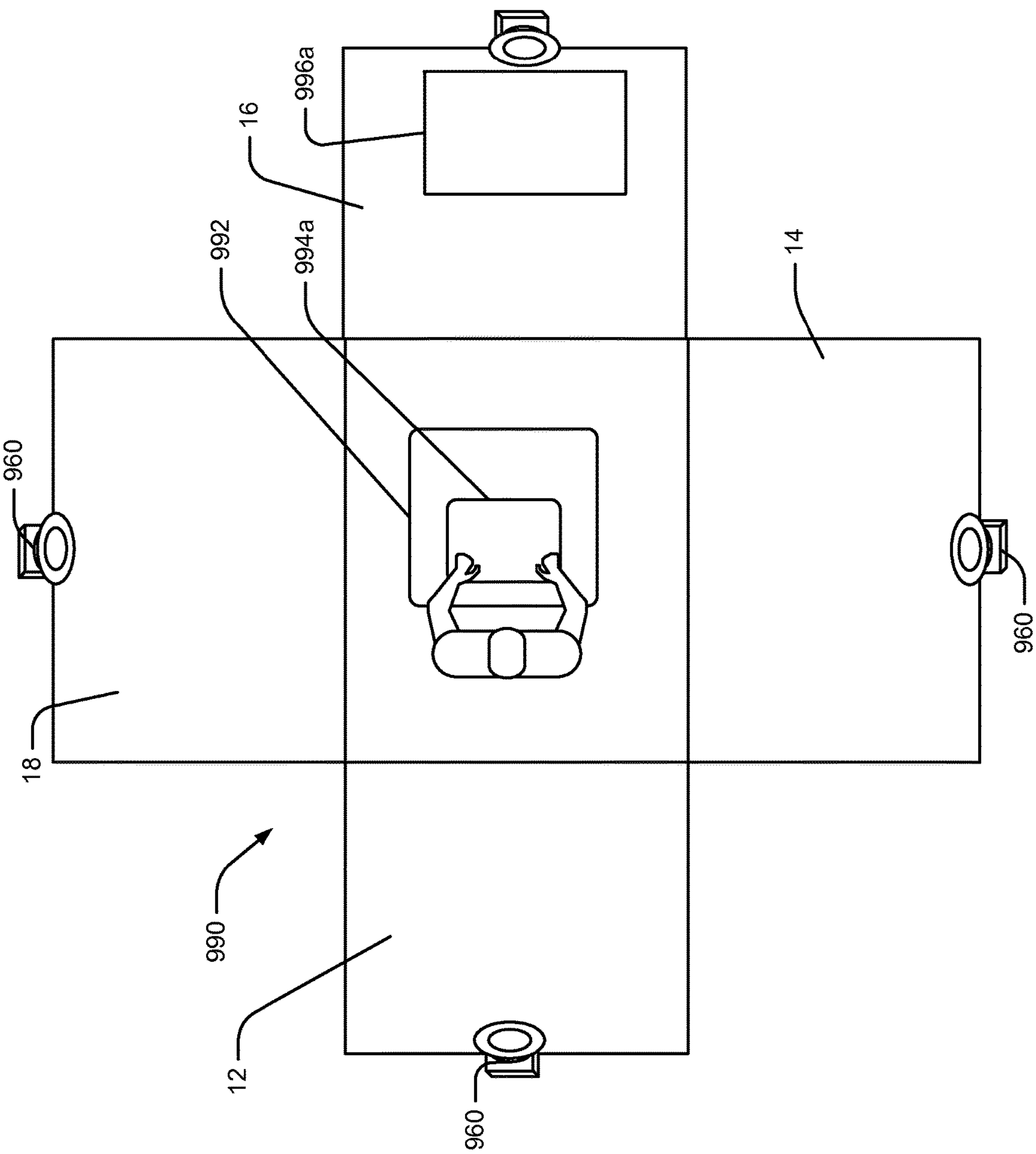
FIG. 60 is similar to FIG. 59; albeit showing the space user facing a different wall with content presentation being modified in an automated fashion to account for the orientation of the space user.

As another instance, cameras (e.g., 960 in FIG. 1) may be programmed to recognize conferee faces and determine orientations of conferee heads in a conference space and may provide directional interfaces via one or more emissive surfaces based on facing direction of a conferee. In this regard see FIG. 59 where a system user is located within a space defined by walls 12, 14, 16 and 18 and that includes a table 992 having an emissive top surface. Kinect (by Microsoft) or similar types of cameras 960 are provided about the space to obtain images of one or more conferees within the space. Here, when a conferee enters the space a processor may examine images obtained by cameras 960 and determine the location and orientation (e.g., which way the conferee is facing) of the conferee within the space and automatically provide display and interface tools via emissive surfaces in the space that are oriented for optimized use by the conferee. Thus, for example, in FIG. 59, because the conferee is facing wall 18 and is on a side of table 992 opposite wall 18, the system may automatically provide an interface (e.g., a desktop image) 994 along an edge of the table opposite wall 18 as well as a heads up content window or display 996 on the top surface of table 992. As another example, see FIG. 60 where the conferee faces wall 16 instead of wall 18. Here, after face recognition is used to determine that the conferee is facing wall 16 and on a side of table 992 opposite wall 16, the system automatically presents interface 994*a* facing wall 16 as well as content field or display 996*a* on wall 16 substantially aligned with interface 994*a*. If the conferee moves to a different location about the table 992, the interface 994 and display 996 will be moved to a different location to accommodate the new location and orientation.

One or more specific embodiments of the present invention have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the invention is to cover all modifications, equivalents, and alternatives falling within the spirit and scope of the invention as defined by the following appended claims. For example, while the specification above describes alignment of content sharing tools on a personal device or personal interface with content fields on common display surfaces, alignment may not be exact and instead may be within a general range. For instance, substantial alignment may in some cases mean alignment within a 45 degree range, a 60 degree range or other ranges. In particularly useful embodiments the alignment may be within a range of plus or minus 30 degrees, plus or minus 15 degrees or plus or minus 5 degrees, depending on capabilities of the system that determines device or interface orientation and juxtaposition within a space or other factors such as the number and locations of content fields on the emissive surfaces in a space.

As another example, in some embodiments when a content field is created, the content field may be provided with a field specific label (e.g., "Field 7") to distinguish the field from other fields on common display screens within a conferencing space. Here, the user interfaces provided on portable devices or on other emissive surfaces within the space may provide content filed selection icons with the field specific labels to help a user identify content fields to which device content is being moved. The field specific labels may be provided on interfaces that do not dynamically align or on interfaces that do dynamically align with the content fields in the space. In some cases the field specific labels may also each indicate the conferee that generated the content currently presented in the content field. For instance, see again FIG. 27 where labels 141 and 143 indicate content generating conferees and also uniquely distinguish the content field form each other. In this case, the user interface would include field specific labels such as "John", "Jean" and "Ava" with each of the content field icons on the interface so that the icons can be easily associated with related content fields and so that the conferee that generated the content in each content field can be identified.

To apprise the public of the scope of this invention, the following claims are made:

What is claimed is:

1. A conferencing arrangement for sharing information within a conference space, the arrangement comprising:

a common presentation surface positioned within the conference space, the common presentation surface including a presentation surface area;

a common presentation surface driver;

a first user interface device for use by a first conferee within the conference space, the first user interface device including a first device display screen, a first transmitter and a first device processor, the first device processor programmed to provide a first interface via the first device display screen useable to view content;

a second user interface device for use by a second conferee within the conference space, the second user interface device including a second device display screen, a second transmitter and a second device processor, the second device processor programmed to provide a second interface via the second device display screen useable to view content;

a sensor arrangement for sensing the direction of hand motions of each of the first and second conferees within the conference space;

a system processor linked to the driver and in communication with the sensor arrangement, the system processor receiving information content and presenting the information content via the common presentation surface and further programmed to perform the steps of:

(i) upon detecting a hand motion by the first conferee toward the common presentation surface, creating a sharing space on the common presentation surface area and replicating content from at least a portion of the first device display within the sharing space; and (ii) upon detecting a hand motion by the second conferee toward the common presentation surface, creating a sharing space on the common presentation surface area and replicating content from at least a portion of the second device display within the sharing space.

2. The arrangement of claim 1 wherein a first sharing space formed on the common presentation surface is centrally located along a lateral direction of the common presentation space.

3. The arrangement of claim 2 wherein at least first and second sharing spaces can be presented on the common presentation surface simultaneously.

4. The arrangement of claim 3 wherein the system processor alters the first sharing space to accommodate the second sharing space when the second sharing space is formed on the common presentation space.

5. The arrangement of claim 1 wherein the sensor arrangement includes at least a first sensor integrated within the first user interface device for detecting hand movements by the first conferee.

6. The arrangement of claim 5 wherein the at least a first sensor detects hand movements proximate the surface of the first device display screen.

7. The arrangement of claim 6 wherein the sensor arrangement includes at least a second sensor integrated within the second user interface device for detecting hand movements by the second conferee.

8. The arrangement of claim 7 wherein the at least a second sensor detects hand movements proximate the surface of the second device display screen.

9. The arrangement of claim 1 wherein the common presentation surface is a first common presentation surface and wherein the arrangement includes at least a second common presentation surface that is separate from the first common presentation surface, the system processor further programmed to perform the steps of:

(i) upon detecting a hand motion by the first conferee toward the second common presentation surface, creating a sharing space on the second common presentation surface area and replicating content from at least a portion of the first device display within the sharing space on the second common presentation surface; and (ii) upon detecting a hand motion by the second conferee toward the second common presentation surface, creating a sharing space on the second common presentation surface area and replicating content from at least a portion of the second device display within the sharing space on the second common presentation surface.

10. The arrangement of claim 1 wherein the common presentation surface is a first common presentation surface and wherein the arrangement includes a plurality of additional common presentation surfaces arranged about the conference space, the system processor further programmed to perform the steps of:

(i) upon detecting a hand motion by the first conferee toward any one of the common presentation surfaces, creating a sharing space on the common presentation surface that is motioned toward and replicating content from at least a portion of the first device display within the sharing space on the common presentation surface that is motioned toward; and (ii) upon detecting a hand motion by the second conferee toward any one of the common presentation surfaces, creating a sharing space on the common presentation surface that is motioned toward and replicating content from at least a portion of the second device display within the sharing space on the common presentation surface that is motioned toward.

11. The arrangement of claim 10 wherein each of the interfaces presents a separate content field icon for each instance of currently replicated content on any one of the common presentation surfaces.

12. The arrangement of claim 11 wherein the content field icons are presented within a boarder section of each of the interfaces at a location aligned with associated content on one of the common presentation surfaces.

13. The arrangement of claim 1 wherein the sensor arrangement detects first conferee hand motions proximate a surface of the first user device display screen and also detects second conferee hand motions proximate a surface of the second user device display screen.

14. The arrangement of claim 13 wherein the hand motions detected include physical swiping actions on the display screens of the user interface devices.

15. The arrangement of claim 1 wherein each of the user interface devices is a portable user interface device wherein the orientation and location of the user interface device within the conference space are changeable.

16. The arrangement of claim 15 wherein the first interface includes a central area and a border area along at least one edge of the central area, the first interface presenting a sharing field within the border area that corresponds to the common presentation surface, the first device processor tracking orientation of the first user interface device within the conference space and changing the location of the sharing field as the orientation of the first user interface device changes so that the sharing field remains aligned with the corresponding common presentation surface and wherein the second interface includes a central area and a border area along at least one edge of the central area, the second interface presenting a sharing field within the border area that corresponds to the common presentation surface, the second device processor tracking orientation of the second user interface device within the conference space and changing the location of the sharing field as the orientation of the second user interface device changes so that the sharing field remains aligned with the corresponding common presentation surface.

17. The arrangement of claim 1 wherein content is simultaneously replicated from each of the first and second user interface devices within first and second sharing spaces on the common presentation surface, respectively.

18. The arrangement of claim 1 wherein the sensor arrangement senses non-touch hand motions adjacent each of the first and second user interface display screens.

19. The arrangement of claim 1 wherein the sensor arrangement senses non-touch conferee hand motions.

20. A conferencing arrangement for sharing information within a conference space, the arrangement comprising:

a plurality of common presentation surfaces positioned about a conference space, each common presentation surface including a presentation surface area;

a common presentation surface driver;

a first user interface device including a first device display screen, a first transmitter and a first device processor, the first device processor programmed to provide a first interface via the first device display screen useable to view content;

a sensor arrangement for sensing the direction of hand motions of a first conferee within the conference space;

a system processor linked to the driver and in communication with the sensor arrangement, the system processor receiving information content and presenting the information content via the common presentation surfaces and further programmed to perform the steps of:

(i) upon detecting a hand motion by the first conferee toward any one of the common presentation surfaces, creating a first sharing space on the one of the common presentation surface areas and replicating content from at least a portion of the first device display within the sharing space; and (ii) upon detecting a hand motion by the first conferee toward any second one of the common presentation surfaces, creating a second sharing space on the second one of the common presentation surface areas and replicating content from at least a portion of the first device display within the second sharing space.

21. The arrangement of claim 20 wherein first and second different content sets are presented on the first device display screen upon detection of the hand motions toward the one of the common presentation surfaces and the second one of the common presentation surfaces, respectively, and, wherein, the first and second different content sets are presented in the first and second sharing spaces, respectively.

22. The arrangement of claim 21 wherein the first sharing space formed on one of the common presentation surfaces is centrally located along a lateral direction of the common presentation surface.

23. The arrangement of claim 22 wherein at least first and second sharing spaces can be presented on the common presentation surfaces simultaneously.

24. The arrangement of claim 20 wherein the sensor arrangement includes at least a first sensor integrated within the first user interface device for detecting hand movements by the first conferee.

25. The arrangement of claim 24 wherein the at least a first sensor detects hand movements proximate a surface of the first device display screen.

26. The arrangement of claim 20 wherein the interface device presents a separate content field icon for each instance of currently replicated content on any one of the common presentation surfaces.

27. The arrangement of claim 26 wherein the content field icons are presented within a boarder section of the interface display screen at a location aligned with associated content on one of the common presentation surfaces.

28. The arrangement of claim 20 wherein the sensor arrangement detects first conferee hand motions proximate a surface of the first user interface device display.

29. The arrangement of claim 28 wherein the hand motions detected include physical swiping actions on the display screens of the user interface devices.

30. The arrangement of claim 20 wherein the first user interface devices is a portable user interface device wherein the orientation and location of the first user interface device within the conference space are changeable.

31. The arrangement of claim 30 wherein the first interface device display screen includes a central area and a border area along at least one edge of the central area, the first interface device presenting a separate sharing field within the border area for each of the sharing spaces that exists on the common presentation surfaces, the first device processor tracking orientation of the first user interface device within the conference space and changing the locations of the sharing fields as the orientation of the first user interface device changes so that the sharing fields remain aligned with associated sharing spaces on the common presentation surfaces.

32. The arrangement of claim 20 wherein the sensor arrangement senses non-touch hand motions adjacent the first user interface display screen.

33. The arrangement of claim 20 further including at least a second user interface device including a second device display screen, a second transmitter and a second device processor, the second device processor programmed to provide a second interface via the second device display screen useable to view content, the sensor arrangement also for sensing the direction of hand motions of a second conferee, the system processor further programmed to perform the steps of:

(iii) upon detecting a hand motion by the second conferee toward any one of the common presentation surfaces, creating another sharing space on the one of the common presentation surfaces and replicating content from at least a portion of the second device display within the another sharing space.

34. The arrangement of claim 33 wherein content from the second user interface device is simultaneously shareable within a plurality of sharing spaces on the common presentation surfaces.

35. The arrangement of claim 20 wherein the sensor arrangement senses non-touch hand motion.

36. A conferencing arrangement for sharing information within a conference space, the arrangement comprising:

a plurality of common presentation surfaces positioned about a conference space, each common presentation surface including a presentation surface area;

a common presentation surface driver;

a plurality of user interface devices, each interface device including a device display screen, a transmitter and a device processor, each device processor programmed to provide an interface via the device display screen useable to view content and each user interface device for use by a different conferee within the conference space;

a sensor arrangement for sensing the direction of hand motions of each of the conferees within the conference space; and a system processor linked to the driver and the sensor arrangement, the system processor receiving information content and presenting the information content via the common presentation surfaces, the system processor programmed to perform the steps of:

detecting a hand motion by one of the conferees within the conference space toward one of the common presentation surfaces;

upon identifying that the direction of the hand motion is in the direction of a specific one of the common presentation surfaces, creating a sharing space on the presentation surface area of the common presentation surface located in the direction of the hand motion; and replicating the content from the device display associated with the one of the conferees within the sharing space.

37. The arrangement of claim 36 wherein the sharing space formed on one of the common presentation surfaces is centrally located along a lateral direction of the common presentation surface.

38. The arrangement of claim 36 wherein at least first and second sharing spaces can be presented on the common presentation surfaces simultaneously.

39. The arrangement of claim 36 wherein the sensor arrangement includes a separate sensor integrated within each of the user interface devices for detecting conferee hand movements.

40. The arrangement of claim 39 wherein each sensor detects hand movements proximate a surface of the first device display screen.

41. The arrangement of claim 36 wherein each interface device presents a separate content field icon for each instance of currently replicated content on any one of the common presentation surfaces.

42. The arrangement of claim 41 wherein each content field icons is presented within a boarder section of an associated interface display screen at a location aligned with associated content on one of the common presentation surfaces.

43. The arrangement of claim 36 wherein the sensor arrangement detects conferee hand motions proximate the surfaces of each of the user interface device display screens.

44. The arrangement of claim 43 wherein the hand motions detected include physical swiping actions on the display screens of the user interface devices.

45. The arrangement of claim 36 wherein each user interface devices is a portable user interface device wherein the orientation and location of each user interface device within the conference space are changeable.

46. The arrangement of claim 45 wherein each interface includes a central area and a border area along at least one edge of the central area, each interface presenting sharing fields within the border area that correspond to the common presentation surfaces, each interface device processor tracking orientation of the interface device within the conference space and changing the location of the sharing fields as the orientation of the interface device changes so that the sharing fields remain aligned with the corresponding common presentation surfaces.

47. The arrangement of claim 36 wherein the sensor arrangement senses non-touch conferee hand motions.

* * * * *